US012006664B2

(12) United States Patent
Kamon et al.

(10) Patent No.: US 12,006,664 B2
(45) Date of Patent: Jun. 11, 2024

(54) CONSTRUCTION MACHINERY WITH LEARNING FUNCTION

(71) Applicant: KAWASAKI JUKOGYO KABUSHIKI KAISHA, Kobe (JP)

(72) Inventors: Masayuki Kamon, Kobe (JP); Hitoshi Hasunuma, Kobe (JP); Shigetsugu Tanaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 344 days.

(21) Appl. No.: 17/612,641

(22) PCT Filed: May 20, 2020

(86) PCT No.: PCT/JP2020/019977
§ 371 (c)(1),
(2) Date: Nov. 19, 2021

(87) PCT Pub. No.: WO2020/241419
PCT Pub. Date: Dec. 3, 2020

(65) Prior Publication Data
US 2022/0220709 A1    Jul. 14, 2022

(30) Foreign Application Priority Data

May 24, 2019 (JP) .................. 2019-097381
May 24, 2019 (JP) .................. 2019-097382

(51) Int. Cl.
*E02F 9/26* (2006.01)
*E02F 9/20* (2006.01)
(Continued)

(52) U.S. Cl.
CPC ............. *E02F 9/265* (2013.01); *E02F 9/205* (2013.01); *E02F 9/2235* (2013.01); *E02F 9/262* (2013.01);
(Continued)

(58) Field of Classification Search
CPC .......................... B65G 2201/045; G06N 3/08
See application file for complete search history.

(56) References Cited

U.S. PATENT DOCUMENTS

2019/0257304 A1    8/2019 Kondo et al.
2022/0049477 A1*   2/2022 Yamanaka ............ E02F 9/2228
2022/0195704 A1*   6/2022 Shimizu ................ G06N 3/045

FOREIGN PATENT DOCUMENTS

JP    2018-71573 A    5/2018
JP    6360583 B1      7/2018

* cited by examiner

*Primary Examiner* — Jaime Figueroa
*Assistant Examiner* — Jerrod Irvin Davis
(74) *Attorney, Agent, or Firm* — METROLEX IP LAW GROUP, PLLC

(57) ABSTRACT

Construction machinery with learning function includes an operating part having a working part, a manipulating part, a work-state detecting part, an operation-state detecting part, a reaction detecting part, a learning data memory configured to store a command outputted from the manipulating part in a time series as command data, and store, in a time series as estimation basic data, work-state data, operation-state data, and reaction data, a learning module configured to execute machine learning of command data stored in the learning data memory by using estimation basic data stored in the learning data memory, and, after the machine learning, receive an input of the estimation basic data during the operation of the operating part, and output an estimated command of the command, and a hydraulic drive system configured to drive the operating part based on one of the command and the estimated command, or both of the command and the estimated command.

10 Claims, 27 Drawing Sheets

(51) Int. Cl.
  *E02F 9/22* (2006.01)
  *G05D 1/00* (2024.01)
  *G06N 3/049* (2023.01)
  *G06N 3/08* (2023.01)
(52) U.S. Cl.
  CPC ......... *G05D 1/0061* (2013.01); *G05D 1/0221* (2013.01); *G06N 3/049* (2013.01); *G06N 3/08* (2013.01)

CONSTRUCTION MACHINERY WITH LEARNING FUNCTION

CROSS REFERENCE TO RELATED APPLICATIONS

This application is a national stage entry of International Application No. PCT/JP2020/019977, filed on May 20, 2020, which claims priority based on the Article 8 of Patent Cooperation Treaty from the prior Japanese Patent Applications No. 2019-097381 filed on May 24, 2019 and No. 2019-097382 filed on May 24, 2019, the entire contents of all of which are incorporated herein by reference.

TECHNICAL FIELD

The present disclosure relates to construction machinery with learning function.

BACKGROUND ART

Construction machinery disclosed in Patent Document 1 is known as one example of construction machinery having learning function. This construction machinery learns a target value of an overlapping length of roll-compacted paths in a width direction.

REFERENCE DOCUMENT OF CONVENTIONAL ART

Patent Document

[Patent Document 1] JP6360583B1

DESCRIPTION OF THE DISCLOSURE

Problems to be Solved by the Disclosure

The construction machinery described above cannot learn a work performed by the construction machinery through manipulation by a human, and automatically perform the learned work.

Moreover, when the construction machinery learns the work performed through the manipulation by the human, and a general learning method is simply applied, the learning needs to be achieved at the highest level such that a quality of the work performed by the construction machinery is maintained at the same level as a work manipulated by a highly-skilled operator. Furthermore, the operation of the construction machinery needs to be changed according to modes of the work. However, since variations of work modes are innumerable, enormous amount of learning data and startup period of time for learning are required in order to appropriately control the operation of the construction machinery according to the actual mode of the work. Therefore, it is difficult to achieve the automation of the work performed by the construction machinery within a short period of time.

Moreover, in the construction industry, since the workforce is aging and running short due to the low birthrate and aging population, handing down the skills of the highly-skilled operators is urgent. However, the number of successors is also declining.

The present disclosure is made in order to solve the problems described above, and the first purpose thereof is to provide construction machinery, capable of learning a work performed by the construction machinery through manipulation by a human, and automatically performing the learned work.

In addition to the first purpose, the second purpose of the present disclosure is to provide skill-inheriting construction machinery, capable of taking over (inheriting) skill of a highly-skilled operator in the construction industry, and achieving automation of a given work within a short period of time.

SUMMARY OF THE DISCLOSURE

The present inventors carried out diligent examination in order to solve the above problems, and obtained the following findings as a result.

In construction machinery, an operating part including a working part is driven by a plurality of hydraulic actuators. For example, considering a hydraulic excavator as one example, a boom, an arm, a bucket, and a driver's seat correspond to the operating part, and hydraulic cylinders which rotate the boom, the arm, and the bucket, and a hydraulic motor which rotates the driver's seat correspond to the hydraulic actuators.

Therefore, a manipulating part is comprised of a plurality of manipulation levers corresponding to the number of the plurality of hydraulic actuators, and an operator carries out a work while operating the plurality of manipulation levers. Moreover, the construction machinery performs various works. Therefore, conventionally, it is considered to be difficult to cause the construction machinery to learn the work.

However, the present inventors paid attention to existence of comparatively simple routine work in the construction work. Learning of such a comparatively simple routine work is comparatively easy.

Meanwhile, in a certain device, in order to carry out the learning of the work performed through the manipulation by the operator, it is important to identify information which significantly influences the manipulation by the operator, and to use it as input data during the learning.

In this respect, the present inventors analyzed manipulation by highly-skilled operators, and obtained the following findings as a result.

To put it simply, they found out that the operator visually confirms a state of a work, perceives the current state of operation by construction machinery through visual confirmation and operation of manipulation levers, and senses a reaction from a work-target object, in order to determine the next manipulation.

Considering a digging work performed by a hydraulic excavator as one example, the operator visually confirms a state of the digging, and intuits how a bucket, a boom, and a driver's seat are currently to be operated, through visual confirmation of postures of the bucket and the boom, and through the current manipulated positions of manipulation levers. Moreover, when the bucket acts on the ground (digs the ground, rakes earth and sand, etc.), the operator determines, by sensing the reaction, whether or not an intended work (action) is performed. Then, the operator determines the next manipulation instantly considering these. Here, the reaction is, for example, an inclination, acceleration, and angular acceleration at the driver's seat. Moreover, it also became apparent that the operator puts importance on a speed, noise, etc. of an engine which is a driving source, when he/she determines the next manipulation.

Here, the state of the digging is one example of information indicating the work state. The manipulated position is one example of information indicating the operation state of the hydraulic excavator. The inclination of the driver's seat etc. is one example of reaction from the ground. The noise etc. of the engine is information indicating a state of the driving source, and thus, indicating the operation state of the hydraulic excavator.

Therefore, the present inventors thought to use, as the input data (estimation basic data) during the learning, at least data indicative of the work state, data indicative of the operation state of the operating part, and data indicative of the reaction received by the operating part from the work-target object due to the work performed by the working part. The present disclosure is made in view of such perspectives.

In order to achieve the purpose, construction machinery with learning function according to one aspect of the present disclosure includes an operating part having a working part and configured to move the working part to perform a work, a manipulating part configured to output a command corresponding to operation by an operator, a work-state detecting part configured to detect a state of the work performed by the working part and output the detected work state as work-state data, an operation-state detecting part configured to detect a state of the operation of the operating part and output the detected operation state as operation-state data, a reaction detecting part configured to detect a reaction received by the operating part from a work-target object due to the work performed by the working part, and output the detected reaction as reaction data, a learning data memory configured to store the command in a time series as command data, and store estimation basic data in a time series, the estimation basic data including the work-state data, the operation-state data, and the reaction data, a learning module configured to execute machine learning of the command data stored in the learning data memory by using the estimation basic data stored in the learning data memory, and, after the machine learning, receive an input of the estimation basic data during the operation of the operating part, and output an estimated command of the command, and a hydraulic drive system configured to drive the operating part based on one of the command and the estimated command, or both of the command and the estimated command. Here, the "command data" means data used as teacher data in case of "supervised learning," the "estimation basic data" means data to be inputted to the learning module and used to cause the learning module to estimate an operation command, and the phrase "move the working part" means "cause the working part to operate and move."

According to this configuration, the given work is carried out during the learning while a highly-skilled operator manipulates the construction machinery. Then, the command data corresponding to the command based on the manipulation, and the estimation basic data including the work-state data of the working part, the operation-state data of the operating part, and the data of the reaction received by the operating part from the work-target object due to the work performed by the working part, are stored in the learning data memory. Then, the learning module receives the input of the estimation basic data stored in the learning data memory so as to execute the machine learning of the learning data to output the estimated command. Therefore, the manipulation by the highly-skilled operator can be learned, and outputted as the estimated command. When the estimation basic data is inputted into the learning module after the machine learning is finished, the learning module outputs the estimated command. Then, the hydraulic drive system drives the operating part based on the estimated command. As a result, the manipulation by the highly-skilled operator is learned, and the work is automatically performed based on the estimated command which is outputted from the learning module as a result of the learning.

Therefore, the construction machinery can be provided, which is capable of learning the work performed by the construction machinery through the manipulation by the human, and automatically performing the learned work.

The manipulating part may be configured to output, as the command, an operation command corresponding to the operation by the operator. The learning data memory may be configured to store the operation command in a time series as the command data, and store the estimation basic data in a time series, the estimation basic data including the work-state data, the operation-state data, and the reaction data. The learning module may be configured to execute, during the learning, the machine learning of the command data stored in the learning data memory by using the estimation basic data stored in the learning data memory, and during an automatic control after the machine learning, receive the input of the estimation basic data and output an estimated operation command that is the estimated command. Further, the hydraulic drive system may be configured to drive the operating part according to the operation command or the estimated operation command.

According to this configuration, since the hydraulic drive system is configured to drive the operating part based on the estimated operation command that is the estimated command of the operation command, the work is automatically performed based on the result of the learning of the manipulation by the highly-skilled operator.

The construction machinery may further include a body part provided with the operating part. The reaction detecting part may detect the reaction including at least one of inclination, acceleration, and angular acceleration of the operating part or the body part, and output the detected reaction as the reaction data.

According to this configuration, the estimation basic data includes the inclination, the acceleration, or the angular acceleration of the operating part or the body part, on which the highly-skilled operator puts importance when he/she determines the next manipulation, and thus, the accuracy of the learning improves. Note that, since the operating part is provided to the body part, when the operating part receives the reaction from the work-target object, this reaction influences the body part.

The operation-state detecting part may detect a state of a driving source including at least one of an output and operation noise of the driving source, and output the detected driving-source state as driving-source state data, the driving source driving a pump configured to pump hydraulic oil of the hydraulic drive system. The operation-state data may include the driving-source state data.

According to this configuration, the estimation basic data includes the output or the noise of the driving source, on which the highly-skilled operator puts importance when he/she determines the next manipulation, and thus, the accuracy of the learning improves.

The operation-state data may include the command data. Here, the phrase "the operation-state data includes an operation command" means that, in case of the "supervised learning," the operation command stored in the learning data memory in a time series is sequentially used as the teacher data, and the operation command at a time point "in a time series before" the operation command used as the teacher data, is used as the operation-state data.

According to this configuration, the estimation basic data includes the operation command corresponding to the current position of a manipulation lever (the manipulation part), on which the highly-skilled operator put importance when he/she determines the next manipulation, and thus, the accuracy of the learning improves.

The operation-state detecting part may further include a posture detecting part configured to detect a posture of the operating part and output the detected posture as postural data. The operation-state data may include the postural data.

According to this configuration, the estimation basic data includes the postural data of the operating part, on which the highly-skilled operator puts importance when he/she determines the next manipulation, and thus, the accuracy of the learning improves.

The construction machinery with learning function may be skill-inheriting construction machinery provided with a control part. The manipulating part may be configured to output, as the command, a manual operation correcting command according to operation by the operator. The hydraulic drive system may be configured to drive the operating part according to a basic operation command, an automatic operation correcting command, and the manual operation correcting command. The control part may include a basic-operation commanding module configured to output the basic operation command for causing the working part to take a basic movement by the operating part, an operation-correcting-command generating module configured to generate an operation correcting command by adding the manual operation correcting command to the automatic operation correcting command, the learning data memory comprising an operation-correcting-command memory configured to store the operation correcting command in a time series as the command data and an estimation-basic-data memory configured to store the estimation basic data in a time series, and the learning module. The learning module may be configured to execute machine learning of the operation correcting command stored in the operation-correcting-command memory by using the estimation basic data stored in the estimation-basic-data memory, and, after the machine learning, receive the input of the estimation basic data during the operation of the operating part and output the automatic operation correcting command that is the estimated command.

According to this configuration, the operating part moves the working part, through the hydraulic drive system, according to the basic operation command, the automatic operation correcting command, and the manual operation correcting command. Therefore, when the operation of the operating part is not corrected by the operator and is not applied with the automatic operation correction by the learning module, the operating part causes the working part to take the basic movement according to the basic operation command outputted from the basic-operation commanding module. The operator monitors the motion of the working part while visually checking the work by the working part, and when the basic movement cannot achieve the given work in a highly-skilled manner, the given work is manually corrected to be performed in the highly-skilled manner. Then, the manual operation correcting command corresponding to this manual correction is outputted from the manipulating part to correct the basic movement, and thus, the given work is performed in the highly-skilled manner.

Meanwhile, the manual operation correcting command related to the given work is added to the automatic operation correcting command outputted from the learning module to generate the operation correcting command, and the machine learning of this operation correcting command is executed by the learning module.

When the learning module does not perform the automatic correction as described above, the learning module only learns the manual operation correcting command based on the manual operation correction by the operator. Since the learning module receives the input of the estimation basic data corresponding to the movement of the working part during the operation of the operating part, when an operating state in which the given work is not performed in the highly-skilled manner similarly to the case described above occurs, the operation correcting command estimated by the learning is outputted from the learning module as the automatic operation correcting command. Thus, the basic operation command is automatically corrected to the direction in which the given work is performed in the highly-skilled manner, and if this automatic correction is appropriate, the given operation can be performed in the highly-skilled manner.

However, if the learning is insufficient, or if the operation state of the operating part when the given work is not performed in the highly-skilled manner is greatly different from one estimated by the learning module, the given work is not performed in the highly-skilled manner even when the correction is performed. In this case, the operator manually correct the given work to be performed in the highly-skilled manner, thereby, the given work is performed by the operating part in the highly-skilled manner. Then, the manual operation correcting command corresponding to the additional manual operation correction is added to the automatic operation correcting command corresponding to the previous manual operation correction, and is learned by the learning module.

Therefore, the correcting ability of the learning module to the basic movement of the working part improves. After that, these operations are repeated, and when the correcting ability of the learning module to the basic movement of the working part improves to the equivalent level to that of the operator, the correction to the basic movement of the working part by the operator becomes unnecessary. In this state, the learning module appropriately corrects the basic movement of the working part instead of the operator, and the given work can be appropriately performed by the working part.

In this manner, when the operator is a highly-skilled operator, the manual operation correction by the operator constitutes "skill" of the highly-skilled operator, this "skill" is accumulated in the learning module and handed down to the learning module, and the learning module becomes a "successor" of the "skill" of the highly-skilled operator. As a result, the construction machinery with the learning module becomes "skill-inheriting construction machinery."

Moreover, according to this configuration, the operating part is configured to operate, through the hydraulic drive system, according to the basic operation command, the automatic operation correcting command, and the manual operation correcting command. Therefore, when insufficient automatic operation correcting command is outputted from the learning module, the operator can perform the manual operation correction while watching the movement of the working part so as to cause the operating part to operate appropriately. Thus, appropriate trial and correction of the operation can be performed in the practice at the work site. In other words, since the learning module can learn through the practice at the work site, enormous amount of learning data and startup period of time for the learning module become unnecessary. As a result, the automation of the given work can be achieved in the short period of time.

Moreover, according to this configuration, since a part of the basic movement of the working part related to the given work, which is unnecessary to be corrected, is automatically executed by the basic-operation commanding module, the operator only performs the necessary correction. Therefore, a load for the operator is reduced. Moreover, since the work varies even by the highly-skilled operator, the accuracy of the work improves when only a part of the work is performed through the manipulation by the operator as described above, compared to the case where the entire work is performed through the manipulation by the operator.

Moreover, it can be considered that the skill of the highly-skilled operator is taken over by storing the manual operation correcting command corresponding to the manual operation correction by the operator in the memory. However, since infinite modes exist, in which the basic movement of the working part needs to be corrected, it is actually difficult to take over the skill of the highly-skilled operator in such a method. Meanwhile, by using the learning module as the configuration described above, the learning module learns the manual operation correction (accurately, the manual operation correcting command) according to the mode every time the correction of the basic movement of the working part is required, and thus, the taking over of the skill of the highly-skilled operator can be achieved easily.

Further, according to this configuration, during the operation of the operating part, the highly-skilled operator manipulates the construction machinery to perform the given work while correcting as necessary the movement of the working part based on the basic operation command and the automatic operation correcting command. Then, the estimation basic data including the work-state data of the working part, the operation-state data of the operating part, and the data of the reaction received by the operating part from the work-target object due to the work performed by the working part, is stored in the estimation-basic-data memory, and the operation correcting command adding the manual operation correcting command to the automatic operation correcting command is stored in the operation-correcting-command memory. Then, during the learning after that, the learning module performs the machine learning of the operation correcting command stored in the operation-correcting-command memory by using the estimation basic data stored in the estimation-basic-data memory. Therefore, the correcting manipulation by the highly-skilled operator can be learned to be outputted as the automatic operation correcting command. Then, during the later given work, when the learning module receives the input of the estimation basic data, it outputs the automatic operation correcting command. Then, the hydraulic drive system drives the operating part while reflecting the basic operation command and this automatic operation correcting command. Consequently, the work reflecting the automatic operation correcting command as a result of the learning of the correcting manipulation by the highly-skilled operator, is performed. Therefore, the construction machinery can be provided, which is capable of learning the work performed by the construction machinery while the operator corrects the basic operation of the working part caused by the basic-operation commanding module, and automatically performing the learned work.

According to this, the skill-inheriting construction machinery can be provided, which is capable of taking over the skill of the highly-skilled operator in the construction industry, and achieving the automation of the given work in the short period of time.

The manual operation correcting command may be an electrical command signal. The operating part may include a hydraulic actuator configured to drive the working part, and a control valve configured to hydraulically control operation of the hydraulic actuator according to the basic operation command, the automatic operation correcting command, and the manual operation correcting command. The control valve may be an electromagnetic valve.

According to this configuration, since the manual operation correcting command is the electrical command signal, the manual operation correcting command can be directly converted into numerical data. Thus, the addition of the basic operation command, the automatic operation correcting command, and the manual operation correcting command, the addition of the automatic operation correcting command and the manual operation correcting command, and the storing of the operation correcting command in the memory, can easily be performed. Therefore, the configuration related to these processing operations can be simplified, compared to a case where the manual operation correcting command is a hydraulic signal and the control valve is a hydraulic control valve.

Effects of the Disclosure

The present disclosure can provide construction machinery, which is capable of learning a work performed by the construction machinery through a manipulation by a human, and automatically performing the learned work.

Moreover, the particular aspect of the present disclosure can provide skill-inheriting construction machinery, which is capable of taking over skill of a highly-skilled operator in the construction industry, and achieving automation of a given work in a short period of time.

MODES FOR CARRYING OUT THE DISCLOSURE

Figure 1:
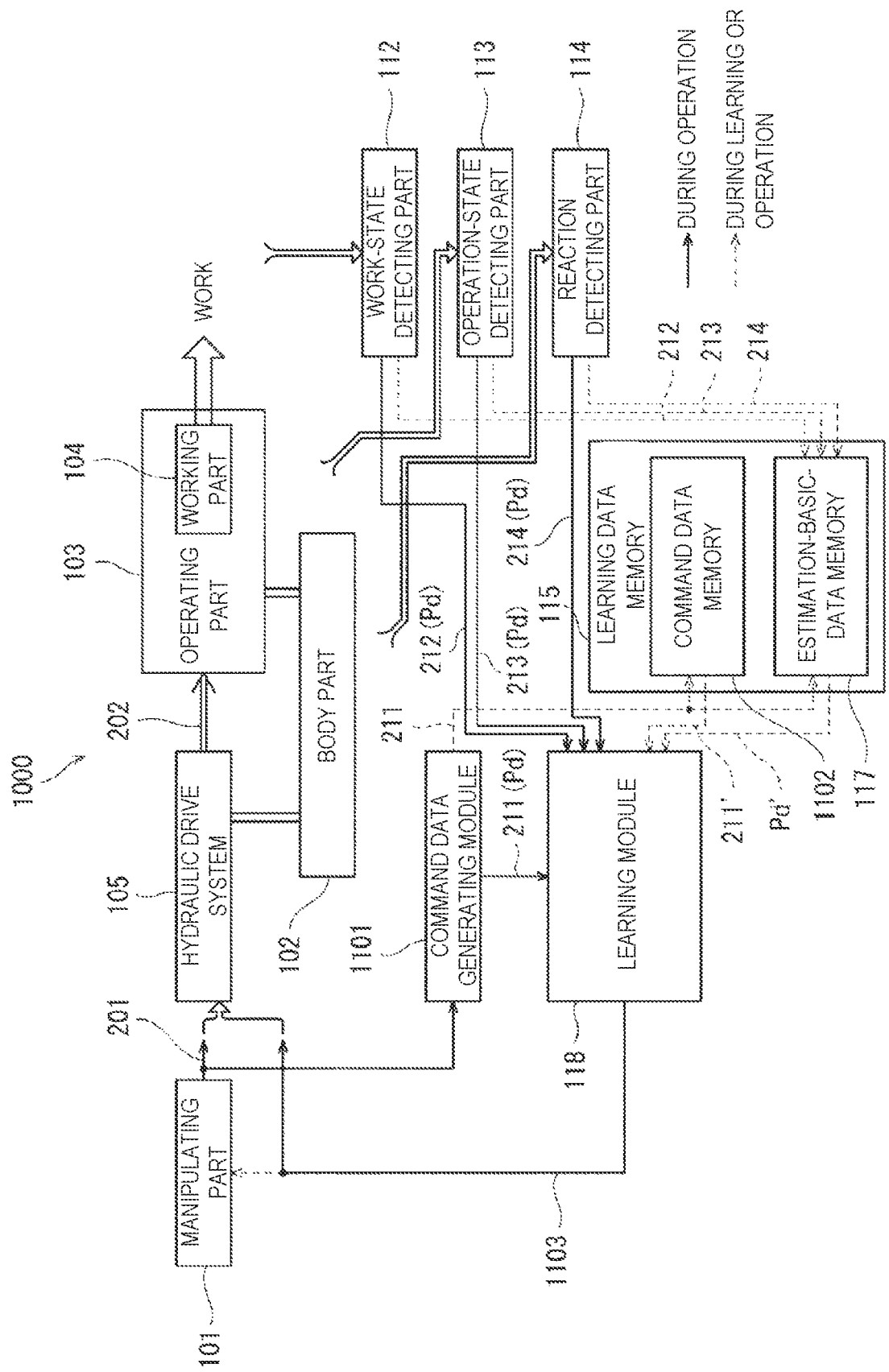
FIG. 1 is a functional block diagram illustrating a concept of construction machinery with learning function according to one embodiment of the present disclosure.

Hereinafter, embodiments of the present disclosure are described with reference to the drawings. Note that the same reference characters are given to the same or corresponding elements throughout the drawings to omit redundant description. Moreover, the present disclosure is not limited to the following embodiments.

(Concept)

FIG. 1 is a functional block diagram illustrating a concept of construction machinery with learning function according to one embodiment of the present disclosure.

Referring to FIG. 1, construction machinery 1000 with learning function according to this embodiment of the present disclosure is provided with a working part 104, an operating part 103, a manipulating part 101, a work-state detecting part 112, an operation-state detecting part 113, a reaction detecting part 114, a learning data memory 115, a learning module 118, and a hydraulic drive system 105. The operating part 103 moves the working part 104 to perform a work. The manipulating part 101 outputs a command 201 according to operation by an operator. The work-state detecting part 112 detects a state of the work performed the working part 104, and outputs the detected work state as work-state data 212. The operation-state detecting part 113 detects a state of operation of the operating part 103, and outputs the detected operation state as operation-state data 213. The reaction detecting part 114 detects a reaction received by the operating part 103 from a work-target object as a result of the work performed by the working part 104, and outputs the detected reaction as reaction data 214. The learning data memory 115 stores the command 201 in a time series as command data 211, and also stores, in a time series, estimation basic data Pd including the work-state data 212, the operation-state data 213, and the reaction data 214. The learning module 118 executes machine learning of the command data 211 stored in the learning data memory 115, by using the estimation basic data Pd stored in the learning data memory 115, and then, when the operating part 103 operates, the learning module 118 receives an input of the estimation basic data Pd and outputs an estimated command 1103 of the command 201. The hydraulic drive system 105 drives the operating part 103 based on the command 201 or the estimated command 1103, or based on the command 201 and the estimated command 1103.

A reference character "102" indicates a body part of the construction machinery 1000 with learning function. The operating part 103 and the hydraulic drive system 105 are provided to the body part 102.

A command data generating module 1101 generates the command data 211 based on the command 201. The command data 211 is generated, for example, in a mode in which a command in a hydraulic pressure outputted from the manipulating part 101 is converted into the command data (Embodiments 1 to 3), and a mode in which the estimated command outputted from the learning module 118 is added to the command outputted from the manipulating part 101 (Embodiments 4 to 7).

The learning data memory 115 is provided with a command data memory 1102 and an estimation-basic-data memory 117. The command data memory 1102 stores the command data 211 during the learning or the operation, and outputs it to the learning module 118 as command data 211' for learning during the learning. The estimation-basic-data memory 117 stores the estimation basic data Pd (212 to 214) during the learning or the operation, and outputs it to the learning module 118 as estimation basic data Pd' for learning during the learning.

Such construction machinery 1000 with learning function carries out a given work during the learning (in the last operation in Embodiments 4 to 7) while a highly-skilled operator manipulates the construction machinery. Then, the command data 211 corresponding to the command based on the manipulation, and the estimation basic data Pd including the work-state data 212 of the working part 104, the operation-state data 213 of the operating part 103, and the data 214 of the reaction received by the operating part 103 from the work-target object due to the work performed by the working part 104, are stored in the learning data memory 115. Then, the learning module 118 receives the input of the estimation basic data Pd' stored in the learning data memory 115 so as to execute the machine learning of the learning data 211' and Pd' to output the estimated command 1103. Therefore, the manipulation by the highly-skilled operator can be learned, and outputted as the estimated command 1103. When the estimation basic data Pd is inputted into the learning module 118 after the machine learning is finished, the learning module 118 outputs the estimated command 1103. Then, the hydraulic drive system 105 drives the operating part 103 based on the estimated command 1103. As a result, the manipulation by the highly-skilled operator is learned, and the work is automatically performed based on the estimated command 1103 which is outputted from the learning module 118 as a result of the learning.

Accordingly, the construction machinery 1000 can be provided, which is capable of learning the work performed by the construction machinery through the manipulation by the human, and automatically performing the learned work.

Hereinafter, embodiments of the concept of the construction machinery 1000 with learning function are described in order. The following embodiments are roughly classified into Embodiments 1 to 3 relating to the construction machinery with learning function, and Embodiments 4 to 7 relating to skill-inheriting construction machinery capable of taking over skill of a highly-skilled operator in the construction industry, and achieving automation of a given work within a short period of time.

Embodiment 1

{Outline}

First, an outline of construction machinery with learning function according to Embodiment 1 is described.

[Configuration]

Figure 2:
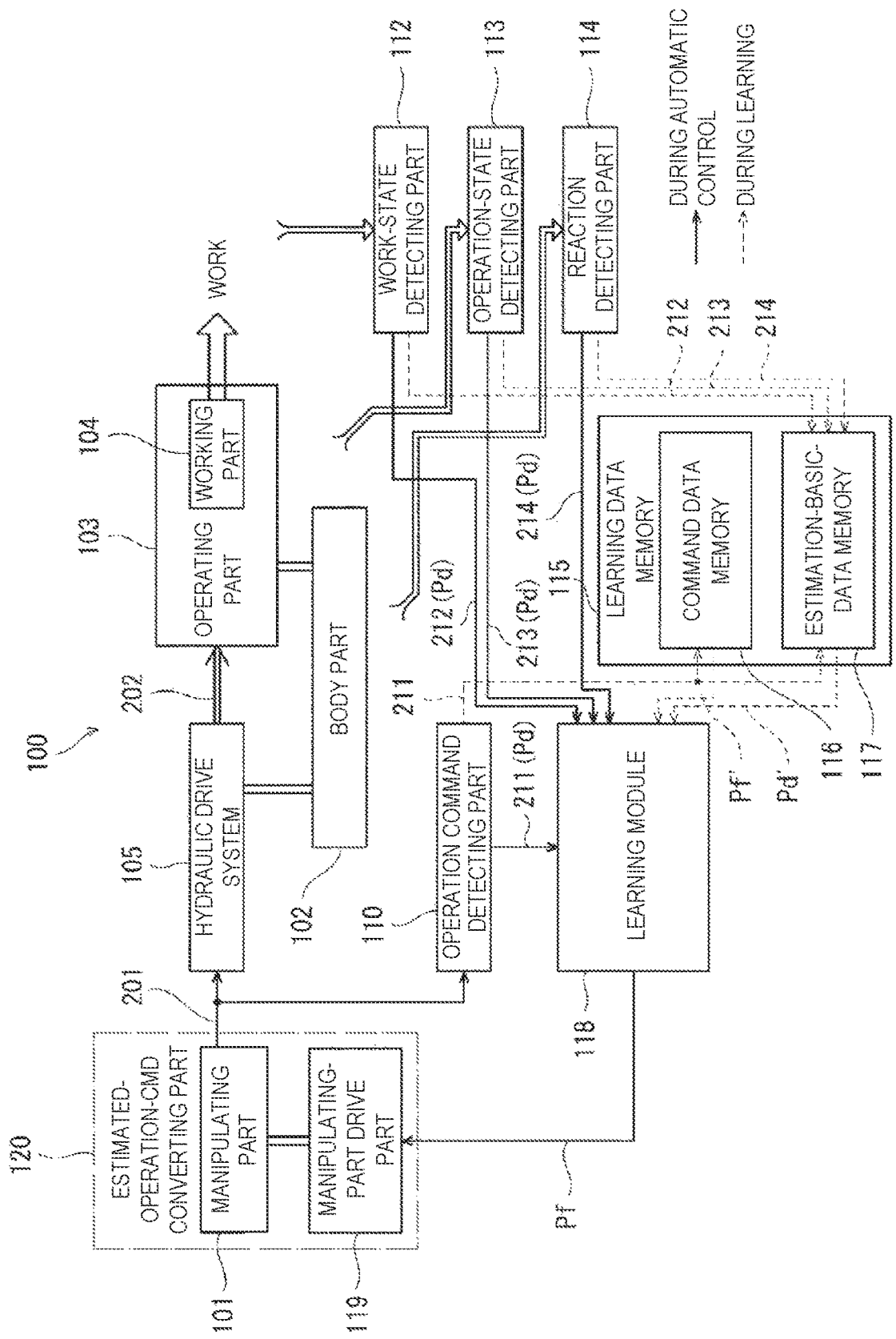
FIG. 2 is a functional block diagram illustrating a configuration of a control system of the construction machinery with learning function according to Embodiment 1 of the present disclosure.

FIG. 2 is a functional block diagram illustrating a configuration of a control system of the construction machinery with learning function according to Embodiment 1 of the present disclosure. In FIG. 2, each arrow indicates a flow of a command, a motive power, information, or data. Each solid-line arrow indicates a flow of a command or data during the automatic control, and each broken line indicates a flow of a command or data during the learning. Note that, as described later, when the estimation basic data in the past is used for the learning, the data flow is as indicated by the broken lines even during the automatic control. This similarly applies to FIGS. 6, 11, and 13.

Referring to FIG. 2, construction machinery 100 with learning function is provided with the manipulating part 101, the body part 102, the operating part 103, the hydraulic drive system 105, an operation command detecting part 110, the work-state detecting part 112, the operation-state detecting part 113, the reaction detecting part 114, the learning data memory 115, the learning module 118, and a manipulating-part drive part 119. Moreover, the construction machinery 100 with learning function has an overall-controlling module and an operation-mode-switching manipulation part (neither of them is illustrated), and according to operation to the operation-mode-switching manipulation part by the operator, the overall-controlling module switches an operation mode of the construction machinery 100 with learning function between a learning mode and an automatic control mode. Below, a time during which the construction machinery 100 with learning function is operated in the learning mode is referred to as "during the learning," and a time during which the construction machinery 100 with learning function is operated in the automatic control mode is referred to as "during the automatic control."

In Embodiment 1, the manipulating part 101 outputs the operation command 201 as a command corresponding to the operation by the operator. The learning data memory 115 stores the operation command in a time series as the command data 211, and also stores, in a time series, the estimation basic data Pd including the work-state data 212, the operation-state data 213, and the reaction data 214. The learning module 118 executes, during the learning, the machine learning of the command data 211' stored in the learning data memory 115, by using the estimation basic data Pd' stored in the learning data memory 115, and during the automatic control after the machine learning, the learning module 118 receives the input of the estimation basic data Pd, and outputs an estimated operation command Pf which is the estimated command 1103. The hydraulic drive system 105 drives the operating part 103 based on the operation command 201 or the estimated operation command Pf. Note that the operation command 201 is converted into the command data 211 by the operation command detecting part 110 as the command data generating module 1101.

Below, the configuration of the construction machinery 100 with learning function is described in detail.

The manipulating part 101 outputs the operation command 201 according to the operation by the operator.

The body part 102 is coupled to the operating part 103.

The operating part 103 has the working part 104 which performs the work, and moves the working part 104 to perform the work. Here, the phrase "move the working part 104" means "cause the working part 104 to operate and move."

The "construction machinery" may be any work machine, as long as it can perform a construction work by the operating part moving the working part according to the manipulation by the operator. The "construction machinery" may be, for example, a hydraulic excavator, a bulldozer, a tractor excavator, a wheeled loader, a trencher, an excavator, a crane, a lift vehicle, etc.

The hydraulic drive system 105 is provided over the body part 102 and the operating part 103. The hydraulic drive system 105 outputs a drive force 202 based on the operation command 201 outputted from the manipulating part 101 or the estimated operation command Pf outputted from the learning module 118, thus driving the operating part 103.

The operation command detecting part 110 detects the operation command 201 outputted from the manipulating part 101, and outputs it as the command data 211. In detail, when the operation command 201 is a command in a hydraulic pressure (pilot pressure command), it is converted into the command data 211 which is electrical data, to be outputted. Therefore, the operation command detecting part 110 is not an essential element. When the operation command 201 is an electrical command, the operation command detecting part 110 may be omitted, and the operation command 201 may be directly inputted into a command data memory 116 (described later) and the learning module 118. In a hydraulic excavator 10 with learning function (described later), the operation command 201 which is an acceleration command (electrical command) outputted from an acceleration device 50, is directly inputted into the command data memory 116 and the learning module 118.

The work-state detecting part 112 detects a state of the work performed by the working part 104, and outputs the detected work state as the work-state data 212.

The operation-state detecting part 113 detects a state of the operation of the operating part 103, and outputs the detected operation state as the operation-state data 213.

The estimation basic data includes the work-state data 212, the operation-state data 213, and the reaction data 214. For convenience, the reference character "Pd" is given to the estimation basic data used during the learning, and the reference character "Pd" is given to the estimation basic data used during the automatic control. Moreover, the estimation basic data may include the command data 211.

The reaction detecting part 114 detects the reaction received by the operating part 103 or the body part 102 from the work-target object due to the work performed by the working part 104, and outputs the detected reaction as the reaction data 214.

The learning data memory 115 is provided with the command data memory 116 and the estimation-basic-data memory 117.

The command data memory 116 stores the command data 211 in a time series as the command data memory 1102. The estimation-basic-data memory 117 stores, in a time series, the estimation basic data Pd including the command data 211, the work-state data 212, the operation-state data 213, and the reaction data 214.

The learning module 118 is a learning model which performs the machine learning. The learning model is, for example, a neural network model, a regression model, a tree model, a Bayesian model, a time-series model, a cluster model, an ensemble learning model, etc. In this embodiment, the learning model is the neural network model. The mode of the learning may be supervised or unsupervised learning. Moreover, it may be deep learning.

For example, in case of the supervised learning, the learning module 118 reads, during the learning, the command data stored in the command data memory 116 as command data Pf for learning, and also reads the estimation basic data stored in the estimation-basic-data memory 117 as the estimation basic data Pd' for learning. Then, learning data is created using the command data Pf for learning as teacher data, and the estimation basic data Pd' for learning as input data. Then, the estimation basic data Pd', which is the input data, is inputted into the machine learning model (e.g., the neural network), a difference between an output and the teacher data Pf is evaluated, and the evaluation is fed back to the machine learning model. Accordingly, the machine learning model can execute the machine learning of the learning data. After the machine learning is finished, the learning module 118 outputs the output of the machine learning model to outside as the estimated operation command Pf. In detail, during the automatic control, when the machine-learning model of the learning module 118 receives the input of the estimation basic data Pd, it outputs the estimated operation command Pf.

The manipulating-part drive part 119 operates, during the automatic control, the manipulating part 101 based on the estimated operation command Pf outputted from the learning module 118. Therefore, the operation command 201 is outputted from the manipulating part 101, and the hydraulic drive system 105 drives the operating part 103 based on the operation command 201. That is, the manipulating-part drive part 119 and the manipulating part 101 function as an estimated-operation-command converting part 120 which converts the estimated operation command Pf into the operation command 201. The manipulating-part drive part 119 is comprised of, for example, a motor, a manipulator (robot), etc.

Therefore, the manipulating-part drive part 119 is not an essential element. For example, instead of the manipulating-part drive part 119, an estimated-operation-command converting part which converts the estimated operation command Pf, which is an electrical command signal, into a command in the hydraulic pressure (pilot pressure command) may be provided, and during the automatic control, the output from the estimated-operation-command converting part may be inputted into the hydraulic drive system 105, instead of the operation command from the manipulating part 101. The estimated-operation-command converting part may be comprised of a pilot valve which is an electromagnetic valve (electromagnetic proportional valve). Note that, when the construction machinery 100 with learning function outputs from the manipulating part 101 the operation command 201 which is the electrical command, the estimated-operation-command converting part 120 is unnecessary, and the estimated operation command Pf outputted from the learning module 118 is directly inputted into the hydraulic drive system 105.

In this manner, the hydraulic drive system 105 drives the operating part 103 based on the estimated operation command Pf converted into the operation command by the manipulating-part drive part 119 and the manipulating part 101.

[Operation]

During the learning, the highly-skilled operator manipulates the construction machinery 100 with learning function to perform a given work. Then, the command data 211 corresponding to the operation command 201 according to the manipulation, and the estimation basic data are stored in the learning data memory 115. The estimation basic data includes the work-state data 212 indicating the state of the work performed by the working part 104, the operation-state data 213 indicating the state of the operation of the operating part, and the reaction data 214 indicating the reaction received by the operating part 103 or the body part 102 from the work-target object due to the work performed by the working part 104. The given work is, for example, a comparatively simple routine work. The routine work may be, for example, a digging work, a ground leveling work, and a rolling compaction work.

Then, during the learning, the learning module 118 reads the command data stored in the command data memory 116 as the command data Pf for learning, and reads the estimation basic data stored in the estimation-basic-data memory 117 as the estimation basic data Pd' for learning. Then, the learning data is created using the command data Pf for learning as the teacher data, and the estimation basic data Pd' for learning as the input data, and the learning module 118 executes the machine learning of the learning data. After the machine learning is finished, when the learning module 118 receives the input of the estimation basic data Pd during the automatic control, it outputs the estimated operation command Pf. Accordingly, the hydraulic drive system 105 drives the operating part 103 based on the estimated operation command Pf converted into the operation command 201 by the manipulating-part drive part 119 and the manipulating part 101. As a result, the manipulation by the highly-skilled operator is learned, and the work is automatically performed based on the estimated operation command Pf which is outputted from the learning module 118 as a result of the learning.

As described above, according to Embodiment 1, the hydraulic drive system 105 drives the operating part 103 based on the estimated operation command Pf which is the estimated command of the operation command 201. Therefore, the work is automatically performed based on the result of the learning of the manipulation by the highly-skilled operator.

{Concrete Configuration}

Next, a concrete configuration of the construction machinery 100 with learning function is described, taking the hydraulic excavator 10 as one example of the construction machinery.

[Configuration of Hardware]
<Entire Configuration>

First, the entire configuration of the hydraulic excavator 10 with learning function is described.

Figure 3:
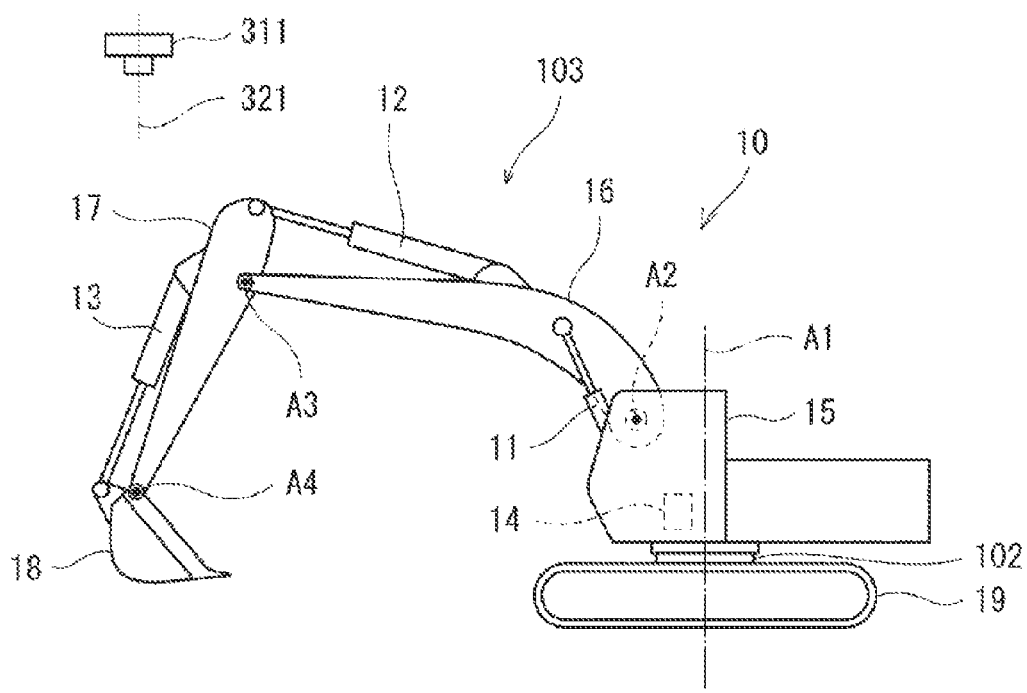
FIG. 3 is a side view illustrating a configuration of hardware of a hydraulic excavator with learning function, which is one example of the construction machinery with learning function.

FIG. 3 is a side view illustrating a configuration of hardware of the hydraulic excavator 10 with learning function, which is one example of the construction machinery with learning function.

The hydraulic excavator 10 with learning function (hereinafter, may simply be referred to as a "hydraulic excavator") is provided with the body part 102. The body part 102 is provided with a traveling body (carrier) 19. The traveling body 19 is comprised of, for example, a vehicle traveling device provided with a continuous track (caterpillar).

A swiveling body 15 is provided on the body part 102 so as to be swivable about a vertical first rotary axis A1. The swiveling body 15 is provided with a driver's seat (not illustrated), and the manipulating part 101 is provided to the driver's seat (see FIG. 6). Note that, although not illustrated in the manipulating part 101 of FIG. 6, a travel-manipulating device which operates the traveling body 19 is provided to the driver's seat. The swiveling body 15 is further provided with a swiveling motor 14 which causes the swiveling body 15 to swivel. The swiveling motor 14 is comprised of a hydraulic motor. The swiveling body 15 is also provided with an engine 26 (see FIG. 6) for traveling. The engine 26 drives a pump part 107 (see FIG. 6) of a hydraulic drive system 1 during the work.

A base-end part of a boom 16 is coupled to the swiveling body 15 so as to be pivotable about a horizontal second rotary axis A2. A tip-end part and a base-end part of a boom cylinder 11 are rotatably coupled to the base-end part of the boom 16 and the swiveling body 15, respectively, and the boom 16 swings centering on the second rotary axis A2 according to the extension and contraction of the boom cylinder 11.

A base-end part of an arm 17 is coupled to a tip-end part of the boom 16 so as to be pivotable about a horizontal third rotary axis A3. A tip-end part and a base-end part of an arm cylinder 12 are rotatably coupled to the base-end part of the arm 17 and the middle part of the boom 16, respectively, and the arm 17 swings centering on the third rotary axis A3 according to the extension and contraction of the arm cylinder 12.

A base-end part of a bucket 18 is coupled to a tip-end part of the arm 17 so as to be pivotable about a horizontal fourth rotary axis A4. A tip-end part and a base-end part of a bucket cylinder 13 are rotatably coupled to the base-end part of the bucket 18 and the base-end part of the arm 17, respectively, and the bucket 18 pivots centering on the fourth rotary axis A4 according to the extension and contraction of the bucket cylinder 13. The bucket 18 is one example of an attachment, and other attachments may be used.

The boom 16, the arm 17, and the bucket 18 constitute a front-work device. Moreover, the bucket 18 constitutes the working part 104, and the swiveling body 15 and the front-work device (the boom 16, the arm 17, and the bucket 18) constitute the operating part 103.

In addition to the above structures, the hydraulic excavator 10 is provided with a left-and-right pair of hydraulic traveling motors (not illustrated).

The operator carries out a desired work by operating the manipulating part 101 (including the travel-manipulating device (not illustrated)) to position the hydraulic excavator at a desired location, to swivel the swiveling body 15, to change postures of the booms 16 and 17, and to rotary-drive the bucket 18.

The hydraulic excavator 10 with learning function is further provided with a first imaging device 311. The first imaging device 311 images the state of the work performed by the bucket 18. The image captured by the first imaging device 311 is applied with image processing by an image processing module 312 (see FIG. 6) described later, so that data indicative of the work state can be obtained, and is outputted from the image processing module 312 as the work-state data 212. An optical axis 321 of the first imaging device 311 is oriented toward the work-target object.

The first imaging device 311 is comprised of, for example, a three-dimensional (3D) camera, a camera with a depth sensor, etc. The first imaging device 311 is, for example, fixed via a suitable support member to the body part 102, fixed via a suitable support member to a fixed object (e.g., the ground) separated from the vehicle of the hydraulic excavator 10, or mounted on a drone.

<Hydraulic Drive System 1>

Next, the hydraulic drive system 1 which causes the hydraulic excavator 10 to operate, is described.

Figure 4:
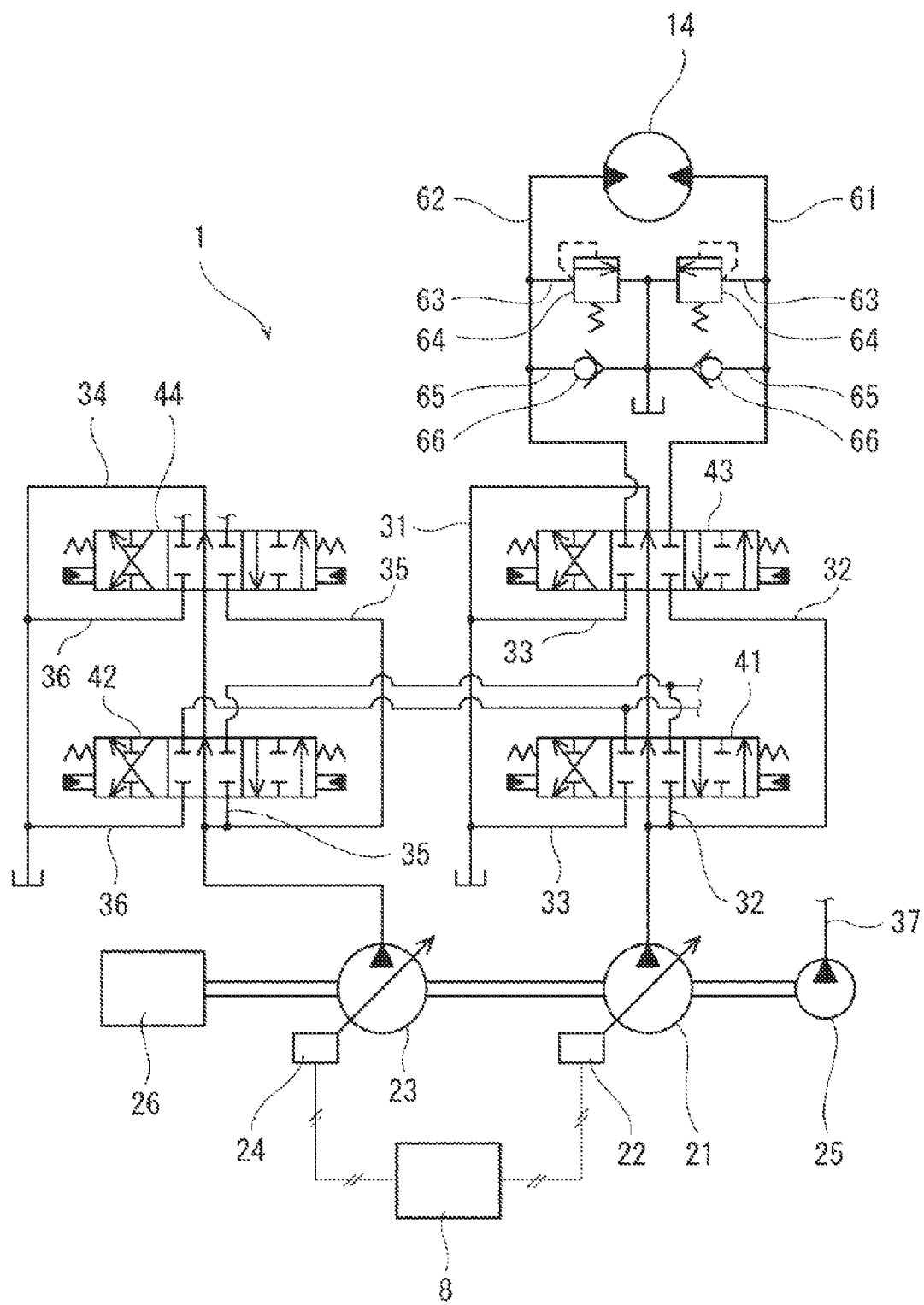
FIG. 4 is a hydraulic circuit diagram illustrating a main hydraulic circuit in a hydraulic drive system of the hydraulic excavator with learning function illustrated in FIG. 3.
Figure 5:
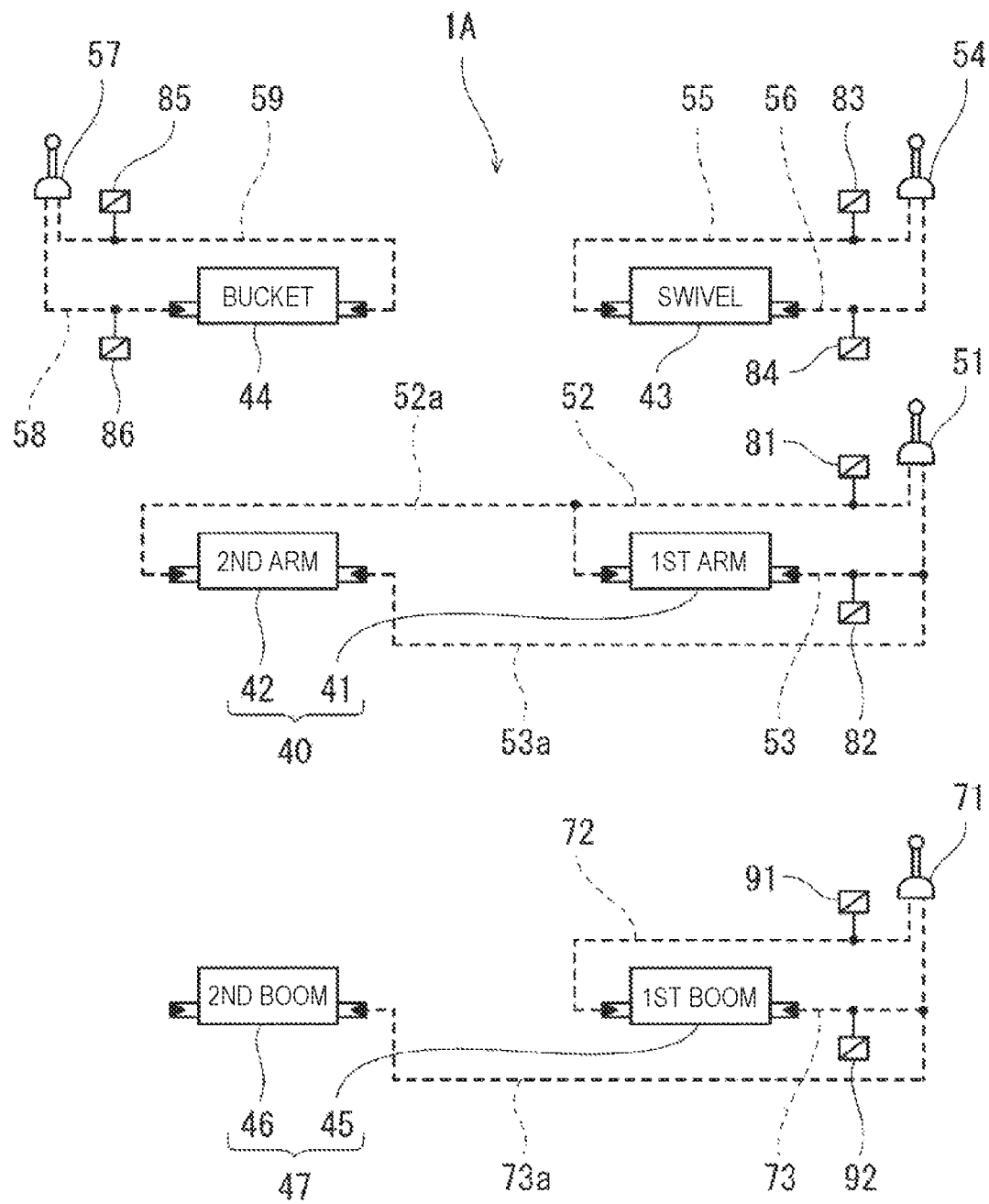
FIG. 5 is a hydraulic circuit diagram illustrating a hydraulic circuit of an operation system in the hydraulic drive system of the hydraulic excavator with learning function illustrated in FIG. 3.

FIG. 4 is a hydraulic circuit diagram illustrating a main hydraulic circuit of the hydraulic drive system 1 of the hydraulic excavator 10 with learning function. FIG. 5 is a hydraulic circuit diagram illustrating a hydraulic circuit of an operation system (operating-system hydraulic circuit) in the hydraulic drive system of the hydraulic excavator 10 with learning function. The main hydraulic circuit and the operating-system hydraulic circuit are provided to the swiveling body 15.

As described above, the hydraulic drive system 1 includes the boom cylinder 11, the arm cylinder 12, and the bucket cylinder 13 as hydraulic actuators, and also includes the swiveling motor 14 and the left-and-right pair of hydraulic traveling motors (not illustrated).

Referring to FIG. 4, the hydraulic drive system 1 includes a first main pump 21 and a second main pump 23, which supply hydraulic oil to the actuators described above. Note that, in FIG. 4, illustration of the actuators other than the swiveling motor 14 is omitted for simplification of the drawing.

The first main pump 21 and the second main pump 23 are driven by the engine 26. The engine 26 also drives a sub pump 25. The first main pump 21, the second main pump 23, and the sub pump 25 constitute the pump part 107 (see FIG. 6). An output of the engine 26 is adjusted by the acceleration device 50 (see FIG. 6). The acceleration device 50 is provided with, for example, an accelerator pedal, and outputs to an engine controlling device (not illustrated) an acceleration command which is an electrical command corresponding to an amount of depression of the accelerator pedal. The engine controlling device controls the output (speed) of the engine 26 based on the acceleration command.

The first main pump 21 and the second main pump 23 are, for example, variable displacement pumps which discharge hydraulic oil in an amount corresponding to a tilt angle. Here, the first main pump 21 and the second main pump 23 are swash plate pumps which define their tilt angles by angles of swash plates. However, the first main pump 21 and the second main pump 23 may be bent axis pumps which define their tilt angles by angles each formed between a drive shaft and a cylinder block.

An amount of discharge Q1 of the first main pump 21, and an amount of discharge Q2 of the second main pump 23 are controlled in an electric positive control method. In detail, the tilt angle of the first main pump 21 is adjusted by a first flow-amount adjusting device 22, and the tilt angle of the second main pump 23 is adjusted by a second flow-amount adjusting device 24. The sub pump 25 is connected to the first flow-amount adjusting device 22 and the second flow-amount adjusting device 24 via a sub bleed line 37. The sub pump 25 functions as a drive source of the first flow-amount adjusting device 22 and the second flow-amount adjusting device 24. Details of the first flow-amount adjusting device 22 and the second flow-amount adjusting device 24 will be described later.

A first center bleed line 31 is extended from the first main pump 21 to a tank. A plurality of control valves including a first arm control valve 41 and a swivel control valve 43 (only the first arm control valve 41 and the swivel control valve 43 are illustrated) are provided on the first center bleed line 31. The control valves are connected to the first main pump 21 through pump lines 32, respectively. That is, the control valves on the first center bleed line 31 are parallelly connected to the first main pump 21. Moreover, the control valves are connected to the tank through tank lines 33, respectively.

Similarly, a second center bleed line 34 is extended from the second main pump 23 to a tank. A plurality of control valves including a second arm control valve 42 and a bucket control valve 44 (only the second arm control valve 42 and the bucket control valve 44 are illustrated) are provided on the second center bleed line 34. The control valves are connected to the second main pump 23 through pump lines 35, respectively. That is, the control valves on the second center bleed line 34 are parallelly connected to the second main pump 23. Moreover, the control valves are connected to the tank through tank lines 36, respectively.

The first arm control valve 41 controls, together with the second arm control valve 42, supply and discharge of hydraulic oil to the arm cylinder 12. That is, the hydraulic oil is supplied to the arm cylinder 12 from the first main pump 21 through the first arm control valve 41, as well as from the second main pump 23 through the second arm control valve 42. The first arm control valve 41 and the second arm control valve 42 constitute an arm control valve 40 (see FIG. 5).

The swivel control valve 43 controls supply and discharge of hydraulic oil to the swiveling motor 14. That is, the hydraulic oil is supplied to the swiveling motor 14 from the first main pump 21 through the swivel control valve 43. In detail, the swiveling motor 14 is connected to the swivel control valve 43 through a pair of supply-and-discharge lines 61 and 62. Bypass lines 63 are branched from the supply-and-discharge lines 61 and 62, respectively, and are connected to a tank. Each bypass line 63 is provided with a relief valve 64. Moreover, the supply-and-discharge lines 61 and 62 are connected to the tank through a pair of makeup lines 65, respectively. Each makeup line 65 is provided with a check valve 66 which allows the flow from the tank to the supply-and-discharge line (61 or 62), but prohibits a backflow.

The bucket control valve 44 controls supply and discharge of hydraulic oil to the bucket cylinder 13. That is, the hydraulic oil is supplied to the bucket cylinder 13 from the second main pump 23 through the bucket control valve 44.

Although not illustrated in FIG. 4, the control valves on the second center bleed line 34 include a first boom control valve 45 (see FIG. 5), and the control valves on the first center bleed line 31 include a second boom control valve 46 (see FIG. 5). The second boom control valve 46 is a valve dedicated for operation of lifting the boom. That is, during the lifting of the boom, hydraulic oil is supplied to the boom cylinder 11 through the first boom control valve 45 and the second boom control valve, and during lowering of the boom, hydraulic oil is supplied through only the first boom control valve 45.

As illustrated in FIG. 5, a boom control valve 47 (the first boom control valve 45 and the second boom control valve) is operated by a boom manipulation device 71. The arm control valve 40 (the first arm control valve 41 and the second arm control valve 42) is operated by an arm manipulation device 51. The swivel control valve 43 is operated by a swivel manipulation device 54. The bucket control valve 44 is operated by a bucket manipulation device 57. Each of the boom manipulation device 71, the arm manipulation device 51, the swivel manipulation device 54, and the bucket manipulation device 57 includes a manipulation lever, and a manipulation signal (command) corresponding to a tilt angle of the manipulation lever is outputted.

In this embodiment, each of the boom manipulation device 71, the arm manipulation device 51, the swivel manipulation device 54, and the bucket manipulation device 57, is comprised of a pilot valve which outputs a pilot pressure command corresponding to the tilt angle of the manipulation lever. Therefore, the arm manipulation device 51 is connected to a pair of pilot ports of the first arm control valve 41 through a pair of pilot lines 52 and 53, the swivel manipulation device 54 is connected to a pair of pilot ports of the swivel control valve 43 through a pair of pilot lines 55 and 56, the bucket manipulation device 57 is connected to a pair of pilot ports of the bucket control valve 44 through a pair of pilot lines 58 and 59, and the boom manipulation device 71 is connected to a pair of pilot ports of the first boom control valve 45 through a pair of pilot lines 72 and 73. Moreover, a pair of pilot ports of the second arm control valve 42 are connected to the pilot lines 52 and 53 through a pair of pilot lines 52a and 53a, respectively. Moreover, in the second boom control valve 46, only a pilot port for lifting the boom is connected to the pilot line 73 through a pilot line 73a, and the other pilot port is not connected to the pilot line 72. Therefore, the second boom control valve 46 does not operate when the boom manipulation device 71 is operated to lower the boom.

Note that each manipulation device may be comprised of an electrical joystick which outputs an electrical signal (command) corresponding to a tilt angle of a manipulation lever, and a pair of electromagnetic proportional valves may be provided to the pilot ports of corresponding control valve.

The pilot lines 52, 53, 55, 56, 59, 58, 72, and 73 are provided with pressure sensors 81 to 86, 91, and 92 which detect pressures of the pilot pressure commands, respectively. Note that the pressure sensors 81 and 82 which detect the pressures of the pilot pressure command outputted from the arm manipulation device 51 may be provided to the pilot lines 52a and 53a, respectively. The pressure sensors 81 to 86, 91, and 92 constitute the operation command detecting part 110 (see FIG. 6).

The first flow-amount adjusting device 22 and the second flow-amount adjusting device 24 described above are electrically controlled by a flow-amount controlling device 8. For example, the flow-amount controlling device 8 has a memory (e.g., a ROM and a RAM) and a CPU, and a program stored in the ROM is executed by the CPU. The flow-amount controlling device 8 controls the first flow-amount adjusting device 22 and the second flow-amount adjusting device 24 so that the tilt angles of the first main pump 21 and/or the second main pump 23 increase as the pilot pressure commands (manipulation signals) detected by the pressure sensors 81 to 86, 91, and 92 increase. For example, when the swiveling manipulation alone is performed, the flow-amount controlling device 8 controls the first flow-amount adjusting device 22 so that the tilt angle of the first main pump 21 increases as the pilot pressure command outputted from the swivel manipulation device 54 increases.

[Configuration of Control System]

Next, a configuration of a control system of the hydraulic excavator 10 with learning function is described.

<Entire Configuration>

Figure 6:
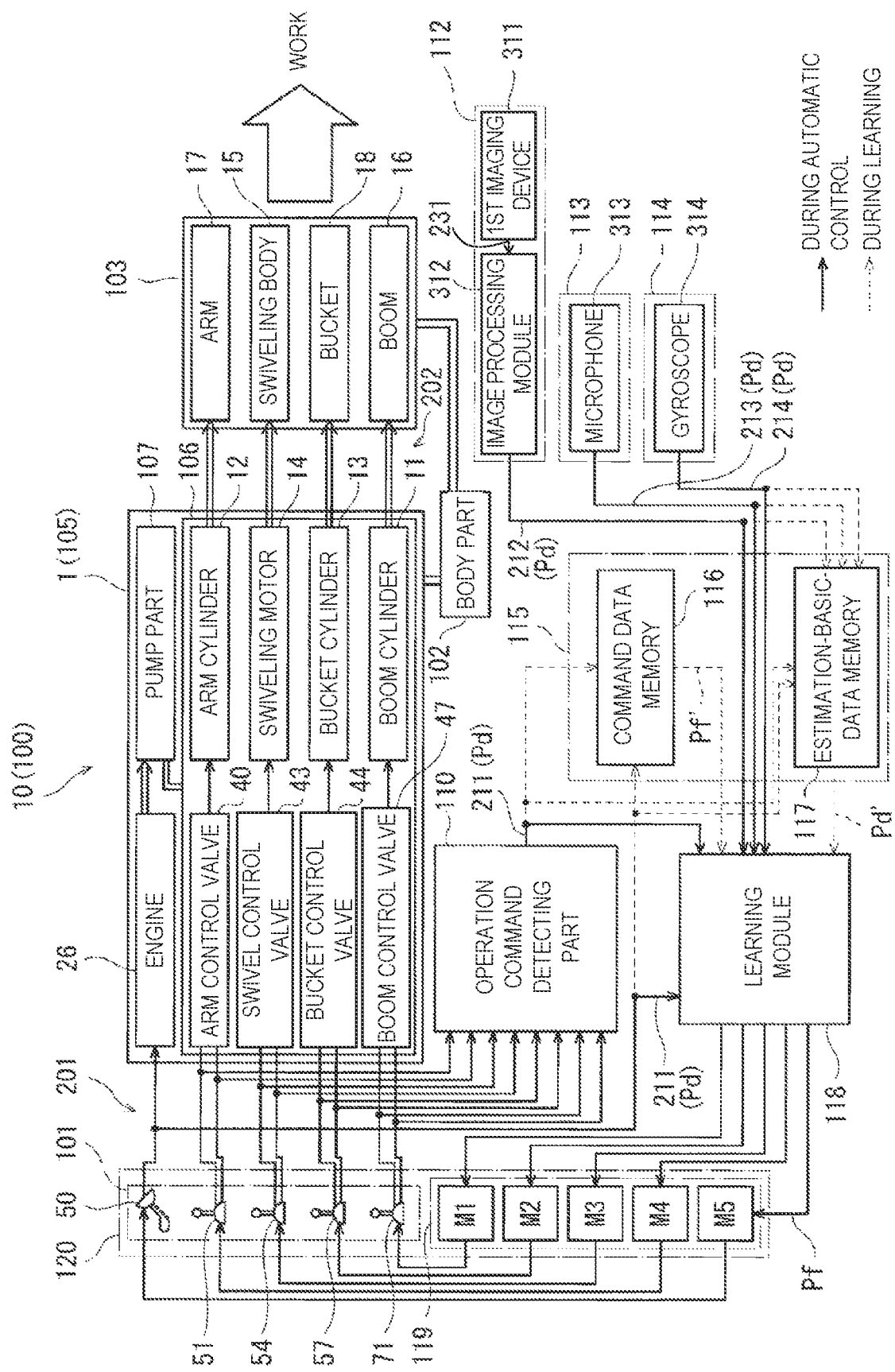
FIG. 6 is a functional block diagram illustrating a configuration of a control system of the hydraulic excavator with learning function illustrated in FIG. 3.

FIG. 6 is a functional block diagram illustrating the configuration of the control system of the hydraulic excavator 10 with learning function. FIG. 6 illustrates the control system of the hydraulic excavator 10 related to the learning function of this embodiment. Therefore, a control system of the traveling body 19 unrelated to the learning function of this embodiment is omitted. Moreover, the hydraulic excavator 10 with learning function has the overall-controlling module and the operation-mode-switching manipulation part (neither of them is illustrated). The overall-controlling module switches the operation mode of the hydraulic excavator 10 with learning function between the learning mode and the automatic control mode, according to the operation of the operator to the operation-mode-switching manipulation part.

Referring to FIG. 6, the acceleration device 50, the arm manipulation device 51, the swivel manipulation device 54, the bucket manipulation device 57, and the boom manipulation device 71 constitute the manipulating part 101. The manipulating part 101 is provided to the driver's seat of the swiveling body 15.

When the operator depresses the accelerator pedal of the acceleration device 50, the acceleration device 50 outputs the operation command 201 which is the acceleration command corresponding to the depressed amount of the accelerator pedal. Then, the engine 26 drives the pump part 107 by the output corresponding to the operation command 201. Then, the pump part 107 discharges hydraulic oil to a hydraulic circuit 106 in an amount corresponding to the output of the pump part 107.

When the operator operates the manipulation lever of the swivel manipulation device 54, the swivel manipulation device 54 outputs the operation command 201 which is the pilot pressure command (swiveling command) corresponding to the tilt angle of the manipulation lever. Then, the swivel control valve 43 supplies and discharges hydraulic oil to/from the swiveling motor 14 based on the operation command 201. Then, the swiveling motor 14 causes the swiveling body 1 to swivel 5 according to the supply and discharge of the hydraulic oil.

When the operator operates the manipulation lever of the boom manipulation device 71, the boom manipulation device 71 outputs the operation command 201 which is the pilot pressure command (boom operation command) corresponding to the tilt angle of the manipulation lever. Then, the boom control valve 47 supplies and discharges hydraulic oil to/from the boom cylinder 11 based on the operation command 201. Then, the boom cylinder 11 lifts and lowers the boom 16, and thus, lifts and lowers the boom 16 and the arm 17 according to the supply and discharge of the hydraulic oil.

When the operator operates the manipulation lever of the arm manipulation device 51, the arm manipulation device 51 outputs the operation command 201 which is the pilot pressure command (arm operation command) corresponding to the tilt angle of the manipulation lever. Then, the arm control valve 44 supplies and discharges hydraulic oil to/from the arm cylinder 12 based on the operation command 201. Then, the arm cylinder 12 swings the arm 17 according to the supply and discharge of the hydraulic oil.

When the operator operates the manipulation lever of the bucket manipulation device 57, the bucket manipulation device 57 outputs the operation command 201 which is the pilot pressure command (bucket operation command) corresponding to the tilt angle of the manipulation lever. Then, the bucket control valve 44 supplies and discharges hydraulic oil to/from the bucket 18 based on the operation command 201. Then, the bucket cylinder 13 pivots the bucket 18 according to the supply and discharge of the hydraulic oil.

According to these manipulations, the work can be performed as intended by the operator.

Meanwhile, the pressure sensors 81 to 86, 91, and 92 detect the operation commands 201 which are pilot pressure commands outputted from the arm manipulation device 51, the swivel manipulation device 54, the bucket manipulation device 57, and the boom manipulation device 71, respectively, and output them as the command data 211. The pressure sensors 81 to 86, 91, and 92 constitute the operation command detecting part 110.

The command data memory 116 of the learning data memory 115 stores the respective command data 211 in a time series. Moreover, the command data memory 116 stores, as the command data 211, the operation command 201 which is the acceleration command outputted from the acceleration device 50, in a time series. The command data 211 includes the acceleration command, the arm operation command, the swiveling command, the bucket operation command, and the boom operation command.

As described above, the first imaging device 311 images the state of the work performed by the bucket 18. Then, the image processing module 312 applies the image processing to the image captured by the first imaging device 311 so as to generate the data indicative of the state of the given work, and output it as the work-state data 212. Therefore, the first imaging device 311 and the image processing module 312 constitute the work-state detecting part 112.

The hydraulic excavator 10 is provided with a microphone 313. The microphone 313 is installed, for example, near the engine 26 provided to the swiveling body 15, and receives operation noise of the engine 26 and converts it to operation noise data so as to output it as the operation-state data 213. The operation noise of the engine 26 increases as the output of the engine 26 increases, while it decreases as the output of the engine 26 decreases. Therefore, the operation noise data shows a driving-source state indicative of a state of a driving source of the pump part 107, and thus, it is the operation-state data indicative of the operation state of the hydraulic excavator 10. Accordingly, the microphone 313 constitutes a driving-source state detecting part, and thus, the operation-state detecting part 113.

The swiveling body 15 or the body part 102 of the hydraulic excavator 10 is provided with a gyroscope 314. The gyroscope 314 detects an inclination and vibration (including an excitation force, acceleration, and angular acceleration) of the swiveling body 15 or the body part 102, converts them to inclination and vibration data, and outputs the inclination and vibration data as the reaction data 214. For example, when the boom sticks the bucket 18 into the ground, the swiveling body 15 and the body part 102 incline due to a reaction force from the ground, and the swiveling body 15 and the body part 102 vibrate by receiving the excitation force through the boom (the operating part 103). Therefore, the inclination and vibration data outputted from the gyroscope 314 indicates the reaction received by the operating part 103 and the body part 102. Accordingly, the gyroscope 314 constitutes the reaction detecting part 114.

The estimation-basic-data memory 117 of the learning data memory 115 stores, as the estimation basic data, each of the work-state data 212 outputted from the image processing module 312, the operation-state data 213 outputted from the microphone 313, the reaction data 214 outputted from the gyroscope 314, the command data 211 outputted from the operation command detecting part 110, and the command data 211 which is the operation command outputted from the acceleration device 50, in a time series.

As described above, the learning module 118 performs the machine learning of the learning data during the learning, and after the machine learning, when the learning module 118 receives the input of the estimation basic data Pd, it outputs the estimated operation command Pf.

The learning data memory 115, the learning module 118, the image processing module 312, and the overall-controlling module (not illustrated) are, for example, comprised of an arithmetic unit including a processor and a memory. The learning module 118, the overall-controlling module, and the image processing module 312 are functional blocks implemented by the processor executing a given program stored in the memory of the arithmetic unit. The learning data memory 115 is comprised of this memory. The arithmetic unit is comprised of, for example, a microcontroller, an MPU, an FPGA (Field Programmable Gate Array), a PLC (Programmable Logic Controller), etc. The learning data memory 115, the learning module 118, the image processing module 312, and the overall-controlling module (not illustrated) may be comprised of a sole arithmetic unit which executes a centralized control, or a plurality of arithmetic units which execute a distributed control. The sole arithmetic unit or the plurality of arithmetic units may be provided to the swiveling body 15 of the hydraulic excavator 10, for example.

Here, the manipulating-part drive part 119 is comprised of first to fifth servomotors M1 to M5. The first to fifth servomotors M1 to M5 rotate the manipulation levers of the boom manipulation device 71, the bucket manipulation device 57, the swivel manipulation device 54, and the arm manipulation device 51, and the accelerator pedal of the acceleration device 50, respectively, based on the estimated operation command Pf outputted from the learning module 118. Therefore, during the automatic control, the boom control valve 47, the bucket control valve 44, the swivel control valve 43, and the arm control valve 40 of the hydraulic drive system 1 drive the boom 16, the bucket 18, the swiveling body 15, and the arm 17 of the operating part 103, respectively, based on the estimated operation command Pf, and the engine 26 drives the pump part 107 of the hydraulic drive system 1 based on the estimated operation command Pf.

Figure 7:
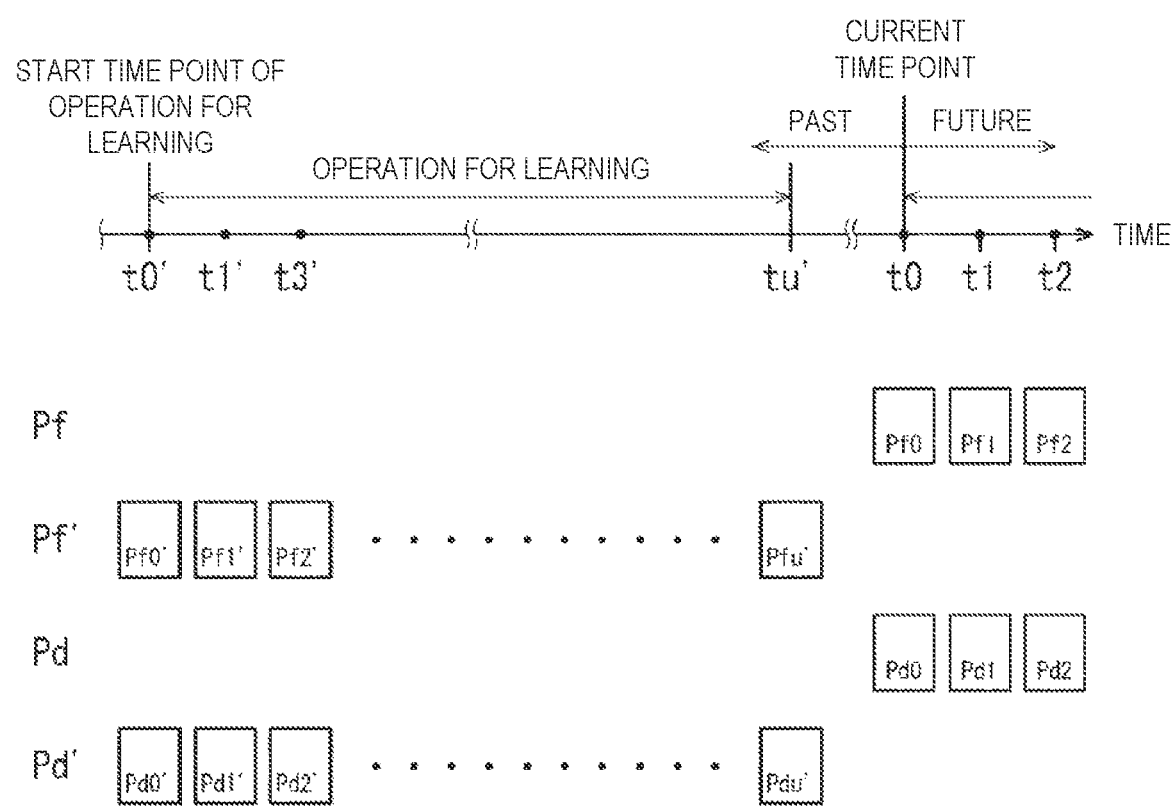
FIG. 7 is a schematic view illustrating time-series data of each of an estimated operation command, command data for learning, estimation basic data, and estimation basic data for learning, in the hydraulic excavator with learning function illustrated in FIG. 3.
Figure 8:
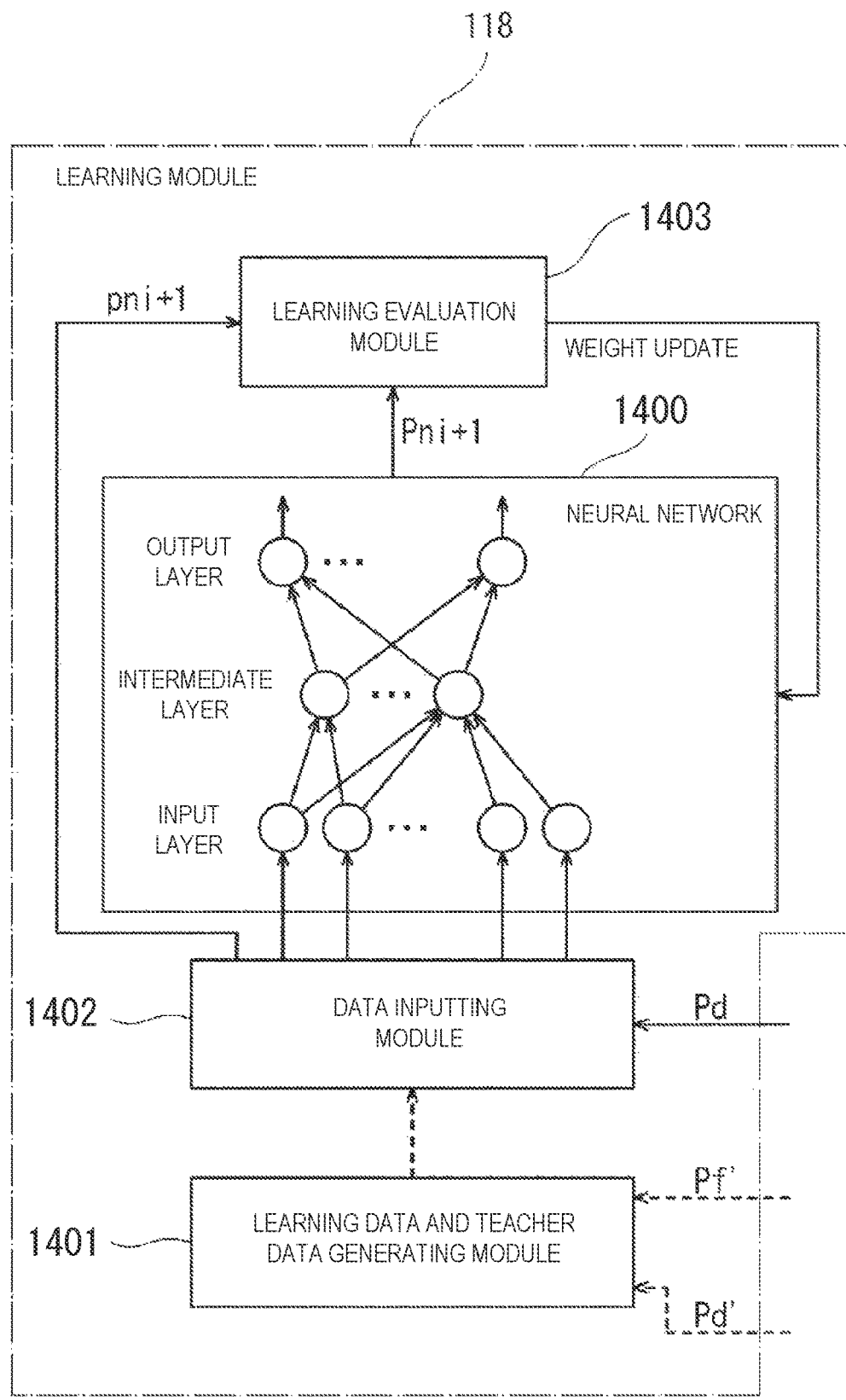
FIG. 8 is a functional block diagram illustrating a configuration of a learning module illustrated in FIG. 6.

Next, the configuration of the learning module 118 is described in detail. FIG. 7 is a schematic view illustrating time-series data of each of the estimated operation command Pf, the command data Pf for learning, the estimation basic data Pd, and the estimation basic data Pd' for learning, in the hydraulic excavator 10 with learning function. FIG. 8 is a functional block diagram illustrating the configuration of the learning module 118.

<Temporal Relation Between Time-Series Data>

First, a temporal relation between the time-series data is described.

Referring to FIG. 7, the hydraulic excavator 10 carries out a given work by the automatic control. In order to cause the hydraulic excavator 10 to learn the given work, the highly-skilled operator causes the hydraulic excavator 10 to perform the given work as operation used for learning (operation for learning). A time point t0' indicates a start time point of the operation for learning. This operation for learning ends at a time point tu'. In this operation for learning, each of the command data 211 and the estimation basic data 212 to 214 is acquired at a given sampling interval, and they are stored in a time series in the command data memory 116 and the estimation-basic-data memory 117, respectively.

When the operation for learning is finished, the command data and the estimation basic data are read as the command data Pf for learning and the estimation basic data Pd' for learning, from the command data memory 116 and the estimation-basic-data memory 117, respectively. The command data Pf for learning is time-series data Pf0', Pf1', Pf3' ... Pfu' (hereinafter, abbreviated as Pf0' to Pfu'). Below, a suffix number of the time-series data represents an order of sampling time point (intermittent time point). This means that the time-series data with the same suffix number are acquired at the same sampling time point. Similarly, the estimation basic data Pd' for learning is time-series data Pd0' to Pdu'.

The machine learning is performed by using the command data Pf for learning and the estimation basic data Pd' for learning. When the machine learning is finished, the hydraulic excavator 10 is automatically controlled to perform the given work. The current time point t0 indicates a start time of the given work performed by the automatic control. During the automatic control, each of the command data 211 and the estimation basic data 212 to 214 is acquired at a given sampling interval, and sequentially inputted into the learning module 118 as the estimation basic data Pd. The estimation basic data Pd is time-series data Pd0 to Pdu.

The learning module 118 outputs the estimated operation command Pf according to the estimation basic data Pd. The estimated operation command Pf is time-series data Pf0 to Pfu.

The hydraulic excavator 10 operates based on the estimated operation command Pf, and thus, the hydraulic excavator 10 is automatically controlled.

<Configuration of Learning Module 118>

Referring to FIG. 8, the learning module 118 is provided with, for example, a neural network 1400, a learning data and teacher data generating module 1401, a data inputting module 1402, and a learning evaluation module 1403.

The neural network 1400 has an input layer, an intermediate layer, and an output layer. The number of neurons in each layer is set suitably. A well-known learning method may be applied to the learning by the neural network 1400. Therefore, it is briefly described here. Here, the neural network 1400. is, for example, a recurrent neural network. The mode of learning is, for example, supervised learning.

The learning data and teacher data generating module 1401 generates time-series data pn1 to pnu of teacher data pn, based on the time-series data Pf0' to Pfu' of the command data Pf' for learning. Moreover, the time-series data Pd0' to Pdu−1' of the learning data is generated based on the time-series data Pd0' to Pdu' of the estimation basic data Pd' for learning.

The data inputting module 1402 sequentially inputs the time-series data Pd0' to Pdu−1' of the learning data to each neuron of the input layer. Here, when the data inputting module 1402 inputs time-series data Pdi of the learning data at a certain sampling time point ti, the neural network 1400 calculates an estimated operation command Pni+1 at the next sampling time point ti+1 by a forward calculation. Then, the learning evaluation module 1403 retrieves, among the time-series data pn1 to pnu of the teacher data pn, time-series data pni+1 at the next sampling time point ti+1, and, for example, calculates a sum of squared errors $e^2$ of the acceleration command, the arm operation command, the swiveling command, the bucket operation command, and the boom operation command, between the estimated operation command Pni+1 and the time-series data pni+1 of the teacher data pn. Next, the learning evaluation module 1403 updates weights of the neural network 1400 by a backward calculation. The data inputting module 1402 and the learning evaluation module 1403 execute this processing for all of the time-series data Pd0' to Pdu−1' of the learning data, and finish the learning when, for example, the sum of squared errors $e^2$ becomes below a given threshold in the processing for all of the time-series data Pd0' to Pdu−1' of the learning data.

After the learning is finished, during the automatic control, the data inputting module 1402 inputs, for example, the estimation basic data Pd0 at the current sampling time point t0. Then, the neural network 1400 outputs the estimated operation command Pn1 at the next sampling time point t1 as the estimated operation command Pf1. Note that a suitable initial operation command is outputted as the estimated operation command Pf0.

Therefore, the hydraulic excavator 10 is automatically controlled on the basis of the estimated operation command Pf based on the learning result of the neural network 1400 (the learning module 118).

Note that, during the learning, when the data inputting module 1402 inputs the time-series data Pdi of the learning data at each sampling time point ti, it may be time-series data Pdi−1 to Pdi−n ("n" is a given positive number) prior to the sampling time point ti. In this case, during the automatic control, the data inputting module 1402 is required to similarly input, at each sampling time point tj, past estimation basic data Pdj−1 to Pdj−n, together with the current estimation basic data Pdj. Since the estimation basic data Pd0 to Pdj−1 is stored in a time series in the estimation-basic-data memory 117 at each sampling time point tj, during the automatic control, the data inputting module 1402 reads it from the estimation-basic-data memory 117, and generates the past estimation basic data Pdj−1 to Pdj−n. Accordingly, the learning efficiency of the neural network 1400 improves. This is because, when the operator estimates the motion of the bucket 18, he/she estimates the next motion of the bucket 18 considering not only the work state, the operation state of the hydraulic excavator 10, and the reaction from the work-target object at the present moment, but also the series of work states, operation states of the hydraulic excavator 10, and reactions from the work-target object in the past, and thus, the motion of the bucket 18 is estimated accurately.

Note that information on other than the work state, the operation state of the hydraulic excavator 10, and the reaction from the work-target object may be used as the learning data, and as the input data during the automatic control of the hydraulic excavator 10.

[Operation]

Next, operation of the hydraulic excavator 10 with learning function configured as described above, is described. Below, the operation of the hydraulic excavator 10 is described taking a case where the hydraulic excavator 10 performs the digging work as the given work, as one example.

Figure 9:
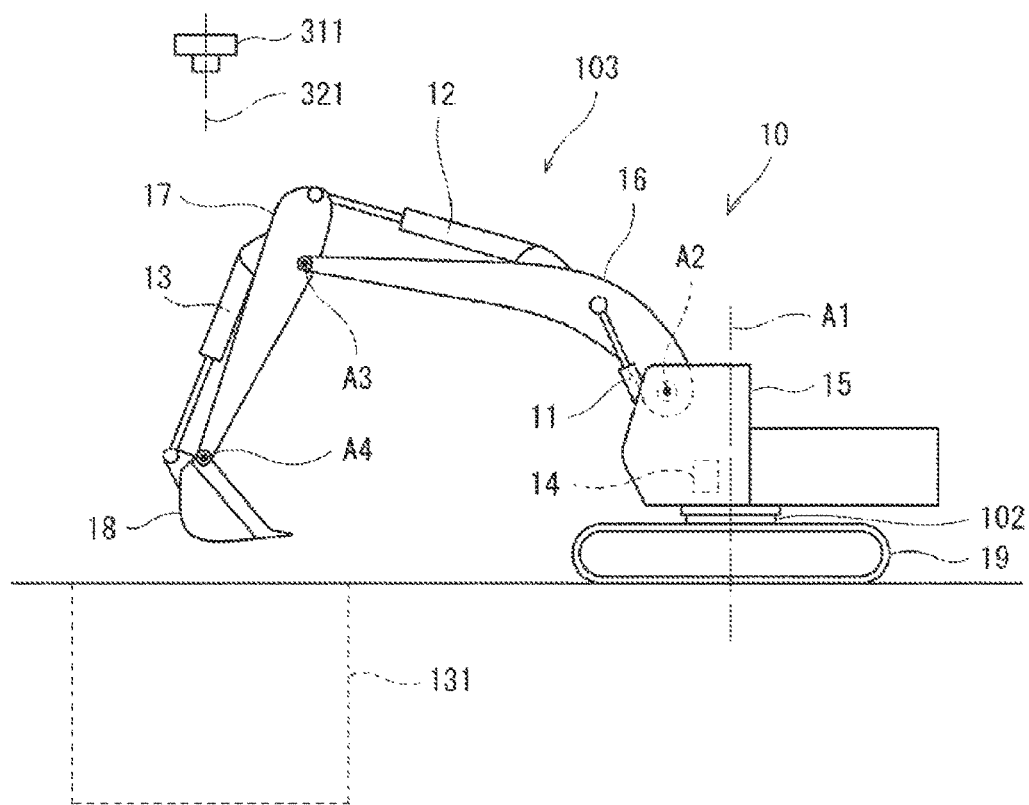
FIG. 9 is a schematic view illustrating a situation of a constructing work performed by the hydraulic excavator with learning function illustrated in FIG. 3.

FIG. 9 is a schematic view illustrating a situation of a constructing work performed by the hydraulic excavator 10 with learning function.

Referring to FIG. 9, the first imaging device 311 is placed above a site at which a hole 131 is planned to be dug. The first imaging device 311 is, for example, attached to a suitable supporting member installed on the ground. The first imaging device 311 is, for example, wirelessly and data-communicably connected to the arithmetic unit (the learning module 118) provided to the swiveling body 15 of the hydraulic excavator 10. The first imaging device 311 is placed, for example, above the center part of the hole 131 such that the optical axis 321 is oriented toward the center part of the hole 131.

Next, the operation mode of the hydraulic excavator 10 is switched to the learning mode. Then, first, the hydraulic excavator 10 is set to an initial state. In this initial state, for example, the hydraulic excavator 10 is located at an installation place suitable for digging the hole 131, and takes an initial posture (e.g., a posture illustrated in FIG. 9). The installation place is set to, for example, a place where the hydraulic excavator 10 can dig the hole 131 by scooping earth and sand by the bucket 18, and dispose the scooped earth and sand inside the bucket 18 at an earth-and-sand disposal area, without traveling of the hydraulic excavator 10. Here, the installation place is assumed to be set to an intermediate position between the site where the hole 131 is to be dug, and the earth-and-sand disposal area. Moreover, the first imaging device 311 is assumed to be a 3D camera.

<Digging Work>

Next, the highly-skilled operator performs the digging work while manipulating the hydraulic excavator 10. The operator performs the digging work schematically as described below.

First, the bucket 18 is lowered from a descending position above the hole 131 so as to be stuck into the ground (including the ground inside the hole 131) at the site where the hole 131 is to be dug (sticking operation). In this sticking operation, the operator manipulates the bucket 18 so that a claw of the bucket 18 at its tip end is oriented downward before lowering the bucket 18. Next, the stuck bucket 18 is pivoted to a closer side while being pushed onto the ground, so as to scoop earth and sand (scooping operation). Next, the bucket 18 is moved to the descending position to be lifted from the hole 131 (lifting operation). Next, the swiveling body 15 is swiveled until the booms 16 and 17 are oriented toward the earth-and-sand disposal area (forward swiveling operation). Next, the bucket 18 is pivoted to a farther side to dispose the earth and sand inside the bucket 18 at the earth-and-sand disposal area (earth-and-sand disposing operation). Next, the swiveling body 15 is reversely swiveled so that the bucket 18 is located at the descending position (reverse swiveling operation). After this, the series of operation is repeated, and the digging work is finished when the given hole 131 has a given planar shape, and a given depth.

<Information for Determining Next Manipulation>

During the series of operation, the operator visually confirms the state of the digging, and intuits how the bucket 18, the boom, and the driver's seat (the swiveling body 15) are currently to be operated, through visual confirmation of the postures of the bucket 18 and the booms 16 and 17, and through the current manipulated positions of the manipulation levers of the manipulation devices 51, 54, 57, and 71. Moreover, when the bucket 18 acts on the ground (digs the ground, rakes the earth, etc.), the operator determines, by sensing the reaction, whether or not the intended work (action) is performed. Then, the operator determines the next manipulation instantly considering these. Here, the reaction is, for example, the inclination and vibration (including the excitation force, the acceleration, and the angular acceleration) at the driver's seat. Moreover, when the operator determines the next manipulation, he/she puts importance on the state (e.g., a speed and noise) of the engine 26 which is the driving source.

Here, the state of the digging is one example of the information indicating the work state. The manipulated position is one example of the information indicating the operation state of the hydraulic excavator 10. The inclination and vibration at the driver's seat (the swiveling body 15) is one example of the reaction from the ground. The state of the engine (e.g., the speed and noise) is information indicating the state of the driving source, and thus, indicating the operation state of the hydraulic excavator 10.

<Data Acquisition for Learning>

Meanwhile, during the series of operation, the data for learning is acquired as described below.

The first imaging device 311 images the state of the digging work performed by the bucket 18, the image processing module 312 applies the image processing to the captured image to generate the data indicative of the state of the digging work as the work-state data 212, and the learning data memory 115 (accurately, the estimation-basic-data memory 117) stores the generated work-state data 212.

In detail, during the operation from the sticking operation to the lifting operation, the first imaging device 311 mainly images the arm 17 and the bucket 18 as well as the hole 131, and during the operation from the forward swiveling operation to the reverse swiveling operation, the first imaging device 311 mainly images the hole 131. The image processing module 312 applies, for example, well-known image processing (e.g., edge processing) to the captured image to discriminate between the area of the arm 17 and the bucket 18 and the area of the hole 131, and generates data of the planar shape of the hole 131 and the depth at the center part. Particularly, in the image captured during the earth-and-sand disposing operation, the area of the arm 17 and the bucket 18 does not exist, but only the area of the hole 131 exists. Therefore, in the work-state data 212 during the earth-and-sand disposing operation, the data of the planar shape of the hole 131 and the depth at the center part is accurately identified.

When the operator operates the acceleration device 50, the arm manipulation device 51, the swivel manipulation device 54, the bucket manipulation device 57, and the boom manipulation device 71, the learning data memory 115 (the command data memory 116 and the estimation-basic-data memory 117) stores the command data 211 of the operation command 201 corresponding to each operation. During the series of operation described above, depending on a combination of the command data 211 each corresponding to the operation of the acceleration device 50, the arm manipulation device 51, the swivel manipulation device 54, the bucket manipulation device 57, and the boom manipulation device 71, the operation to be performed by the bucket 18, the boom, and the driver's seat (swiveling body 15) at each time point is identified.

The microphone 313 receives the noise of the engine 26 during the series of operation described above. This received noise data (operation-state data 213) is stored in the learning data memory 115 (accurately, the estimation-basic-data memory 117).

Particularly, during the scooping operation, for example, the operator causes the bucket 18 to pivot by increasing the output of the engine. Therefore, the earth and sand of the ground of the hole 131 can be appropriately scooped. Accordingly, during the scooping operation, a magnitude of the increased output of the engine can be identified based on a magnitude of the received noise data.

During the series of operation described above, the gyroscope 314 detects the inclination and vibration (including the excitation force, the acceleration, and the angular acceleration) of the swiveling body 15 (driver's seat) or the body part 102, as the reaction from the ground of the hole 131. This reaction data 214 is stored in the learning data memory 115 (accurately, the estimation-basic-data memory 117).

Particularly, during the sticking operation, the reaction from the ground when the bucket 18 is stuck into the ground indicates a hardness of the ground. Therefore, during the sticking operation, the hardness of the ground where the bucket 18 is stuck, is identified based on a magnitude of the reaction data.

As described above, in this embodiment, the data capable of identifying the information suitable for determining the next manipulation is acquired as the learning data.

<Machine Learning>

After the operation for learning is finished, the learning data stored in the learning data memory is used for the machine learning by the neural network. Here, as described above, when the time-series data Pdi of the learning data at each sampling time point ti is inputted, the past time-series data Pdi−1 to Pdi−n ("n" is a given positive number) is inputted.

<Automatic Control>

The hydraulic excavator 10, after finished the machine learning, is set to the initial state described above. Next, the operation mode of the hydraulic excavator 10 is switched to the automatic control mode. Then, the automatic control of the hydraulic excavator 10 starts. During the automatic control, the estimation basic data Pd (the work-state data 212, the command data 211, the operation-state data (received noise data) 213, and the reaction data 214) is inputted into the learning module 118 (accurately, the data inputting module 402 of the neural network), and is also stored in the estimation-basic-data memory 117. Then, the data inputting module 402 inputs, at each sampling time point tj, the current estimation basic data Pdj together with the past estimation basic data Pdj−1 to Pdj−n, among the time-series data Pd0 to Pdj−1 stored in the estimation-basic-data memory 117. Accordingly, the learning module 118 outputs the estimated operation command Pf.

In this manner, the hydraulic excavator 10 is automatically controlled so that the digging work is performed similarly to the case when the hydraulic excavator 10 is manipulated by the highly-skilled operator.

As described above, according to Embodiment 1, when the highly-skilled operator manipulates the construction machinery 100 to perform the given work during the learning, the command data 211 corresponding to the operation command 201 according to the manipulation, and the estimation basic data including the work-state data 212 of the working part 104, the operation-state data 213 of the operating part 103, and the reaction data 214 received by the operating part 103 or the body part 102 from the work-target object due to the work performed by the working part 104, are stored in the learning data memory 115. Then, the learning module 118 receives the input of the estimation basic data stored in the learning data memory 115, and accordingly, the machine learning of the learning data is performed to output the estimated operation command. Therefore, the manipulation by the highly-skilled operator can be learned to be outputted as the estimated operation command Pf. Then, during the automatic operation, when the estimation basic data Pd is inputted into the learning module 118, the learning module 118 outputs the estimated operation command Pf. Then, the hydraulic drive system 1 drives the operating part 103 based on the estimated operation command Pf. Consequently, the manipulation by the highly-skilled operator is learned, and, as a result of the learning, the work is automatically performed based on the estimated operation command Pf outputted from the learning module 118. Therefore, the construction machinery 100 can be provided, which is capable of learning the work performed by the construction machinery 100 through the manipulation by the human, and automatically performing the learned work.

Embodiment 2

Embodiment 2 of the present disclosure is the hydraulic excavator 10 of Embodiment 1, in which the operation-state detecting part 113 is further provided with a second imaging device 331 and an image processing module 333.

Figure 10:
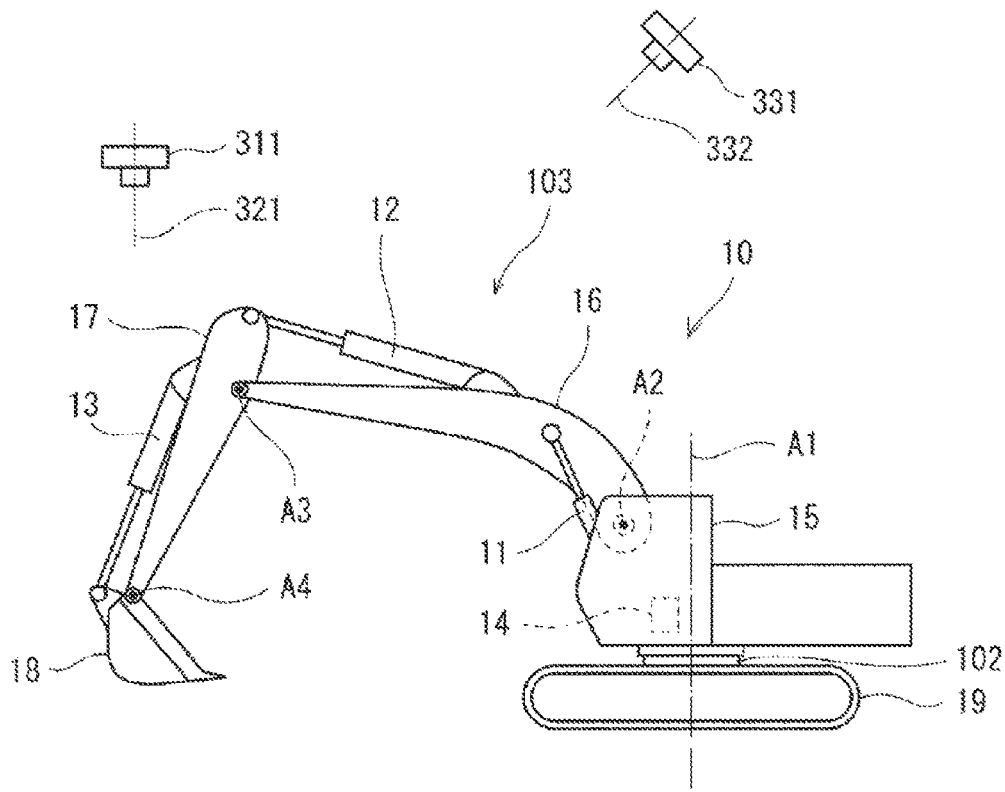
FIG. 10 is a side view illustrating a configuration of hardware of a hydraulic excavator with learning function, which is one example of construction machinery with learning function according to Embodiment 2 of the present disclosure.
Figure 11:
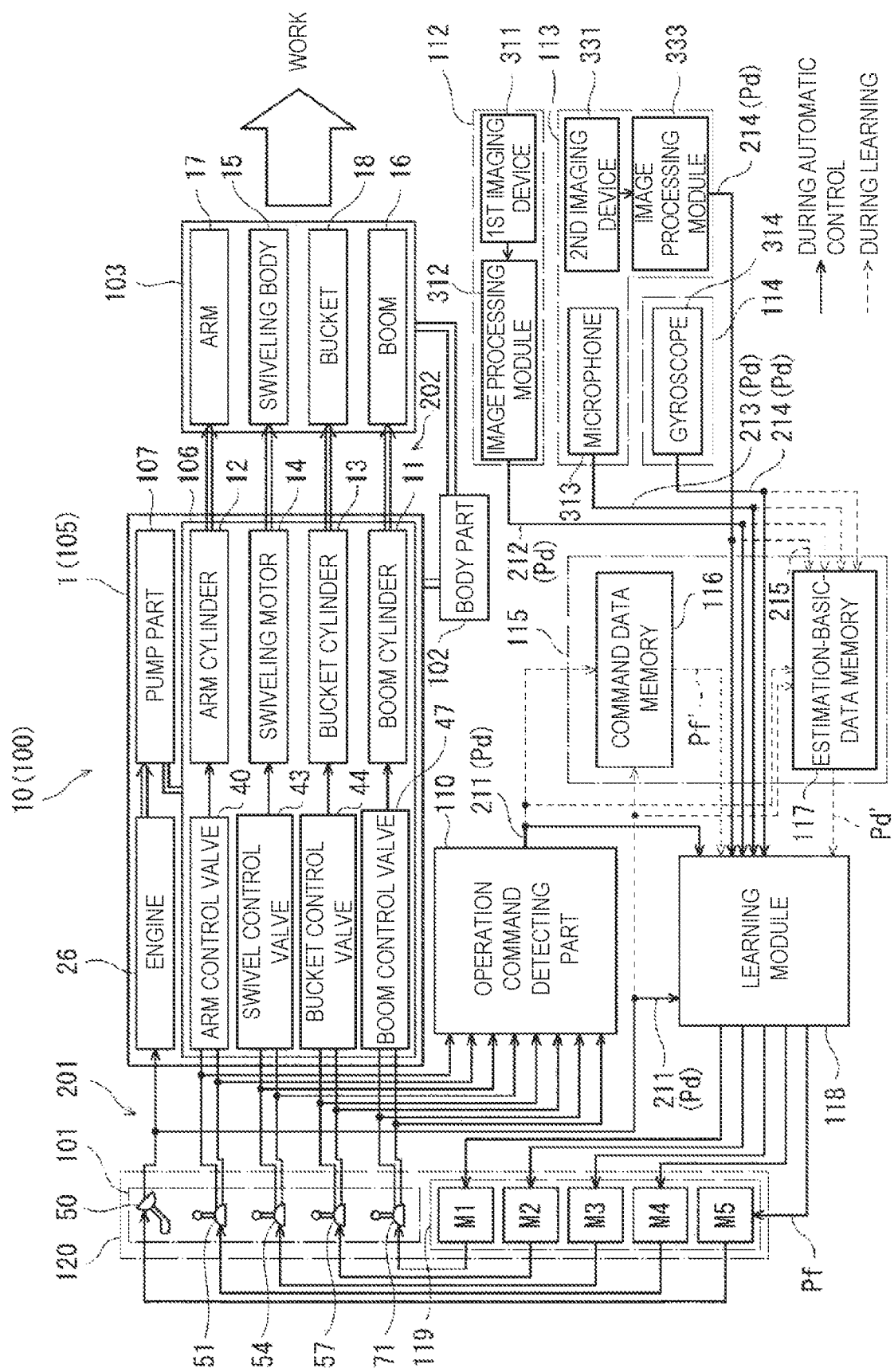
FIG. 11 is a functional block diagram illustrating a configuration of a control system of the hydraulic excavator with learning function illustrated in FIG. 10.

FIG. 10 is a side view illustrating a configuration of hardware of the hydraulic excavator 10 with learning function according to Embodiment 2. FIG. 11 is a functional block diagram illustrating a configuration of a control system of the hydraulic excavator 10 with learning function illustrated in FIG. 10.

Referring to FIGS. 10 and 11, in the hydraulic excavator 10 of this embodiment, the operation-state detecting part 113 is further provided with the second imaging device 331 and the image processing module 333. The other configurations are the same as those of the hydraulic excavator 10 of Embodiment 1.

The second imaging device 331 entirely images the hydraulic excavator 10. The image captured by the second imaging device 331 is applied with image processing by the processing part 333 so as to obtain data indicative of the posture of the hydraulic excavator 10, and is outputted from the image processing module 333 as the operation-state data 213. An optical axis 332 of the second imaging device 331 is oriented toward the hydraulic excavator 10.

The second imaging device 331 is comprised of, for example, an ordinal digital camera. The second imaging device 331 is, for example, fixed via a suitable supporting member to a fixed object (e.g., the ground) separated from the vehicle of the hydraulic excavator 10, or mounted on a drone.

For example, the image processing module 333 applies the image processing to the image captured by the second imaging device 331 to extract a contour of the hydraulic excavator 10, and outputs this contour data as the operation-state data 213. The contour data is postural data which can identify the posture of the operating part 103 of the hydraulic excavator 10.

According to Embodiment 2, during the series of operation described in Embodiment 1, the posture of the hydraulic excavator 10 is identified based on the contour of the hydraulic excavator 10 in the operation-state data 213. Therefore, the efficiency of the machine learning by the learning module 118 improves, and the estimated operation command Pf outputted from the learning module 118 during the automatic control becomes more appropriate.

Embodiment 3

Embodiment 3 of the present disclosure exemplarily describes the hydraulic excavator 10 of Embodiment 1, in which the operation-state detecting part 113 is further provided with a sensor part 341.

Figure 12:
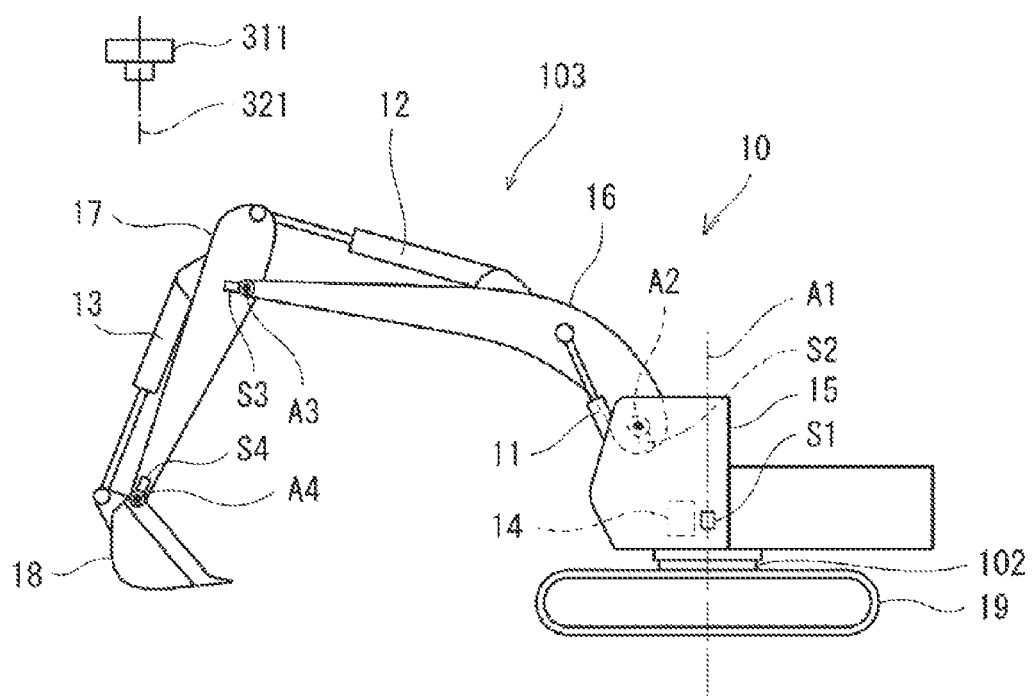
FIG. 12 is a side view illustrating a configuration of hardware of a hydraulic excavator with learning function, which is one example of construction machinery with learning function according to Embodiment 3 of the present disclosure.
Figure 13:
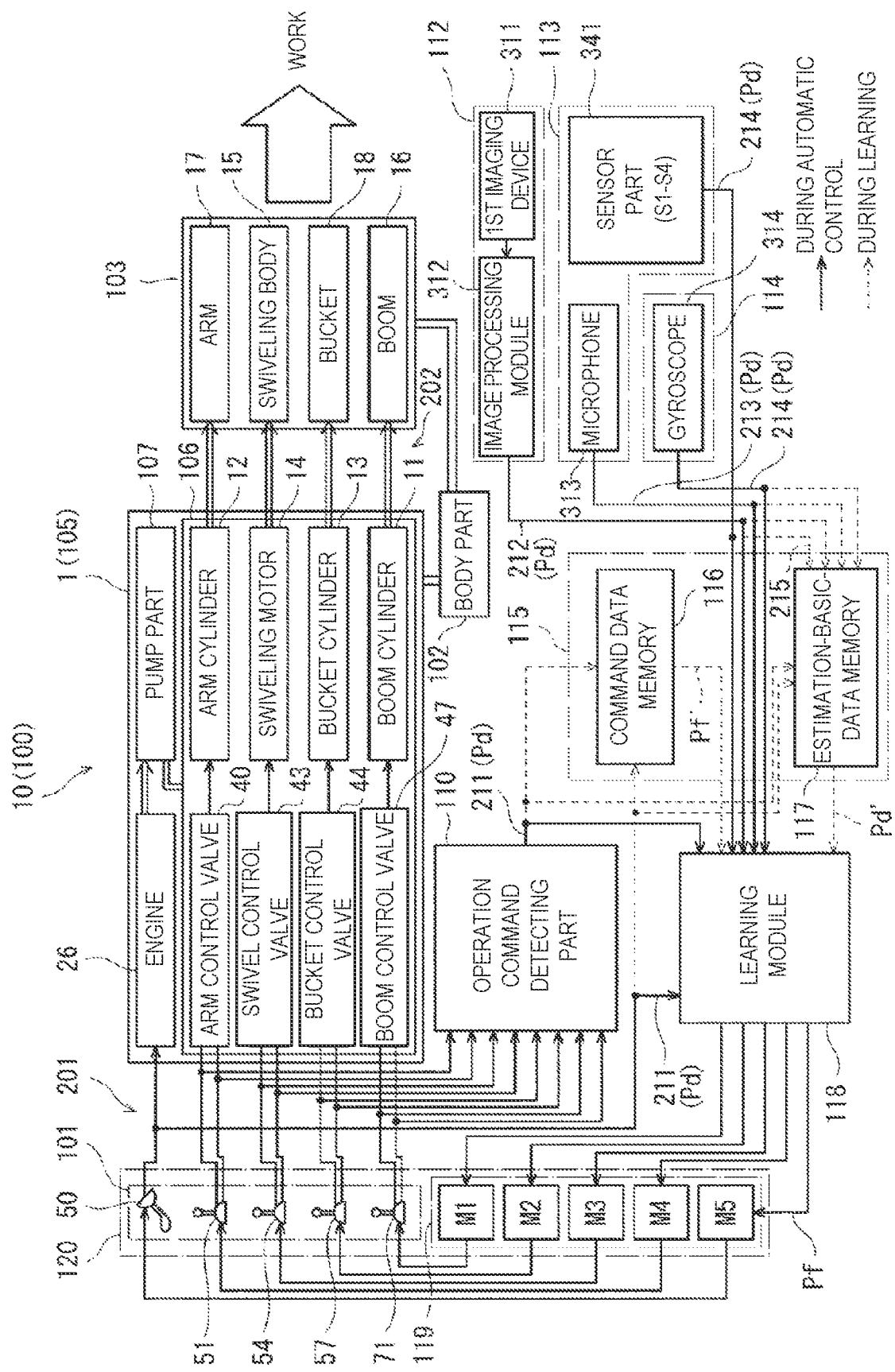
FIG. 13 is a functional block diagram illustrating a configuration of a control system of the hydraulic excavator with learning function illustrated in FIG. 12.

FIG. 12 is a side view illustrating a configuration of hardware of the hydraulic excavator 10 with learning function according to Embodiment 3. FIG. 13 is a functional block diagram illustrating a configuration of a control system of the hydraulic excavator 10 with learning function illustrated in FIG. 12.

Referring to FIG. 13, in the hydraulic excavator 10 of this embodiment, the operation-state detecting part 113 is further provided with the sensor part 341. The other configurations are the same as those of the hydraulic excavator 10 of Embodiment 1. The sensor part 341 is comprised of sensors S1 to S4.

Referring to FIG. 12, the hydraulic excavator 10 is provided with the sensors S1 to S4. In detail, the swiveling body 15 is provided with the sensor S1 which detects a rotational angle of the swiveling body 15 about the rotary axis A1. The boom 16 is provided at its base-end part with the sensor S2 which detects a rotational angle of the boom 16 about the rotary axis A2. The arm 17 is provided at its base-end part with the sensor S3 which detects a rotational angle of the arm 17 about the rotary axis A3. The arm 17 is provided at its tip-end part with the sensor S4 which detects a rotational angle of the bucket 18 about the rotary axis A4.

The sensor part 341 outputs the data of the rotational angles detected by the sensors S1 to S4 as the operation-state data 213. A combination of the data of the rotational angles detected by the sensors S1 to S4, is the postural data which can identify the posture of the operating part 103 of the hydraulic excavator 10.

According to Embodiment 3, during the series of operation described in Embodiment 1, the posture of the hydraulic excavator 10 is identified based on the combination of the rotational angles in the operation-state data 213 detected by the sensors S1 to S4. Therefore, the efficiency of the machine learning by the learning module 118 improves, and the estimated operation command Pf outputted from the learning module 118 during the automatic control becomes more appropriate.

Embodiment 4

{Outline}

First, an outline of skill-inheriting construction machinery of Embodiment 4 is described.

[Configuration]

Figure 14:
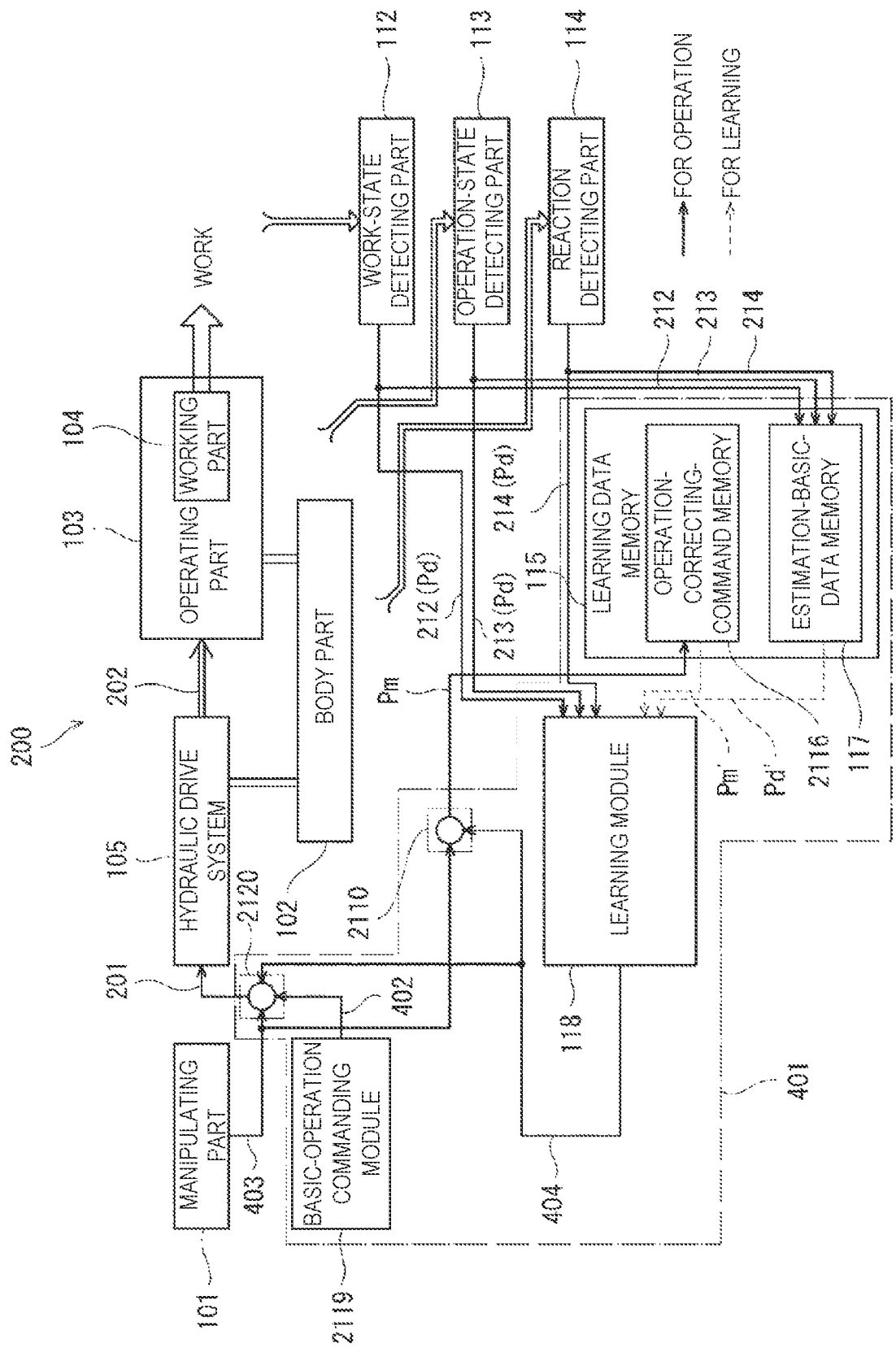
FIG. 14 is a functional block diagram illustrating a configuration of a control system of skill-inheriting construction machinery according to Embodiment 4 of the present disclosure.

FIG. 14 is a functional block diagram illustrating a configuration of a control system of skill-inheriting construction machinery according to Embodiment 4 of the present disclosure. In FIG. 14, each arrow indicates a flow of a command, a motive power, information, or data. Each solid-line arrow indicates a flow of a command or data during the operation of the operating part 103, and each broken line indicates a flow of a command or data during the learning. Note that, as described later, when the past estimation basic data is used for the learning, the data flows as indicated by the broken lines even during the operation of the operating part. This similarly applies to FIGS. 18, 26, and 28.

Referring to FIG. 14, skill-inheriting construction machinery 200 of Embodiment 4 is provided with the manipulating part 101, the body part 102, the operating part 103, the hydraulic drive system 105, the work-state detecting part 112, the operation-state detecting part 113, the reaction detecting part 114, and a control part 401.

The control part 401 is provided with a basic-operation commanding module 2119, an operation command generating module 2120, an operation-correcting-command generating module 2110, the learning data memory 115, and the learning module 118. The learning data memory 115 includes an operation-correcting-command memory 2116, and the estimation-basic-data memory 117.

In Embodiment 4, the construction machinery with learning function is the skill-inheriting construction machinery 200 having the control part 401. The manipulating part 101 outputs, as the command 201, a manual operation correcting command 403 according to the operation by the operator, and the hydraulic drive system 105 drives the operating part 103 based on a basic operation command 402, an automatic operation correcting command 404, and the manual operation correcting command 403. The control part 401 is provided with the basic-operation commanding module 2119 which outputs the basic operation command 402 to cause the working part to take a basic movement by the operating part 103, the operation-correcting-command generating module 2110 as the command data generating module 1101, which generates an operation correcting command Pm by adding the manual operation correcting command 403 to the automatic operation correcting command 404, the operation-correcting-command memory 2116 which is the command data memory 1102 and stores the operation correcting command Pm in a time series as the command data, the estimation-basic-data memory 117, and the learning module 118. The learning module 118 performs machine learning of operation correcting command Pm stored in the operation-correcting-command memory 2116, by using the estimation basic data Pd' stored in the estimation-basic-data memory 117, and, after the machine learning, the learning module 118 receives the input of the estimation basic data Pd during the operation of the operating part 103, and outputs the automatic operation correcting command 404 which is the estimated command 1103.

Below, a configuration of the skill-inheriting construction machinery 200 is described in detail.

The "construction machinery" may be any work machine, as long as it can perform a construction work by the operating part moving the working part according to the manipulation by the operator. The "construction machinery" may be, for example, a hydraulic excavator, a bulldozer, a tractor excavator, a wheeled loader, a trencher, an excavator, a crane, a lift vehicle, etc.

The manipulating part 101 outputs the manual operation correcting command 403 according to the operation by the operator.

The body part 102 is coupled to the operating part 103.

The operating part 103 has the working part 104 which performs the work, and moves the working part 104 to perform the work. Here, the phrase "moves the working part 104" means "cause the working part 104 to operate and move."

The hydraulic drive system 105 is provided over the body part 102 and the operating part 103. The hydraulic drive system 105 outputs a drive force 202 based on the operation command 201 outputted from the operation command generating module 2120, thus driving the operating part 103.

The work-state detecting part 112 detects the state of the work performed by the working part 104, and outputs the detected work state as the work-state data 212.

The operation-state detecting part 113 detects the state of the operation of the operating part 103, and outputs the detected operation state as the operation-state data 213.

Here, during machine learning (described later) by the learning module 118, data used for estimating the operation correcting command which is the target of the learning, is referred to as the "estimation basic data." The estimation basic data includes the work-state data 212, the operation-state data 213, and the reaction data 214. For convenience, the reference character "Pd'" is given to the estimation basic data used for the learning, and the reference character "Pd" is given to the estimation basic data used during the operation of the operating part 103. Note that the estimation basic data Pd and Pd' may include data other than the work-state data 212, the operation-state data 213, and the reaction data 214.

The reaction detecting part 114 detects the reaction received by the operating part 103 or the body part 102 from the work-target object due to the work performed by the working part 104, and outputs the detected reaction as the reaction data 214.

The basic-operation commanding module 2119 outputs the basic operation command 402 for the operating part 103 to cause the working part 104 to take the basic movement.

The operation-correcting-command generating module 2110 generates the operation correcting command Pm by adding the manual operation correcting command 403 to the automatic operation correcting command 404.

The operation-correcting-command memory 2116 stores the operation correcting command Pm in a time series. The estimation-basic-data memory 117 stores, in a time series, the estimation basic data including the work-state data 212, the operation-state data 213, and the reaction data 214.

The learning module 118 is a learning model which performs the machine learning. The learning model is, for example, a neural network, a regression model, a tree model, a Bayesian model, a time-series model, a cluster model, an ensemble learning model, etc. In this embodiment, the learning model is the neural network. The mode of the learning may be supervised or unsupervised learning.

For example, in case of the supervised learning, the learning module 118 reads, during the learning, the operation correcting command Pm stored in the operation-correcting-command memory 2116 as operation correcting command Pm' for learning, and also reads the estimation basic data Pd stored in the estimation-basic-data memory 117 as the estimation basic data Pd' for learning. Then, learning data is created using the operation correcting command Pm' for learning as teacher data pn, and the estimation basic data Pd' for learning as input data. Then, the estimation basic data Pd', which is the input data, is inputted into the machine learning model (e.g., the neural network), a difference between an output Pn and the teacher data pn is evaluated, and the evaluation is fed back to the machine learning model. Accordingly, the machine learning model can carry out the machine learning of the learning data. In other words, the machine learning model learns the operation correcting command Pm' by using the estimation basic data Pd'.

After the machine learning is finished, the learning module 118 outputs the output of the machine learning model to outside as the automatic operation correcting command 404. In detail, during the operation of the operating part 103, when the machine-learning model of the learning module 118 receives the input of the estimation basic data Pd, it outputs the automatic operation correcting command 404, which is the estimated command of the operation correcting command Pm' which was the learning target.

The operation command generating module 2120 generates the operation command 201 by adding the automatic operation correcting command 404, and the manual operation correcting command 403 outputted from the manipulating part 101, to the basic operation command 402. Here, the basic operation command, the automatic operation correcting command, and the manual operation correcting command are numerical data indicative of opening of the hydraulic control valves provided to the hydraulic drive system 105, and thus, addition and subtraction of these data is possible.

The hydraulic drive system 105 drives the operating part 103 based on the operation command 201.

[Operation]

The given work is, for example, a comparatively simple routine work. The routine work may be, for example, a digging work, a ground leveling work, and a rolling compaction work. It is assumed that such a given work is repeatedly performed a plurality of times by the skill-inheriting construction machinery 200 while a work position is changed. In this case, between the given works performed twice one after another, the operation correcting command Pm' in the earlier given work is learned by the learning module 118, and during the latter given work, when the learning module 118 receives the input of the estimation basic data Pd, it outputs the automatic operation correcting command 404 which reflects the result of the learning.

In detail, during the earlier given work, the highly-skilled operator manipulates the skill-inheriting construction machinery 200 to perform the given work while correcting as necessary the movement of the working part 104 based on the basic operation command 402 and the automatic operation correcting command 404.

Then, the estimation basic data Pd including the work-state data 212 indicative of the work state by the working part 104, the operation-state data 213 indicative of the operation state of the operating part 103, and the reaction data 214 indicative of the reaction received by the operating part from the work-target object due to the work performed by the working part, is stored in the estimation-basic-data memory 117 in a time series, and the operation correcting command Pm adding the manual operation correcting command 403 to the automatic operation correcting command 404 is stored in the operation-correcting-command memory 2116 in a time series. Then, during the learning after that, the learning module 118 reads the estimation basic data Pd' from the estimation-basic-data memory 117, and uses it to perform the machine learning of the operation correcting command Pm' read from the operation-correcting-command memory 2116. Therefore, the correcting manipulation by the highly-skilled operator can be learned to be outputted as the automatic operation correcting command 404. Then, during the latter given work, when the learning module 118 receives the input of the estimation basic data Pd, it outputs the automatic operation correcting command 404. Then, the hydraulic drive system 105 drives the operating part 103 while reflecting the basic operation command 402 and the automatic operation correcting command 404. Consequently, the work reflecting the automatic operation correcting command 404 as a result of the learning of the correcting manipulation by the highly-skilled operator, is performed. Therefore, the construction machinery 200 can be provided, which is capable of learning the work performed by the skill-inheriting construction machinery 200 while the operator corrects the basic movement of the working part 104 caused by the basic-operation commanding module 2119, and automatically performing the learned work.

Accordingly, the skill-inheriting construction machinery 200 can be provided, which is capable of taking over the skill of the highly-skilled operator in the construction industry, and achieving the automation of the given work in the short period of time.

{Concrete Configuration}

Next, a concrete configuration of the skill-inheriting construction machinery 200 is described, taking a hydraulic excavator 20 as one example of the construction machinery.

[Configuration of Hardware]

<Entire Configuration>

First, the entire configuration of the skill-inheriting hydraulic excavator 20 is described. The entire configuration of the skill-inheriting hydraulic excavator 20 is basically the same as that of the hydraulic excavator 10 with learning function of Embodiment 1, but is partially different.

Figure 15:
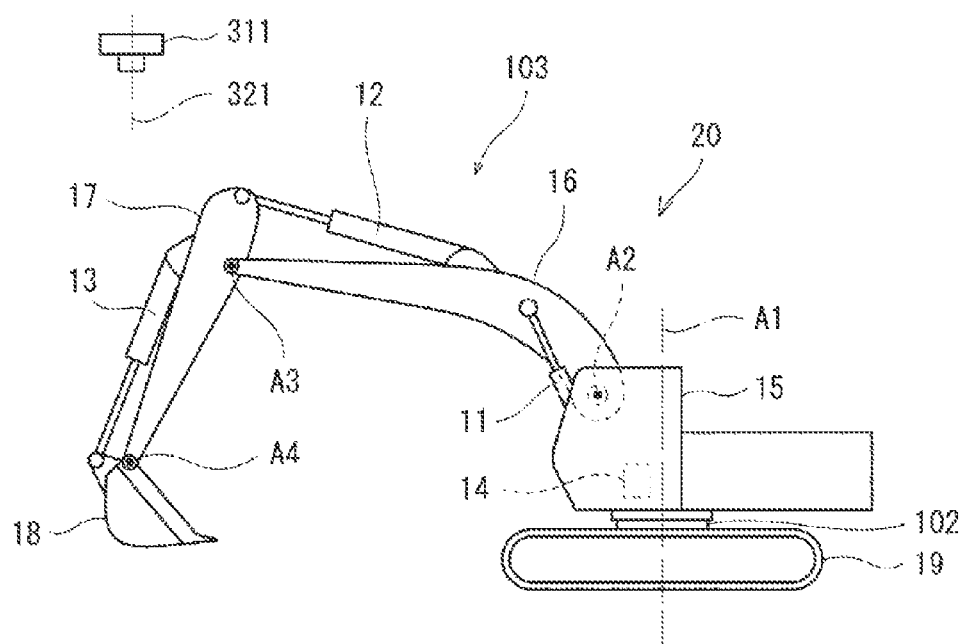
FIG. 15 is a side view illustrating a configuration of hardware of a skill-inheriting hydraulic excavator, which is one example of the skill-inheriting construction machinery.

FIG. 15 is a side view illustrating a configuration of hardware of the skill-inheriting hydraulic excavator 20, which is one example of the skill-inheriting construction machinery.

The skill-inheriting hydraulic excavator (hereinafter, may simply be referred to as a "hydraulic excavator") 20 is provided with the body part 102. The body part 102 is provided with the traveling body 19. The traveling body 19 is comprised of, for example, a vehicle traveling device provided with a continuous track (caterpillar).

The swiveling body 15 is provided on the body part 102 so as to be swivable about the vertical first rotary axis A1. The swiveling body 15 is provided with the driver's seat (not illustrated), and the manipulating part 101 is provided to the driver's seat (see FIG. 18). Note that, although not illustrated in the manipulating part 101 of FIG. 18, a travel-manipulating device which operates the traveling body 19 is provided to the driver's seat. The swiveling body 15 is further provided with the swiveling motor 14 which causes the swiveling body 15 to swivel. The swiveling motor 14 is comprised of a hydraulic motor. The swiveling body 15 is also provided with the engine 26 (see FIG. 18) for traveling. The engine 26 drives the pump part 107 (see FIG. 18) of the hydraulic drive system 1 during the work.

The base-end part of the boom 16 is coupled to the swiveling body 15 so as to be pivotable about the horizontal second rotary axis A2. The tip-end part and the base-end part of the boom cylinder 11 are rotatably coupled to the base-end part of the boom 16 and the swiveling body 15, respectively, and the boom 16 swings centering on the second rotary axis A2 according to the extension and contraction of the boom cylinder 11.

The base-end part of the arm 17 is coupled to the tip-end part of the boom 16 so as to be pivotable about the horizontal third rotary axis A3. The tip-end part and the base-end part of the arm cylinder 12 are rotatably coupled to the base-end part of the arm 17 and the middle part of the boom 16, respectively, and the arm 17 swings centering on the third rotary axis A3 according to the extension and contraction of the arm cylinder 12.

The base-end part of the bucket 18 is coupled to the tip-end part of the arm 17 so as to be pivotable about the horizontal fourth rotary axis A4. The tip-end part and the base-end part of the bucket cylinder 13 are rotatably coupled to the base-end part of the bucket 18 and the base-end part of the arm 17, respectively, and the bucket 18 pivots centering on the fourth rotary axis A4 according to the extension and contraction of the bucket cylinder 13. The bucket 18 is one example of an attachment, and other attachments may be used.

The boom 16, the arm 17, and the bucket 18 constitute a front-work device. Moreover, the bucket 18 constitutes the working part 104, and the swiveling body 15 and the front-work device (the boom 16, the arm 17, and the bucket 18) constitute the operating part 103.

In addition to the above structures, the hydraulic excavator 20 is provided with left-and-right pair of hydraulic traveling motors (not illustrated).

As will be described later, an operation-mode-switching manipulation part (not illustrated) which switches the operation mode of the hydraulic excavator 20 between a manual mode and a semi-automatic mode, is provided to the driver's seat of the skill-inheriting hydraulic excavator 20. The operator carries out the given work by operating the operation-mode-switching manipulation part to set the operation mode to the manual mode, then, operating the manipulating part 101 (including the travel-manipulating device (not illustrated)) to position the hydraulic excavator at a desired work site for the given work, then, operating the operation-mode-switching manipulation part to set the operation mode to the semi-automatic mode, and then, swiveling the swiveling body 15, and changing the postures of the booms 16 and 17, and rotary-driving the bucket 18.

The skill-inheriting hydraulic excavator 20 is further provided with the first imaging device 311. The first imaging device 311 images the state of the work performed by the bucket 18. The image captured by the first imaging device 311 is applied with image processing by the image processing module 312 (see FIG. 18) described later, so that the data indicative of the work state can be obtained, and is outputted from the image processing module 312 as the work-state data 212. The optical axis 321 of the first imaging device 311 is oriented toward the work-target object.

The first imaging device 311 is comprised of, for example, a three-dimensional (3D) camera, a camera with a depth sensor, etc. The first imaging device 311 is, for example, fixed via a suitable support member to the body part 102, fixed via a suitable supporting member to a fixed object (e.g., the ground) separated from the vehicle of the hydraulic excavator 20, or mounted on a drone.

<Hydraulic Drive System 1>

Next, the hydraulic drive system 1 which causes the hydraulic excavator 20 to operate, is described.

Figure 16:
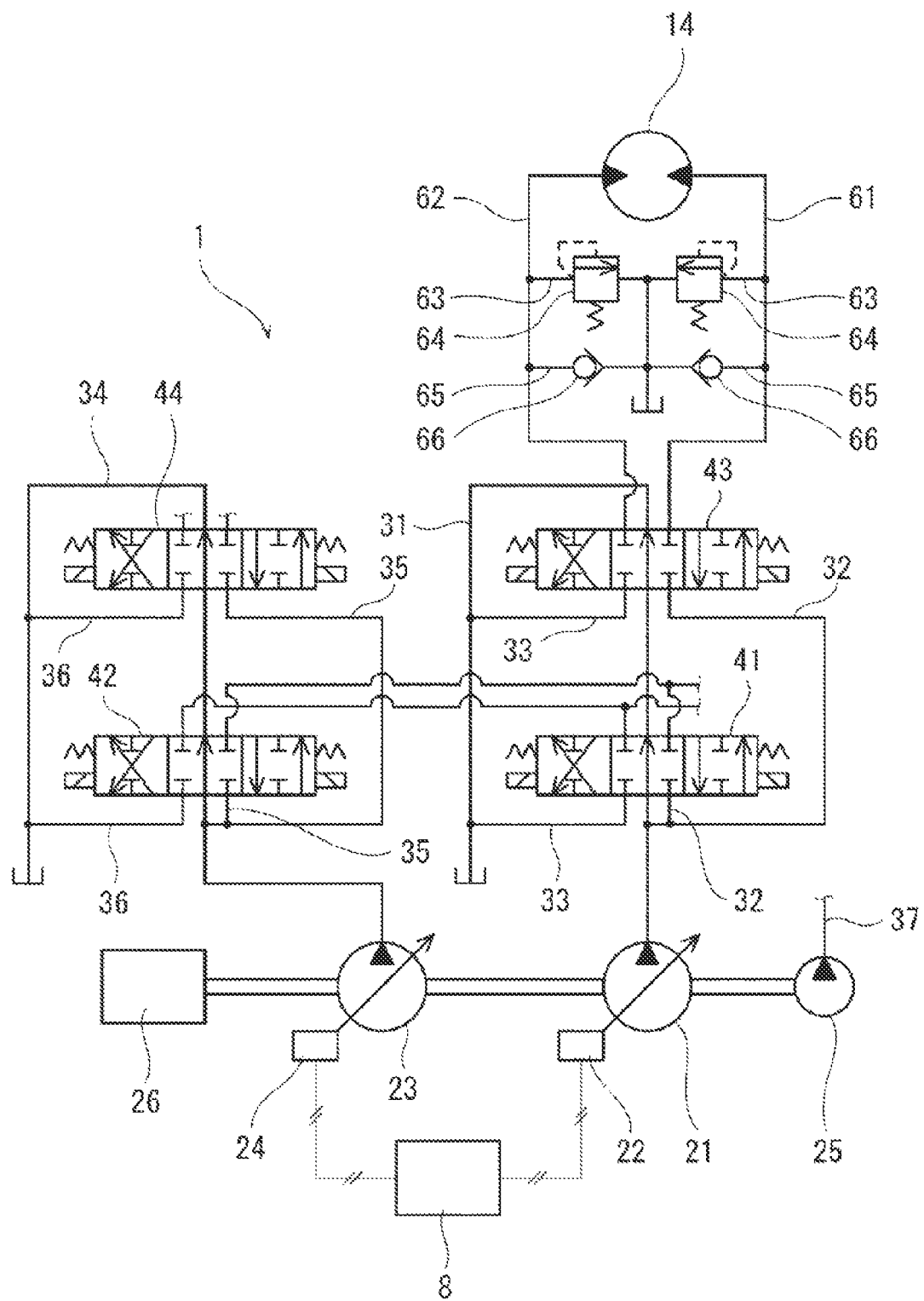
FIG. 16 is a hydraulic circuit diagram illustrating a main hydraulic circuit of a hydraulic drive system of the skill-inheriting hydraulic excavator illustrated in FIG. 15.
Figure 17:
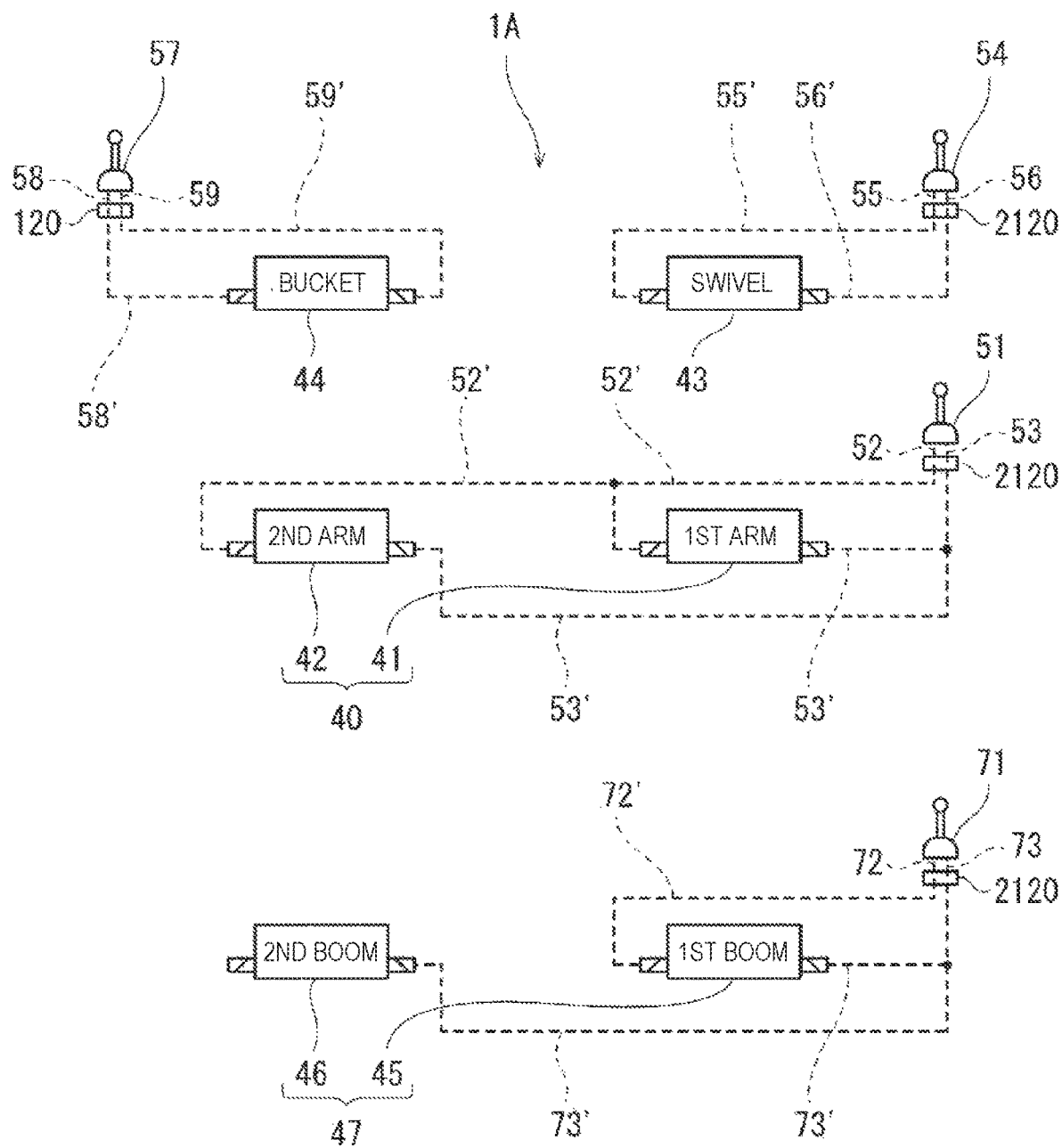
FIG. 17 is a hydraulic circuit diagram illustrating a hydraulic circuit of an operation system in the hydraulic drive system of the skill-inheriting hydraulic excavator illustrated in FIG. 15.

FIG. 16 is a hydraulic circuit diagram illustrating a main hydraulic circuit of the hydraulic drive system 1 of the skill-inheriting hydraulic excavator 20. FIG. 17 is a hydraulic circuit diagram illustrating a hydraulic circuit of an operation system (operating-system hydraulic circuit) in the hydraulic drive system of the skill-inheriting hydraulic excavator 20. The main hydraulic circuit and the operating-system hydraulic circuit are provided to the swiveling body 15.

As described above, the hydraulic drive system 1 includes the boom cylinder 11, the arm cylinder 12, and the bucket cylinder 13 as hydraulic actuators, and also includes the swiveling motor 14 and the left-and-right pair of hydraulic traveling motors (not illustrated).

Referring to FIG. 16, the hydraulic drive system 1 includes the first main pump 21 and the second main pump 23, which supply hydraulic oil to the actuators described above. Note that, in FIG. 16, illustration of the actuators other than the swiveling motor 14 is omitted for simplification of the drawing.

The first main pump 21 and the second main pump 23 are driven by the engine 26. The engine 26 also drives the sub pump 25. The first main pump 21, the second main pump 23, and the sub pump 25 constitute the pump part 107 (see FIG. 18). The output of the engine 26 is adjusted by the acceleration device 50 (see FIG. 18). The acceleration device 50 is provided with, for example, an accelerator pedal, and outputs an acceleration correcting command 75 which is an electrical command corresponding to an amount of depression of the accelerator pedal. Then, an engine controlling device (not illustrated) controls the output (speed) of the engine 26 based on an individual operation command 75' corresponding to the acceleration correcting command 75.

The first main pump 21 and the second main pump 23 are, for example, variable displacement pumps which discharge hydraulic oil in an amount corresponding to a tilt angle. Here, the first main pump 21 and the second main pump 23 are swash plate pumps which define their tilt angles by angles of swash plates. However, the first main pump 21 and the second main pump 23 may be bent axis pumps which define their tilt angles by angles each formed between a drive shaft and a cylinder block.

The amount of discharge Q1 of the first main pump 21, and the amount of discharge Q2 of the second main pump 23 are controlled in an electric positive control method. In detail, the tilt angle of the first main pump 21 is adjusted by the first flow-amount adjusting device 22, and the tilt angle of the second main pump 23 is adjusted by the second flow-amount adjusting device 24. The sub pump 25 is connected to the first flow-amount adjusting device 22 and the second flow-amount adjusting device 24 via the sub bleed line 37. The sub pump 25 functions as the drive source of the first flow-amount adjusting device 22 and the second flow-amount adjusting device 24. Details of the first flow-amount adjusting device 22 and the second flow-amount adjusting device 24 will be described later.

The first center bleed line 31 is extended from the first main pump 21 to a tank. The plurality of control valves including the first arm control valve 41 and the swivel control valve 43 (only the first arm control valve 41 and the swivel control valve 43 are illustrated) are provided on the first center bleed line 31. The control valves are connected to the first main pump 21 through the pump lines 32, respectively. That is, the control valves on the first center bleed line 31 are parallelly connected to the first main pump 21. Moreover, the control valves are connected to the tank through the tank lines 33, respectively.

Similarly, the second center bleed line 34 is extended from the second main pump 23 to a tank. The plurality of control valves including the second arm control valve 42 and the bucket control valve 44 (only the second arm control valve 42 and the bucket control valve 44 are illustrated) are provided on the second center bleed line 34. The control valves are connected to the second main pump 23 through the pump lines 35, respectively. That is, the control valves on the second center bleed line 34 are parallelly connected to the second main pump 23. Moreover, the control valves are connected to the tank through the tank lines 36, respectively.

The first arm control valve 41 controls, together with the second arm control valve 42, the supply and discharge of the hydraulic oil to the arm cylinder 12. That is, the hydraulic oil is supplied to the arm cylinder 12 from the first main pump 21 through the first arm control valve 41, as well as from the second main pump 23 through the second arm control valve 42. The first arm control valve 41 and the second arm control valve 42 constitute the arm control valve 40 (see FIG. 17).

The swivel control valve 43 controls the supply and discharge of hydraulic oil to the swiveling motor 14. That is, the hydraulic oil is supplied to the swiveling motor 14 from the first main pump 21 through the swivel control valve 43. In detail, the swiveling motor 14 is connected to the swivel control valve 43 through the pair of supply-and-discharge lines 61 and 62. The bypass lines 63 are branched from the supply-and-discharge lines 61 and 62, respectively, and are connected to a tank. Each bypass line 63 is provided with the relief valve 64. Moreover, the supply-and-discharge lines 61 and 62 are connected to the tank through the pair of makeup lines 65, respectively. Each makeup line 65 is provided with the check valve 66 which allows the flow from the tank to the supply-and-discharge line (61 or 62), but prohibits the backflow.

The bucket control valve 44 controls the supply and discharge of hydraulic oil to the bucket cylinder 13. That is, the hydraulic oil is supplied to the bucket cylinder 13 from the second main pump 23 through the bucket control valve 44.

Although not illustrated in FIG. 16, the control valves on the second center bleed line 34 include the first boom control valve 45 (see FIG. 17), and the control valves on the first center bleed line 31 include the second boom control valve 46 (see FIG. 17). The second boom control valve 46 is the valve dedicated for the operation of lifting the boom. That is, during the lifting of the boom, hydraulic oil is supplied to the boom cylinder 11 through the first boom control valve 45 and the second boom control valve, and during the lowering of the boom, hydraulic oil is supplied through only the first boom control valve 45.

Moreover, in this embodiment, each of the control valves 41 to 46 is comprised of an electromagnetic control valve.

Referring to FIG. 17, the boom control valve 47 (the first boom control valve 45 and the second boom control valve) is operated by the boom manipulation device 71. The arm control valve 40 (the first arm control valve 41 and the second arm control valve 42) is operated by the arm manipulation device 51. The swivel control valve 43 is operated by the swivel manipulation device 54. The bucket control valve 44 is operated by the bucket manipulation device 57.

In detail, the arm manipulation device 51, the swivel manipulation device 54, the bucket manipulation device 57, and the boom manipulation device 71 include manipulation levers, and output a pair of individual manual operation correcting commands (52, 53), (55, 56), (58, 59), and (72, 73) which are electrical command signals corresponding to the tilt angles of the manipulation levers, respectively. These individual manual operation correcting commands (52, 53), (55, 56), (58, 59), and (72, 73), and the acceleration correcting command 75 (described later) outputted from the acceleration device 50 constitute the manual operation correcting command 403.

The individual manual operation correcting commands 52 and 53 outputted from the arm manipulation device 51 are added, by the operation command generating module 2120, with a pair of individual basic operation commands (not illustrated) corresponding to the arm manipulation device 51 in the basic operation command 402, and a pair of individual automatic operation correcting commands (not illustrated) corresponding to the arm manipulation device 51 in the automatic operation correcting command 404, to be a pair of individual operation commands 52' and 53' corresponding to the arm manipulation device 51, and are inputted into a pair of solenoids of the first arm control valve 41 and a pair of solenoids of the second arm control valve 42, respectively.

The individual manual operation correcting commands 55 and 56 outputted from the swivel manipulation device 54 are added, by the operation command generating module 2120, with a pair of individual basic operation commands (not illustrated) corresponding to the swivel manipulation device 54 in the basic operation command 402, and a pair of individual automatic operation correcting commands (not illustrated) corresponding to the swivel manipulation device 54 in the automatic operation correcting command 404, to be a pair of individual operation commands 55' and 56' corresponding to the swivel manipulation device 54, and are inputted into a pair of solenoids of the swivel control valve 43, respectively.

The individual manual operation correcting commands 58 and 59 outputted from the bucket manipulation device 57 are added, by the operation command generating module 2120, with a pair of individual basic operation commands (not illustrated) corresponding to the bucket manipulation device 57 in the basic operation command 402, and a pair of individual automatic operation correcting commands (not illustrated) corresponding to the bucket manipulation device 57 in the automatic operation correcting command 404, to be a pair of individual operation commands 58' and 59' corresponding to the bucket manipulation device 57, and are inputted into a pair of solenoids of the bucket control valve 44, respectively.

The individual manual operation correcting commands 72 and 73 outputted from the boom manipulation device 71 are added, by the operation command generating module 2120, with a pair of individual basic operation commands (not illustrated) corresponding to the boom manipulation device 71 in the basic operation command 402, and a pair of individual automatic operation correcting commands (not illustrated) corresponding to the boom manipulation device 71 in the automatic operation correcting command 404, to be a pair of individual operation commands 72' and 73' corresponding to the boom manipulation device 71, and are inputted into a pair of solenoids of the first boom control valve 45, respectively. Moreover, the individual operation command 73' is inputted into a solenoid of the second boom control valve 46 for lifting the boom, but the individual operation command is not inputted into a solenoid of the second boom control valve 46 for lowering the boom.

Therefore, the second boom control valve 46 does not operate when the boom manipulation device 71 is operated to lower the boom.

Note that the acceleration correcting command 75 outputted from the acceleration device 50 is added, by the operation command generating module 2120, with an individual basic operation command (not illustrated) corresponding to the acceleration device 50 in the basic operation command 402, and an individual automatic operation correcting command (not illustrated) corresponding to the acceleration device 50 in the automatic operation correcting command 404, to be an individual operation command 75' corresponding to the acceleration device 50, and is inputted into the engine 26.

The pairs of individual operation commands (52', 53'), (55', 56'), (58', 59'), and (72', 73'), and the individual operation command 75' constitute the operation command 201.

The first flow-amount adjusting device 22 and the second flow-amount adjusting device 24 described above are electrically controlled by the flow-amount controlling device 8. For example, the flow-amount controlling device 8 has a memory (e.g., a ROM and a RAM) and a CPU, and the program stored in the ROM is executed by the CPU. The flow-amount controlling device 8 controls the first flow-amount adjusting device 22 and the second flow-amount adjusting device 24 so that the tilt angles of the first main pump 21 and/or the second main pump 23 increase as the pairs of individual operation commands (52', 53'), (55', 56'), (58', 59'), and (72', 73') corresponding to the manipulation devices 51, 54, 57, and 71 increase. For example, when the swiveling manipulation alone is performed, the flow-amount controlling device 8 controls the first flow-amount adjusting device 22 so that the tilt angle of the first main pump 21 increases as the pair of individual operation commands (55', 56') corresponding to the swivel manipulation device 54 increase.

[Configuration of Control System]

Next, a configuration of a control system of the skill-inheriting hydraulic excavator 20 is described.

<Entire Configuration>

Figure 18:
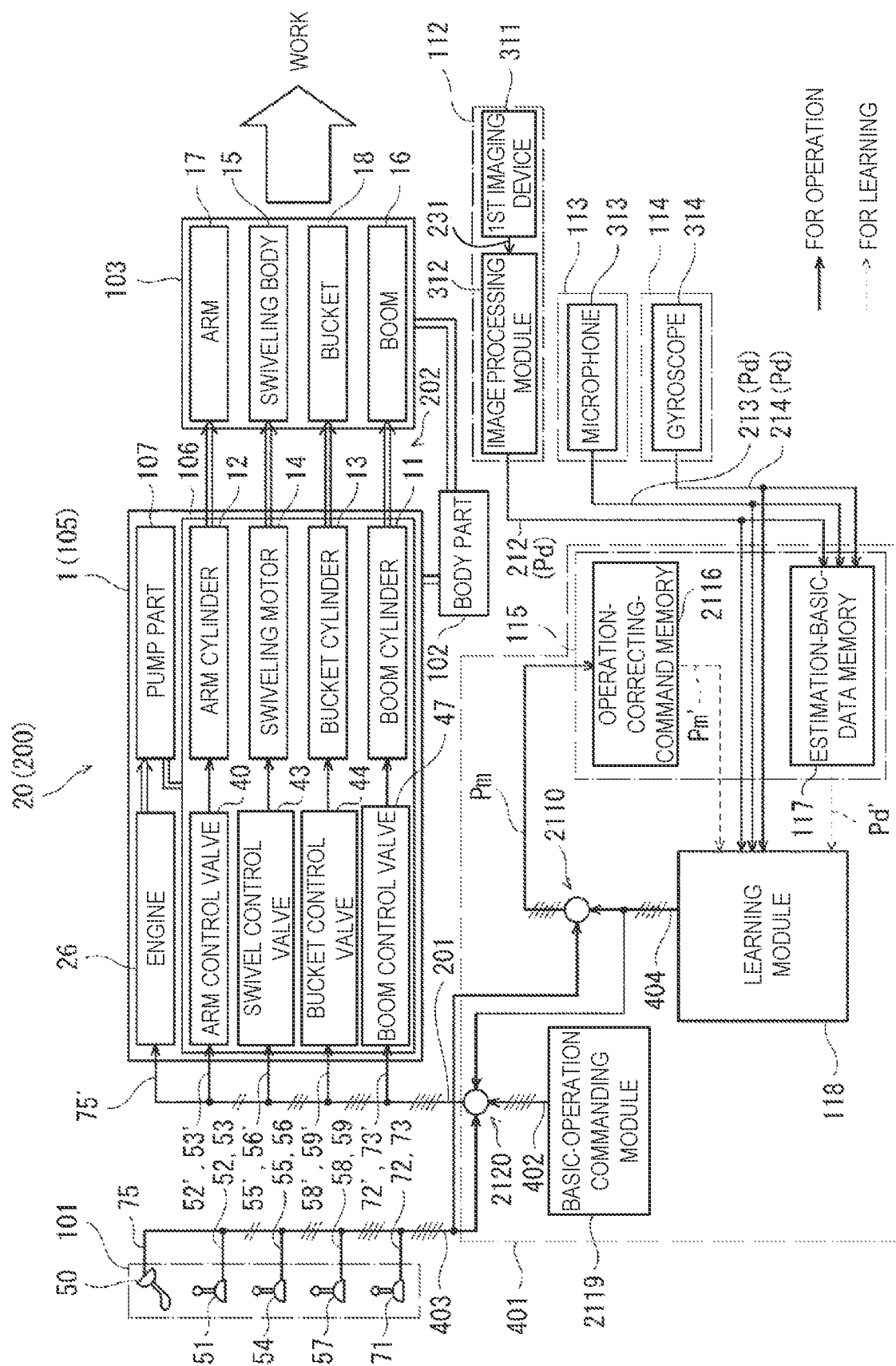
FIG. 18 is a functional block diagram illustrating a configuration of a control system of the skill-inheriting hydraulic excavator illustrated in FIG. 15.

FIG. 18 is a functional block diagram illustrating the configuration of the control system of the skill-inheriting hydraulic excavator 20. FIG. 18 illustrates the control system of the hydraulic excavator 20 related to the learning function of this embodiment. Therefore, the control system of the traveling body 19 unrelated to the learning function of this embodiment is omitted. Moreover, the skill-inheriting hydraulic excavator 20 has an overall-controlling module and an operation-mode-switching manipulation part (neither of them is illustrated). The overall-controlling module switches the operation mode of the skill-inheriting hydraulic excavator 20 between the manual mode and the semi-automatic mode, according to the operation of the operator to the operation-mode-switching manipulation part.

<Manipulating Part>

Referring to FIG. 18, the acceleration device 50, the arm manipulation device 51, the swivel manipulation device 54, the bucket manipulation device 57, and the boom manipulation device 71 constitute the manipulating part 101. The manipulating part 101 is provided to the driver's seat of the swiveling body 15.

<Hydraulic Control>

*Manual Mode*

In the manual mode, when the operator depresses the accelerator pedal of the acceleration device 50, the acceleration device 50 outputs the acceleration correcting command 75 corresponding to the depressed amount of the accelerator pedal. Then, the engine 26 drives the pump part 107 at the output based on the individual operation command 75' corresponding to the acceleration correcting command 75. Then, the pump part 107 discharges hydraulic oil to/from a hydraulic circuit 106 in an amount corresponding to the output of the pump part 107.

When the operator operates the manipulation lever of the swivel manipulation device 54, the swivel manipulation device 54 outputs the pair of individual manual operation correcting commands 55 and 56 (swivel manual operation correcting command) corresponding to the tilt angle of the manipulation lever. Then, the swivel control valve 43 supplies and discharges hydraulic oil to/from the swiveling motor 14 based on the pair of individual operation commands 55' and 56' corresponding to the pair of individual manual operation correcting commands 55 and 56. Then, the swiveling motor 14 causes the swiveling body 15 to swivel according to the supply and discharge of the hydraulic oil.

When the operator operates the manipulation lever of the boom manipulation device 71, the boom manipulation device 71 outputs the pair of individual manual operation correcting commands 72 and 73 (boom manual operation correcting command) corresponding to the tilt angle of the manipulation lever. Then, the boom control valve 47 supplies and discharges hydraulic oil to/from the boom cylinder 11 based on the pair of individual operation commands 72' and 73' corresponding to the pair of individual manual operation correcting commands 72 and 73. Then, the boom cylinder 11 lifts and lowers the boom 16 according to the supply and discharge of the hydraulic oil.

When the operator operates the manipulation lever of the arm manipulation device 51, the arm manipulation device 51 outputs the pair of individual manual operation correcting commands 52 and 53 (arm manual operation correcting command) corresponding to the tilt angle of the manipulation lever. Then, the arm control valve 40 supplies and discharges hydraulic oil to/from the arm cylinder 12 based on the pair of individual operation commands 52' and 53' corresponding to the pair of individual manual operation correcting commands 52 and 53. Then, the arm cylinder 12 swings the arm 17 according to the supply and discharge of the hydraulic oil.

When the operator operates the manipulation lever of the bucket manipulation device 57, the bucket manipulation device 57 outputs the pair of individual manual operation correcting commands 58 and 59 (bucket manual operation correcting command) corresponding to the tilt angle of the manipulation lever. Then, the bucket control valve 44 supplies and discharges hydraulic oil to/from the bucket cylinder 13 based on the pair of individual operation commands 58' and 59' corresponding to the pair of individual manual operation correcting commands 58 and 59. Then, the bucket cylinder 13 pivots the bucket 18 according to the supply and discharge of the hydraulic oil.

According to these manipulations, the work can be performed as intended by the operator.

*Semi-Automatic Mode*

In the semi-automatic mode, the operating part 103 (15 to 18) operates based on the basic operation command 402 outputted from the basic-operation commanding module 2119 and the automatic operation correcting command 404 outputted from the learning module 118, and, when the operator operates the manipulating part 101 (50, 51, 54, 57, and 71), the operation of the operating part 103 is corrected according to the manipulation by the operator.

<Estimation Basic Data Detecting Part>

As described above, the first imaging device 311 images the state of the work performed by the bucket 18. Then, the image processing module 312 applies image processing to the image captured by the first imaging device 311 so as to generate data indicative of the state of the given work, and outputs it as the work-state data 212. Therefore, the first imaging device 311 and the image processing module 312 constitute the work-state detecting part 112.

The hydraulic excavator 20 is provided with the microphone 313. The microphone 313 is installed, for example, near the engine 26 provided to the swiveling body 15, and receives operation noise of the engine 26 and converts it to operation noise data so as to output it as the operation-state data 213. The operation noise of the engine 26 increases as the output of the engine 26 increases, while it decreases as the output of the engine 26 decreases. Therefore, the operation noise data shows a driving-source state indicative of a state of the driving source of the pump part 107, and thus, it is the operation-state data indicative of the operation state of the hydraulic excavator 20. Accordingly, the microphone 313 constitutes a driving-source state detecting part, and thus, the operation-state detecting part 113.

The swiveling body 15 or the body part 102 of the hydraulic excavator 20 is provided with the gyroscope 314. The gyroscope 314 detects an inclination and vibration (including an excitation force, acceleration, and angular acceleration) of the swiveling body 15 or the body part 102, converts them to inclination and vibration data, and outputs the inclination and vibration data as the reaction data 214. For example, when the boom 16 and the arm 17 stick the bucket 18 into the ground, the swiveling body 15 and the body part 102 incline due to a reaction force from the ground, and the swiveling body 15 and the body part 102 vibrate by receiving the excitation force through the arm 17 and the boom 16 (the operating part 103). Therefore, the inclination and vibration data outputted from the gyroscope 314 indicates the reaction received by the operating part 103 and the body part 102. Accordingly, the gyroscope 314 constitutes the reaction detecting part 114.

<Control Part>

The control part 401, the image processing module 312, and the overall-controlling module (not illustrated) are, for example, comprised of an arithmetic unit including a processor and a memory. The operation-correcting-command generating module 2110, the learning module 118, the basic-operation commanding module 2119, the operation command generating module 2120, the overall-controlling module, and the image processing module 312 are functional blocks implemented by the processor executing a given program stored in the memory of the arithmetic unit. The learning data memory 115 is comprised of this memory. The arithmetic unit is comprised of, for example, a microcontroller, an MPU, an FPGA (Field Programmable Gate Array), a PLC (Programmable Logic Controller), etc. The control part 401, the image processing module 312, and the overall-controlling module (not illustrated) may be comprised of a sole arithmetic unit which executes a centralized control, or a plurality of arithmetic units which execute a distributed control. The sole arithmetic unit or the plurality of arithmetic units may be provided to the swiveling body 15 of the hydraulic excavator 20, for example.

<Basic-Operation Commanding Module 2119>

The basic-operation commanding module 2119 outputs the basic operation command 402 based on a control program for the given work stored in the memory of the arithmetic unit.

<Operation Command Generating Module 2120>

Here, as described above, the operation command generating module 2120 generates the pair of individual operation commands 52' and 53' corresponding to the arm manipulation device 51, by adding the pair of individual manual operation correcting commands 52 and 53 outputted from the arm manipulation device 51, the pair of individual basic operation commands (not illustrated) corresponding to the arm manipulation device 51 in the basic operation command 402 outputted from the basic-operation commanding module 2119, and the pair of individual automatic operation correcting commands (not illustrated) corresponding to the arm manipulation device 51 in the automatic operation correcting command 404 outputted from the learning module 118.

Moreover, the operation command generating module 2120 generates the pair of individual operation commands 55' and 56' corresponding to the swivel manipulation device 54, by adding the pair of individual manual operation correcting commands 55 and 56 outputted from the swivel manipulation device 54, the pair of individual basic operation commands (not illustrated) corresponding to the swivel manipulation device 54 in the basic operation command 402, and the pair of individual automatic operation correcting commands (not illustrated) corresponding to the swivel manipulation device 54 in the automatic operation correcting command 404.

Moreover, the operation command generating module 2120 generates the pair of individual operation commands 58' and 59' corresponding to the bucket manipulation device 57, by adding the pair of individual manual operation correcting commands 58 and 59 outputted from the bucket manipulation device 57, the pair of individual basic operation commands (not illustrated) corresponding to the bucket manipulation device 57 in the basic operation command 402, and the pair of individual automatic operation correcting commands (not illustrated) corresponding to the bucket manipulation device 57 in the automatic operation correcting command 404.

Moreover, the operation command generating module 2120 generates the pair of individual operation commands 72' and 73' corresponding to the boom manipulation device 71, by adding the pair of individual manual operation correcting commands 72 and 73 outputted from the boom manipulation device 71, the pair of individual basic operation commands (not illustrated) corresponding to the boom manipulation device 71 in the basic operation command 402, and the pair of individual automatic operation correcting commands (not illustrated) corresponding to the boom manipulation device 71 in the automatic operation correcting command 404.

Moreover, the operation command generating module 2120 generates the individual operation command 75' corresponding to the acceleration device 50, by adding the individual manual operation correcting command 75 outputted from the acceleration device 50, the individual basic operation command (not illustrated) corresponding to the acceleration device 50 in the basic operation command 402, and the individual automatic operation correcting command (not illustrated) corresponding to the acceleration device 50 in the automatic operation correcting command 404.

<Operation-Correcting-Command Generating Module 2110>

Here, the operation-correcting-command generating module 2110 generates a pair of individual operation correcting commands (not illustrated) corresponding to the arm manipulation device 51 (hereinafter, referred to as an "arm operation correcting command") by adding the pair of individual manual operation correcting commands 52 and 53 outputted from the arm manipulation device 51, and the pair of individual automatic operation correcting commands (not illustrated) corresponding to the arm manipulation device 51 in the automatic operation correcting command 404 outputted from the learning module 118.

Moreover, the operation-correcting-command generating module 2110 generates a pair of individual operation correcting commands (not illustrated) corresponding to the swivel manipulation device 54 (hereinafter, referred to as a "swivel operation correcting command") by adding the pair of individual manual operation correcting commands 55 and 56 outputted from the swivel manipulation device 54, and the pair of individual automatic operation correcting commands (not illustrated) corresponding to the swivel manipulation device 54 in the automatic operation correcting command 404.

Moreover, the operation-correcting-command generating module 2110 generates a pair of individual operation correcting commands (not illustrated) corresponding to the bucket manipulation device 57 (hereinafter, referred to as a "bucket operation correcting command") by adding the pair of individual manual operation correcting commands 58 and 59 outputted from the bucket manipulation device 57, and the pair of individual automatic operation correcting commands (not illustrated) corresponding to the bucket manipulation device 57 in the automatic operation correcting command 404.

Moreover, the operation-correcting-command generating module 2110 generates a pair of individual operation correcting commands (not illustrated) corresponding to the boom manipulation device 71 (hereinafter, referred to as a "boom operation correcting command") by adding the pair of individual manual operation correcting commands 72 and 73 outputted from the boom manipulation device 71, and the pair of individual automatic operation correcting commands (not illustrated) corresponding to the boom manipulation device 71 in the automatic operation correcting command 404.

Moreover, the operation-correcting-command generating module 2110 generates an individual operation correcting command (not illustrated) corresponding to the acceleration device 50 (hereinafter, referred to as an "accelerating operation correcting command") by adding the acceleration correcting command 75 outputted from the acceleration device 50, and the individual automatic operation correcting command (not illustrated) corresponding to the acceleration device 50 in the automatic operation correcting command 404.

These individual operation correcting commands constitute the operation correcting command Pm.

<Learning Data Memory 115>

The operation-correcting-command memory 2116 of the learning data memory 115 stores the operation correcting command Pm in a time series.

The estimation-basic-data memory 117 of the learning data memory 115 stores, in a time series, the estimation basic data Pd including the work-state data 212 outputted from the image processing module 312, the operation-state data 213 outputted from the microphone 313, and the reaction data 214 outputted from the gyroscope 314.

<Learning Module 118>

As described above, during the learning, the learning module 118 executes the machine learning of the learning data comprised of the operation correcting command (hereinafter, referred to as an "operation correcting command for learning") Pm' read from the operation correcting command memory 2116, and the estimation basic data (hereinafter, referred to as an "estimation basic data for learning") Pd' read from the estimation-basic-data memory 17. After the machine learning is finished, when the learning module 118 receives the input of the estimation basic data Pd during the operation of the operating part 103, it outputs the automatic operation correcting command 404.

Figure 19:
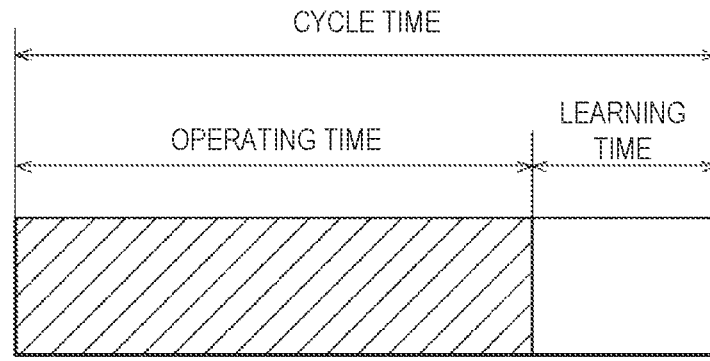
FIG. 19 is a schematic view illustrating a cycle time of operation of the skill-inheriting hydraulic excavator illustrated in FIG. 15.
Figure 20:
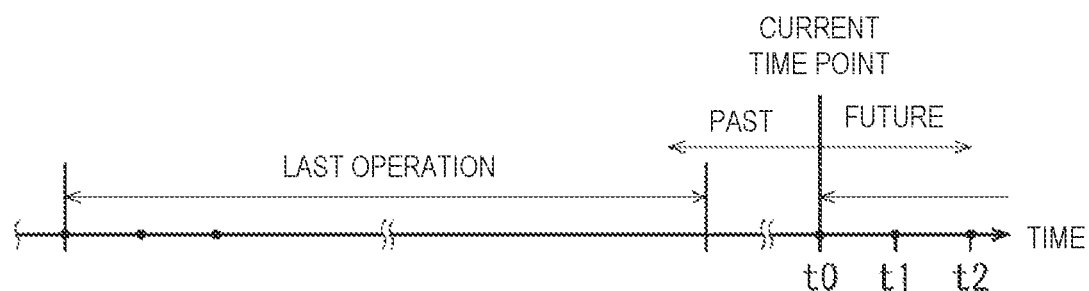
FIG. 20 is a schematic view illustrating time-series data of each of an operation correcting command, an operation correcting command for learning, estimation basic data, and estimation basic data for learning, in the skill-inheriting hydraulic excavator illustrated in FIG. 15.
Figure 20:
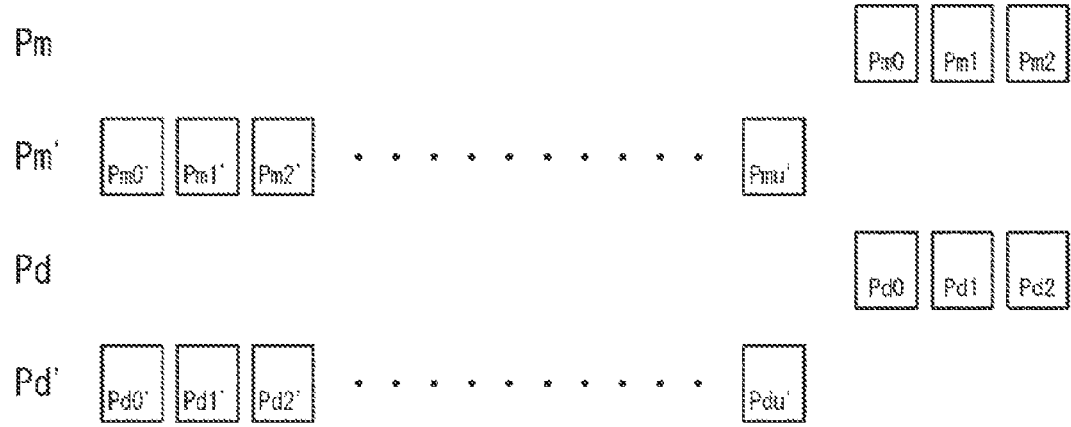
Figure 21:
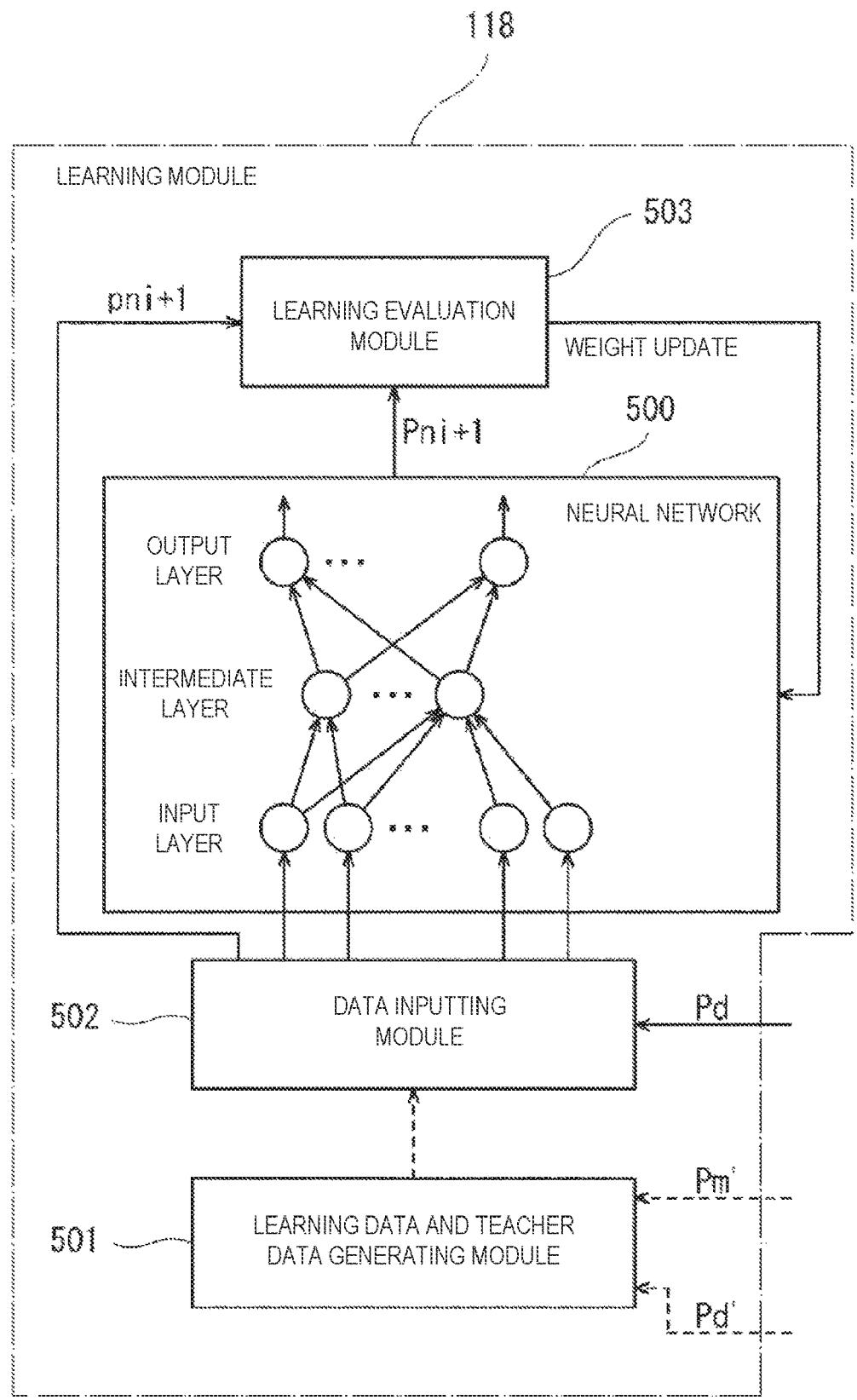
FIG. 21 is a functional block diagram illustrating a configuration of a learning module illustrated in FIG. 20.

Next, the configuration of the learning module 118 is described in detail. FIG. 19 is a schematic view illustrating a cycle time of the operation of the skill-inheriting hydraulic excavator 20 illustrated in FIG. 15. FIG. 20 is a schematic view illustrating time-series data of each of the operation correcting command Pm, the operation correcting command Pm' for learning, the estimation basic data Pd, and the estimation basic data Pd' for learning, in the skill-inheriting hydraulic excavator 20. FIG. 21 is a functional block diagram illustrating the configuration of the learning module 118.

<Temporal Relation Between Time-Series Data>

First, a temporal relation between the time-series data is described.

Referring to FIG. 19, the hydraulic excavator 20 repeatedly performs the given work for a plurality of times. Although a time interval between the given works performed one after another is not fixed, in this embodiment, a period of time from a start of the earlier given work among the given works performed one after another, to immediately before the start of the latter given work is referred to as a "cycle time" for convenience. Moreover, the period of time between the earlier given work and the latter given work is allotted for time during which the learning module 118 executes the learning using the learning data (the operation correcting command Pm' for learning and the estimation basic data Pd' for learning) of the "earlier given work." Below, the "period of time between the earlier given work and the latter given work" is referred to as a "learning time," and the period of time during which the hydraulic excavator 20 performs the given work is referred to as an "operating time." Moreover, the operation of the hydraulic excavator 20 during the "operating time" in each cycle time is referred to as a "-th operation."

In FIG. 20, "operation" currently under progress is "this operation," and "operation" before that is a "last operation." In the operation currently under progress, time-series data Pm0, Pm1, Pm2, Pm3 . . . Pmu (hereinafter, abbreviated as Pm0 to Pmu) of the operation correcting command Pm, is acquired at a given sampling interval. Moreover, the time-series data Pd0 to Pdu of the estimation basic data Pd is similarly acquired. Then, the time-series data Pm0 to Pmu of the operation correcting command Pm acquired in the last operation becomes time-series data Pm0' to Pmu' of the operation correcting command Pm' for learning in this operation. Moreover, the time-series data Pd0 to Pdu of the estimation basic data Pd acquired in the last operation becomes the time-series data Pd0' to Pdu' of the estimation basic data Pd' for learning in this operation. Below, a suffix number of the time-series data represents an order of sampling time point (intermittent time point). This means that the time-series data with the same suffix number are acquired at the same sampling time point.

<Configuration of Learning Module 118>

Referring to FIG. 21, the learning module 118 is provided with, for example, a neural network 500, a learning data and teacher data generating module 501, a data inputting module 502, and a learning evaluation module 503.

The neural network 500 has an input layer, an intermediate layer, and an output layer. The number of neurons in each layer is set suitably. A well-known learning method may be applied to the learning by the neural network 500. Therefore, it is briefly described here. Here, the neural network 500 is, for example, a recurrent neural network. The mode of learning is, for example, supervised learning.

The learning data and teacher data generating module 501 generates the time-series data pn1 to pnu of the teacher data pn, based on the time-series data Pm0' to Pmu' of the operation correcting command Pm' for learning. Moreover, the time-series data Pd0' to Pdu−1' of the learning data is generated based on the time-series data Pd0' to Pdu' of the estimation basic data Pd' for learning.

The data inputting module 502 sequentially inputs the time-series data Pd0' to Pdu−1' of the learning data to each neuron of the input layer. Here, when the data inputting module 502 inputs the time-series data Pdi of the learning data at the certain sampling time point ti, the neural network 500 calculates an estimated operation correcting command Pni+1 at the next sampling time point ti+1 by the forward calculation. Then, the learning evaluation module 503 retrieves, among the time-series data pn1 to pnu of the teacher data pn, the time-series data pni+1 at the next sampling time point ti+1, and, for example, calculates a sum of squared errors $e^2$ of the accelerating operation correcting command, the arm operation correcting command, the swivel operation correcting command, the bucket operation correcting command, and the boom operation correcting command, between the estimated operation correcting command Pni+1 and the time-series data pni+1 of the teacher data pn. Next, the learning evaluation module 503 updates weights of the neural network 500 by a backward calculation. The data inputting module 502 and the learning evaluation module 503 execute this processing for all of the time-series data Pd0' to Pdu−1' of the learning data, and finish the learning when, for example, the sum of squared errors $e^2$ becomes below a given threshold in the processing for all of the time-series data Pd0' to Pdu−1' of the learning data.

After the learning is finished, during the next operation of the hydraulic excavator 20, the data inputting module 502 inputs the estimation basic data Pd0 at the current sampling time point to. Then, the neural network 500 outputs the estimated operation correcting command Pn1 at the next sampling time point t1 as the automatic operation correcting command 404. Note that a suitable initial operation command is outputted as an initial value of the automatic operation correcting command 404.

Therefore, the learning result of the neural network 500 (the learning module 118) is reflected on the operation of the hydraulic excavator 20.

Note that, when the data inputting module 502 inputs the time-series data Pdi of the estimation basic data Pd' for learning at a certain sampling time point ti, it may be the time-series data Pdi−1 to Pdi−n ("n" is a given positive number) prior to the sampling time point ti. In this case, during the operating time, the data inputting module 502 is required to similarly input at each sampling time point tj the past estimation basic data Pdj−1 to Pdj−n together with the current estimation basic data Pdj. Since the estimation basic data Pd0 to Pdj−1 is stored in a time series in the estimation-basic-data memory 117 at each sampling time point tj, the data inputting module 502 reads it from the estimation-basic-data memory 117, and generates the past estimation basic data Pdj−1 to Pdj−n. Accordingly, the learning efficiency of the neural network 500 improves. This is because, when the operator estimates the motion of the bucket 18, he/she estimates the next motion of the bucket 18 considering not only the work state, the operation state of the hydraulic excavator 20, and the reaction from the work-target object at the present moment, but also the series of work states, operation states of the hydraulic excavator 20, and reactions from the work-target object in the past, and thus, the motion of the bucket 18 is estimated accurately.

Note that information on other than the work state, the operation state of the hydraulic excavator 20, and the reaction from the work-target object may be used as the learning data, and the input data during the operating time of the hydraulic excavator 20.

[Operation]

Next, operation of the skill-inheriting hydraulic excavator 20 configured as above, is described. Below, the operation of the hydraulic excavator 20 is described taking a case where the hydraulic excavator 20 performs the digging work as the given work, as one example.

Figure 22:
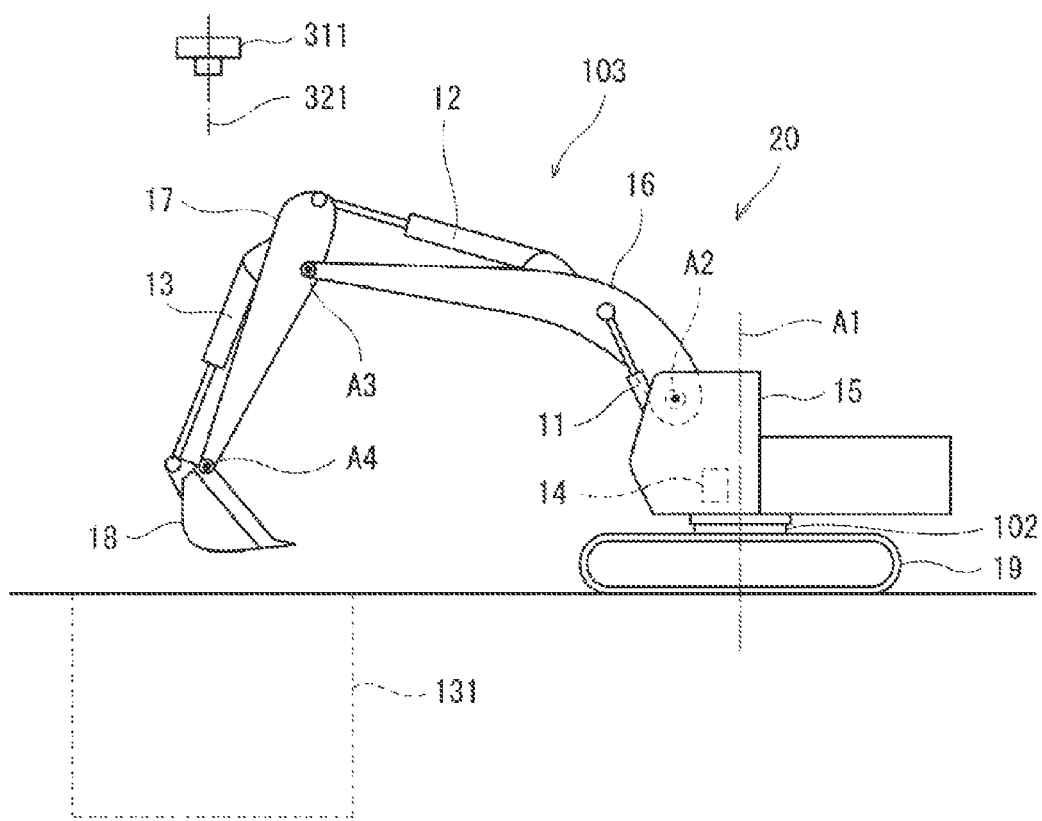
FIG. 22 is a schematic view illustrating a situation of a constructing work performed by the skill-inheriting hydraulic excavator illustrated in FIG. 15.

FIG. 22 is a schematic view illustrating a situation of a constructing work performed by the skill-inheriting hydraulic excavator 20.

Referring to FIG. 22, the first imaging device 311 is placed above a site at which the hole 131 is planned to be dug. The first imaging device 311 is, for example, attached to a suitable supporting member installed on the ground. The first imaging device 311 is, for example, wirelessly and data-communicably connected to the arithmetic unit (the learning module 118) provided to the swiveling body 15 of the hydraulic excavator 20. The first imaging device 311 is placed, for example, above the center part of the hole 131 such that the optical axis 321 is oriented toward the center part of the hole 131.

Next, the hydraulic excavator 20 is set to an initial state. In this initial state, for example, the hydraulic excavator 20 is located at an installation place suitable for digging the hole 131, and takes an initial posture (e.g., a posture illustrated in FIG. 22). The installation place is set to, for example, a place where the hydraulic excavator 20 can dig the hole 131 by scooping earth and sand by the bucket 18, and dispose the scooped earth and sand inside the bucket 18 at an earth-and-sand disposal area, without traveling of the hydraulic excavator 10. Here, the installation place is assumed to be set to an intermediate position between the site where the hole 131 is to be dug, and the earth-and-sand disposal area. Moreover, the first imaging device 311 is assumed to be a 3D camera.

Then, the operation mode of the hydraulic excavator 20 is switched to the semi-automatic mode.

<Digging Work>

*Case without Correcting Manipulation*

Next, the highly-skilled operator carries out the digging work while performing correcting manipulation of the hydraulic excavator 20. Here, first, the operator does not perform the correcting manipulation in order to confirm the basic operation of the hydraulic excavator 20. Below, this operation is referred to as an "initial operation." In this initial operation, the digging work is performed by the basic-operation commanding module 2119 outputting the basic operation command 402 to operate the operating part 103. Here, in a control program for a given work which defines (implements) the basic-operation commanding module 2119, a geological feature (e.g., composition and a hardness of the ground) of the site to be dug, is assumed to be a given geological feature. The digging work is schematically performed as described below.

First, the basic-operation commanding module 2119 lowers the bucket 18 from a descending position above the hole 131 to stick it into the ground (including the ground inside the hole 131) at the site where the hole 131 is to be dug (sticking operation). In this sticking operation, the bucket 18 is operated so that a claw of the bucket 18 at its tip end is oriented downward before the bucket 18 is lowered. Next, the stuck bucket 18 is pivoted to a closer side while being pushed onto the ground, so as to scoop earth and sand (scooping operation). Next, the bucket 18 is moved to the descending position and lifted from the hole 131 (lifting operation). Next, the swiveling body 15 is swiveled until the boom 16 is oriented toward the earth-and-sand disposal area (forward swiveling operation). Next, the bucket 18 is pivoted to a farther side to dispose the earth and sand inside the bucket 18 at the earth-and-sand disposal area (earth-and-sand disposing operation). Next, the swiveling body 15 is reversely swiveled so that the bucket 18 is located at the descending position (reverse swiveling operation). After this, when the series of operation is repeated for a given times, the digging work is finished.

Meanwhile, although the learning data is acquired during this operation, and the machine learning is executed by the learning module 118 after finishing the given work, it will be described later in detail.

*Case with Correcting Manipulation in First Mode*

Figure 23:
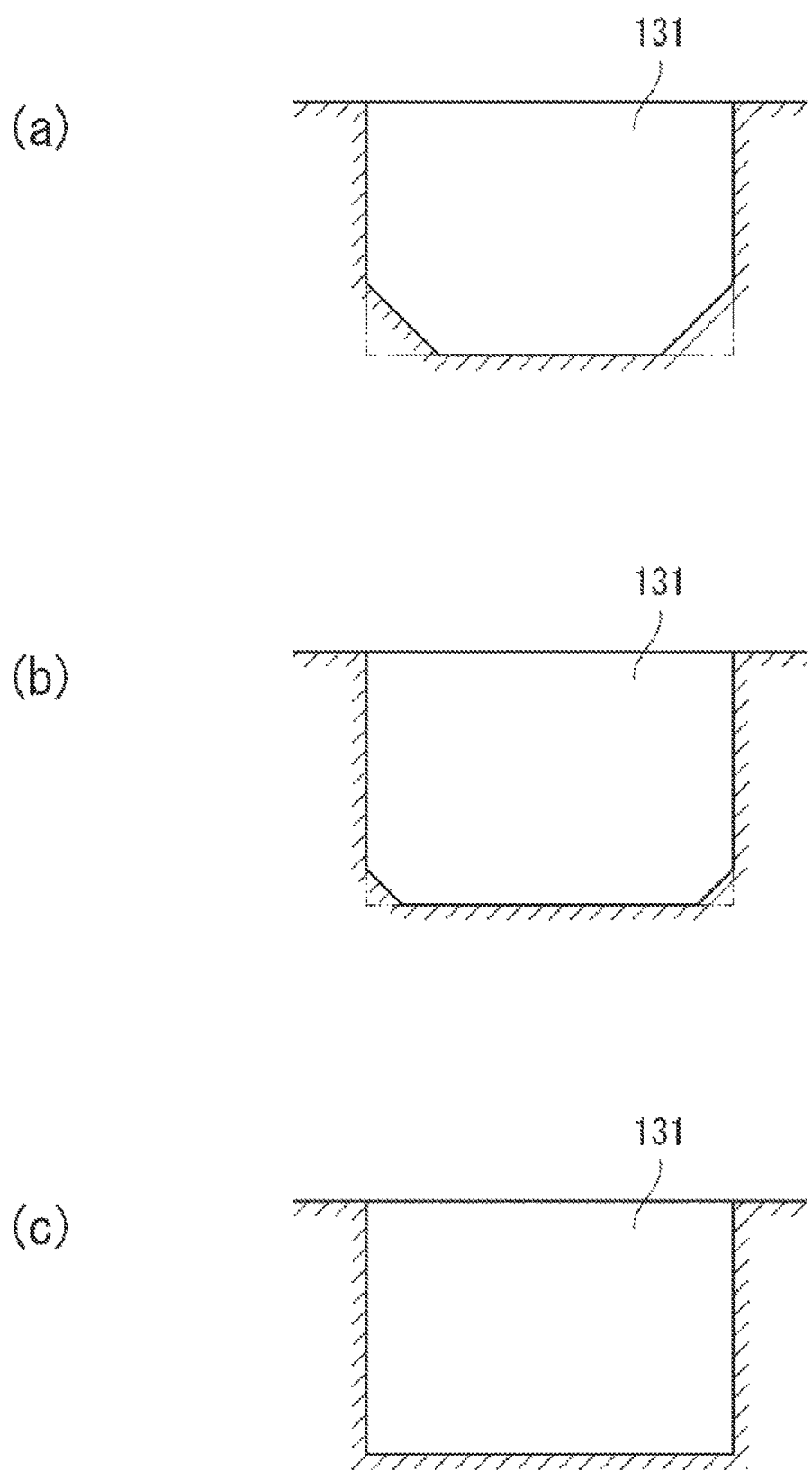
FIGS. 23(a) to 23(c) are cross-sectional views schematically illustrating a process in which the digging work performed by a hydraulic excavator 20 is improved through a correcting manipulation to dig down corners.

Next, the operator performs correcting manipulation in First Mode as one example of the correcting manipulation. FIGS. 23(a) to 23(c) are cross-sectional views schematically illustrating a process in which the digging work performed by the hydraulic excavator 20 is improved through the correcting manipulation to dig down corners. In FIGS. 23(a) to 23(c), solid lines indicate a cross-sectional shape of the hole 131 actually formed, and two-dot lines indicate a given cross-sectional shape of the hole 131 assumed based on the control program for the given work.

As illustrated in FIG. 23(a), a hole having a cross-sectional shape in which corners remain undug is formed through the work in the initial operation without the correcting manipulation. This is because the work of digging down the corners is too difficult to be sufficiently managed by the control program for the given work.

In this case, the operator operates the operation-mode-switching manipulation part to switch the operation mode to the manual mode, and manually manipulates the hydraulic excavator 20 so as to form the hole 131 having the given cross-sectional shape. Then, the operator moves the hydraulic excavator 20 to a site planned to be dug next. Below, operation after this is referred to as a "second operation."

Referring to FIG. 18, the operator switches the operation mode of the hydraulic excavator 20 to the semi-automatic mode. Then, the hydraulic excavator 20 starts the basic operation described above. The operator operates the manipulating part 101 as necessary so as to correct the operation of the operating part 103 of the hydraulic excavator 20. Particularly, when digging down the corners of the hole 131, the basic operation is corrected almost entirely.

As described above, when the operator operates the manipulating part 101 (i.e., the acceleration device 50, the arm manipulation device 51, the swivel manipulation device 54, the bucket manipulation device 57, and the boom manipulation device 71), the manual operation correcting command 403 is outputted, and the basic operation command 402 is corrected based on the manual operation correcting command 403. As a result, the basic operation of the operating part 103 is corrected according to the correction of the basic operation command 402. Meanwhile, the manual operation correcting command 403 is added to the automatic operation correcting command 404 outputted from the learning module 118, and thus, the operation correcting command Pm is generated.

<Information for Determining Next Manipulation>

During the correction, the operator visually confirms the state of the digging, and intuits how the bucket 18, the arm 17, the boom 16, and the driver's seat (the swiveling body 15) are currently to be operated, through the visual confirmation of the postures of the bucket 18, the arm 17, and the boom 16. Moreover, when the bucket 18 acts on the ground (digs the ground, rakes the earth, etc.), the operator determines, by sensing the reaction, whether or not the current work (action) is appropriate. Then, the operator determines the next manipulation instantly considering these. Here, the reaction is, for example, the inclination and vibration (including the excitation force, the acceleration, and the angular acceleration) at the driver's seat. Moreover, when the operator determines the next manipulation, he/she puts importance on the state (e.g., a speed and noise) of the engine 26 which is the driving source.

Here, the state of the digging is one example of the information indicating the work state. The postures of the bucket 18, the arm 17, and the boom 16 are one example of the information indicating the operation state of the hydraulic excavator 20. The inclination and vibration at the driver's seat (the swiveling body 15) is one example of the reaction from the ground. The state of the engine 26 (e.g., the speed and the noise) is information indicating the state of the driving source, and thus, indicating the operation state of the hydraulic excavator 20. Therefore, these information are preferably used as the estimation basic data Pd' for the machine learning by the learning module 118.

<Data Acquisition for Learning>

The operation-correcting-command memory 2116 of the learning data memory 115 stores the operation correcting command Pm corresponding to the manipulation described above.

On the other hand, during the series of operation for the given work described above, the estimation basic data Pd is acquired as described below.

The first imaging device 311 images the state of the digging work performed by the bucket 18, the image processing module 312 applies the image processing to the captured image to generate the data indicative of the state of the digging work as the work-state data 212, and the estimation-basic-data memory 117 of the learning data memory 115 stores the generated work-state data 212.

In detail, during the operation from the sticking operation to the lifting operation, the first imaging device 311 mainly images the arm 17 and the bucket 18 as well as the hole 131, and during the operation from the forward swiveling operation to the reverse swiveling operation, the first imaging device 311 mainly images the hole 131. The image processing module 312 applies, for example, well-known image processing (e.g., edge processing) to the captured image to discriminate between the area of the arm 17 and the bucket 18 and the area of the hole 131, and generates data of the planar shape of the hole 131 and the depth at the center part. Particularly, in the image captured during the earth-and-sand disposing operation, the area of the arm 17 and the bucket 18 does not exist, but only the area of the hole 131 exists. Therefore, in the work-state data 212 during the earth-and-sand disposing operation, the data of the planar shape of the hole 131 and the depth at the center part is accurately identified.

During the series of operation for the given work, the microphone 313 receives the noise of the engine 26. This received noise data (the operation-state data 213) is stored in the estimation-basic-data memory 117.

Particularly, during the scooping operation, for example, the operator causes the bucket 18 to pivot by increasing the output of the engine. Therefore, the earth and sand of the ground of the hole 131 can be appropriately scooped. Accordingly, during the scooping operation, a magnitude of the increased output of the engine can be identified based on a magnitude of the received noise data.

During the series of operation for the given work, the gyroscope 314 detects the inclination and vibration (including the excitation force, the acceleration, and the angular acceleration) of the swiveling body 15 (driver's seat) or the body part 102, as the reaction from the ground of the hole 131. This reaction data 214 is stored in the learning data memory 115 (accurately, the estimation-basic-data memory 117).

Particularly, during the sticking operation, the reaction from the ground when the bucket 18 is stuck into the ground, indicates a hardness of the ground. Therefore, during the sticking operation, the hardness of the ground where the bucket 18 is stuck, is identified based on a magnitude of the reaction data.

As described above, in this embodiment, the data capable of identifying the information suitable for determining the next manipulation is acquired as the learning data.

<Machine Learning>

After the given work by the hydraulic excavator 20 is finished, the learning data stored in the learning data memory 115 is used for the machine learning by the neural network 500. Here, as described above, when the time-series data Pdi of the learning data at each sampling time point ti is inputted, the past time-series data Pdi−1 to Pdi−n ("n" is a given positive number) is inputted.

In the given work in the second operation, as illustrated in FIG. 23(b), although the digging down of the corners is improved compared to the initial operation, it is still insufficient. The operator operates the operation-mode-switching manipulation part to switch the operation mode to the manual mode, and manually manipulates the hydraulic excavator 20 so as to form the hole 131 having the given cross-sectional shape. Then, the operator moves the hydraulic excavator 20 to a site planned to be dug next, and sets the hydraulic excavator 20 to the initial state described above. Below, operation after this is referred to as a "third operation."

Referring to FIG. 18, the operator switches the operation mode of the hydraulic excavator 20 to the semi-automatic mode. Then, the hydraulic excavator 20 outputs the automatic operation correcting command 404 reflecting the learning result described above, and the basic operation command 402 is corrected based on the automatic operation correcting command 404. Therefore, the operation of the operating part 103 is corrected so as to reflect the correcting manipulation in the second operation.

The operator further performs the correcting manipulation to the operation of the operating part 103 reflecting the correcting manipulation performed in the second operation, so that the cross-sectional shape of the hole 131 becomes the given shape. Accordingly, the manual operation correcting command 403 corresponding to the correcting manipulation is outputted, and the basic operation command 402 corrected based on the automatic operation correcting command 404 is further corrected based on the manual operation correcting command 403. As a result, according to the given work in the third operation, as illustrated in FIG. 23(c), the hole 131 having the given cross-sectional shape in which the corners are sufficiently dug down is formed.

Meanwhile, the manual operation correcting command 403 corresponding to the additional correcting manipulation is added to the automatic operation correcting command 404 which reflects the learning result of the correcting manipulation performed in the second operation, and thus, the operation correcting command Pm is generated.

During the learning after this, the learning module 118 executes the machine learning of the operation correcting command Pm, and the learning module 118 outputs the automatic operation correcting command 404 reflecting the operation correcting command Pm. Accordingly, the basic operation command 402 outputted from the basic-operation commanding module 2119 is corrected based on the automatic operation correcting command 404 reflecting the correcting manipulation accumulated in the second operation and the third operation. Therefore, the operation of the operating part 103 is corrected so as to reflect the correcting manipulations in the second operation and the third operation. As a result, after that, it becomes unnecessary for the operator to operate the manipulating part 101 for improvement.

As described above, according to the hydraulic excavator 20 of this embodiment, since the manual operation correcting command 403 by the operator is accumulated in the learning module 118, the skill (here, the digging work) of the operator is consequently handed over to the learning module 118. Moreover, since the learning module 118 learns through the actual practice, the learning period can be shorter.

*Case with Correcting Manipulation in Second Mode*

Next, a case where the operator performs correcting manipulation in Second Mode is described as one example.

Figure 24:
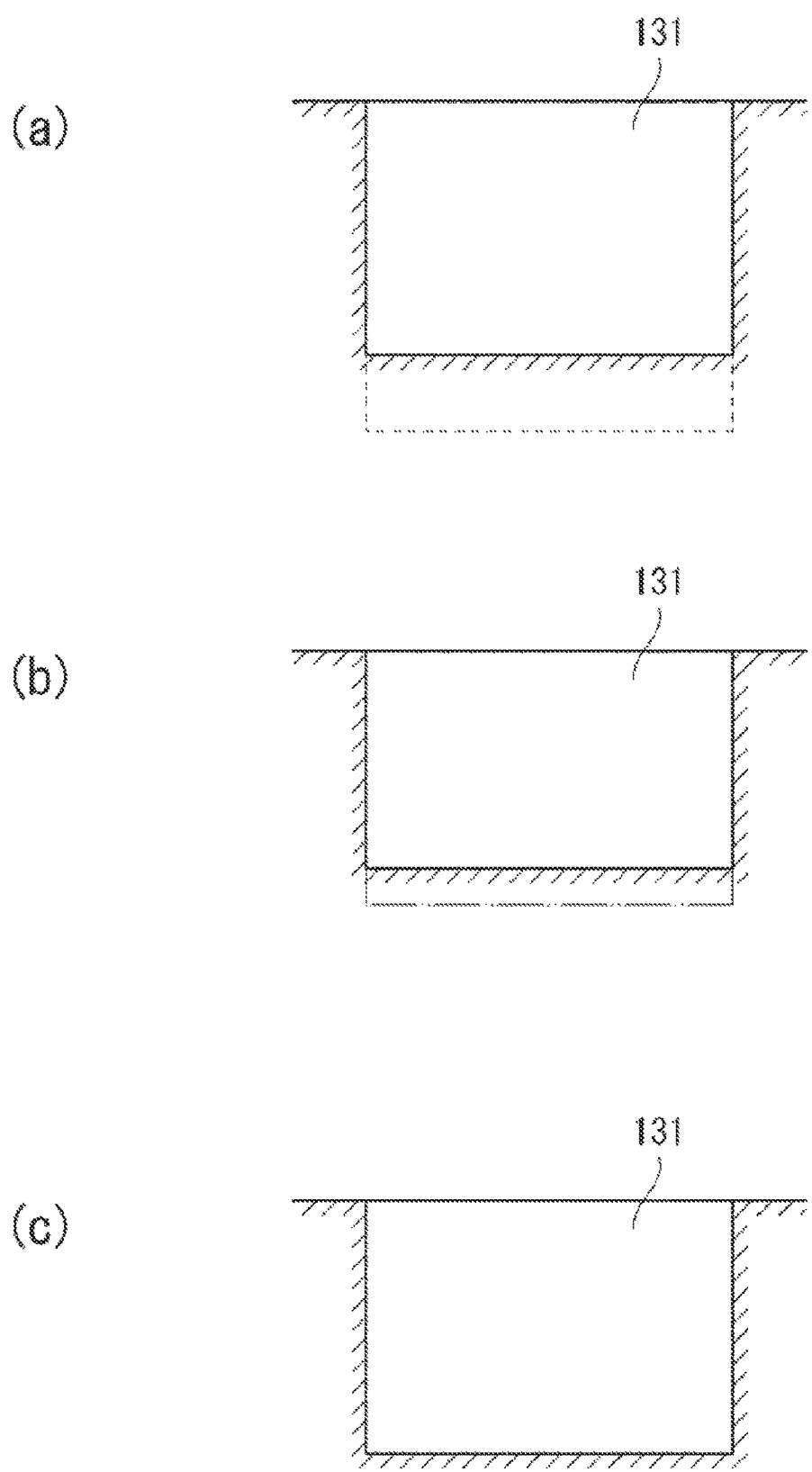
FIGS. 24(a) to 24(c) are cross-sectional views schematically illustrating a process in which a digging work performed by the hydraulic excavator 20 is improved through a correcting manipulation according to a geological feature of a site planned to be dug.

FIGS. 24(a) to 24(c) are cross-sectional views schematically illustrating a process in which the digging work performed by the hydraulic excavator 20 is improved through the correcting manipulation according to the geological feature of the site to be dug. In FIG. 24(a), a broken line indicates a cross-sectional shape of the hole 131 when it is assumed that the operator does not perform the correcting manipulation.

Referring to FIG. 24(a), when the geological feature of the site where the hole 131 is planned to be dug is softer (easier to be dug) than the given geological feature assumed based on the control program for the given work, if the operating part 103 of the hydraulic excavator 20 performs the basic operation, the hole 131 having a cross-sectional shape with a deeper depth than the given cross-sectional shape is formed as indicated by the broken line. However, here, the highly-skilled operator carries out the digging while performing the correcting manipulation of the hydraulic excavator 20 in the semi-automatic mode. Then, the learning module 118 executes the machine learning of this correcting manipulation. Therefore, when the geological feature of the site where the hole 131 is to be dug after this is similar to this operation, the hydraulic excavator 20 digs the hole having the given cross-sectional shape by being controlled by the control part 401 without the correcting manipulation by the operator.

However, for example, when the geological feature of the site where the hole 131 is planned to be dug is harder (more difficult to be dug) than the given geological feature assumed based on the control program for the given work, the estimation basic data (e.g., the inclination, the vibration, etc., at the driver's seat when the bucket 18 is stuck into the ground, and the shape of the hole 131 imaged by the first imaging device 311 during the digging) acquired during the work is different from the data acquired when the geological feature of the site where the hole 131 is to be dug is softer than the given geological feature. Therefore, for example, the learning module 118 outputs the automatic operation correcting command 404 in which an amount of correction is zero. Accordingly, when the operator does not perform the correcting manipulation, the operating part 103 performs the basic operation based on the basic operation command, and thus, as illustrated in FIG. 24(b), the hole 131 having a cross-sectional shape with a shallower depth than the given cross-sectional shape is formed, for example.

However, actually, the highly-skilled operator carries out the digging while performing the correcting manipulation to the operation of the operating part 103 in order to appropriately deal with this hard geological feature. As a result, as illustrated in FIG. 24(c), the hole 131 having the given cross-sectional shape is formed. Then, the learning module 118 executes the machine learning of this correcting manipulation. Therefore, when the geological feature of the site where the hole 131 is to be dug after this is similar in the hardness to this operation, the hydraulic excavator 20 digs the hole having the given cross-sectional shape by being controlled by the control part 401 without the correcting manipulation by the operator.

As described above, various modes exist, in which the basic operation of the operating part 103 needs to be corrected. However, by using the learning module 118 which executes the machine learning like the hydraulic excavator 20, the learning module 118 learns the manual operation correcting command 403 (accurately, the operation correcting command Pm) according to the mode every time the correction of the basic operation of the operating part 103 is required, and thus, the taking over of the skill of the operator can be achieved easily.

Moreover, according to the hydraulic excavator 20, since a part of the basic operation of the operating part 103 related to the given work, which is unnecessary to be corrected, is automatically executed by the basic-operation commanding module 2119, the operator only performs the necessary correction. Therefore, a load for the operator is reduced. Moreover, since the work varies even by the highly-skilled operator, the accuracy of the work improves when only a part of the work is performed through the manipulation by the operator as described above, compared to the case where the entire work is performed through the manipulation by the operator.

Conclusion

As described above, according to Embodiment 4, the construction machinery 200 can be provided, which is capable of learning the work performed by the construction machinery 200 while the operator performs the correcting manipulation of the basic operation of the working part 104 caused by the basic-operation commanding module 2119, and automatically performing the learned work.

Accordingly, the skill-inheriting construction machinery 200 can be provided, which is capable of taking over the skill of the highly-skilled operator in the construction industry, and achieving the automation of the given work in the short period of time.

Moreover, according to Embodiment 4, a conventional hydraulic excavator can be remodeled to the skill-inheriting hydraulic excavator 20 of the present disclosure by adding the arithmetic unit constituting the control part 401 and the detector which acquires the estimation basic data, to the conventional hydraulic excavator.

Moreover, the present disclosure can be easily applied to construction machinery other than the hydraulic excavator 20, by referring to the description of Embodiment 4.

Embodiment 5

Embodiment 5 of the present disclosure is the hydraulic excavator 20 of Embodiment 4, in which the operation-state detecting part 113 is further provided with the second imaging device 331 and the image processing module 333.

Figure 25:
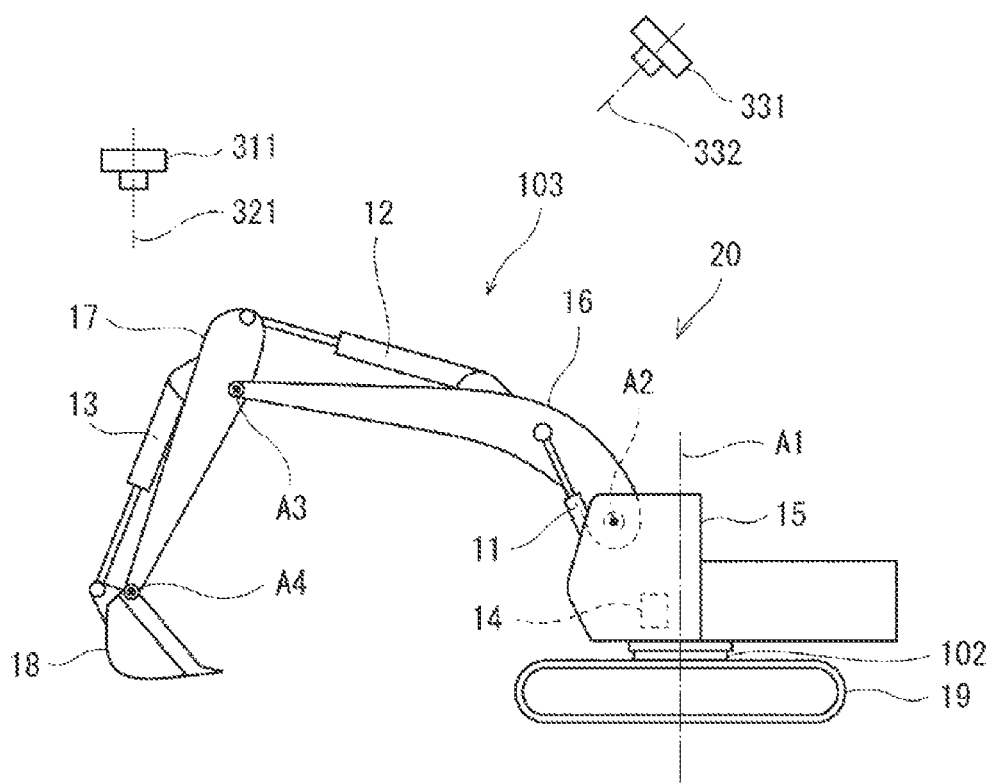
FIG. 25 is a side view illustrating a configuration of hardware of a skill-inheriting hydraulic excavator, which is one example of skill-inheriting construction machinery according to Embodiment 5 of the present disclosure.
Figure 26:
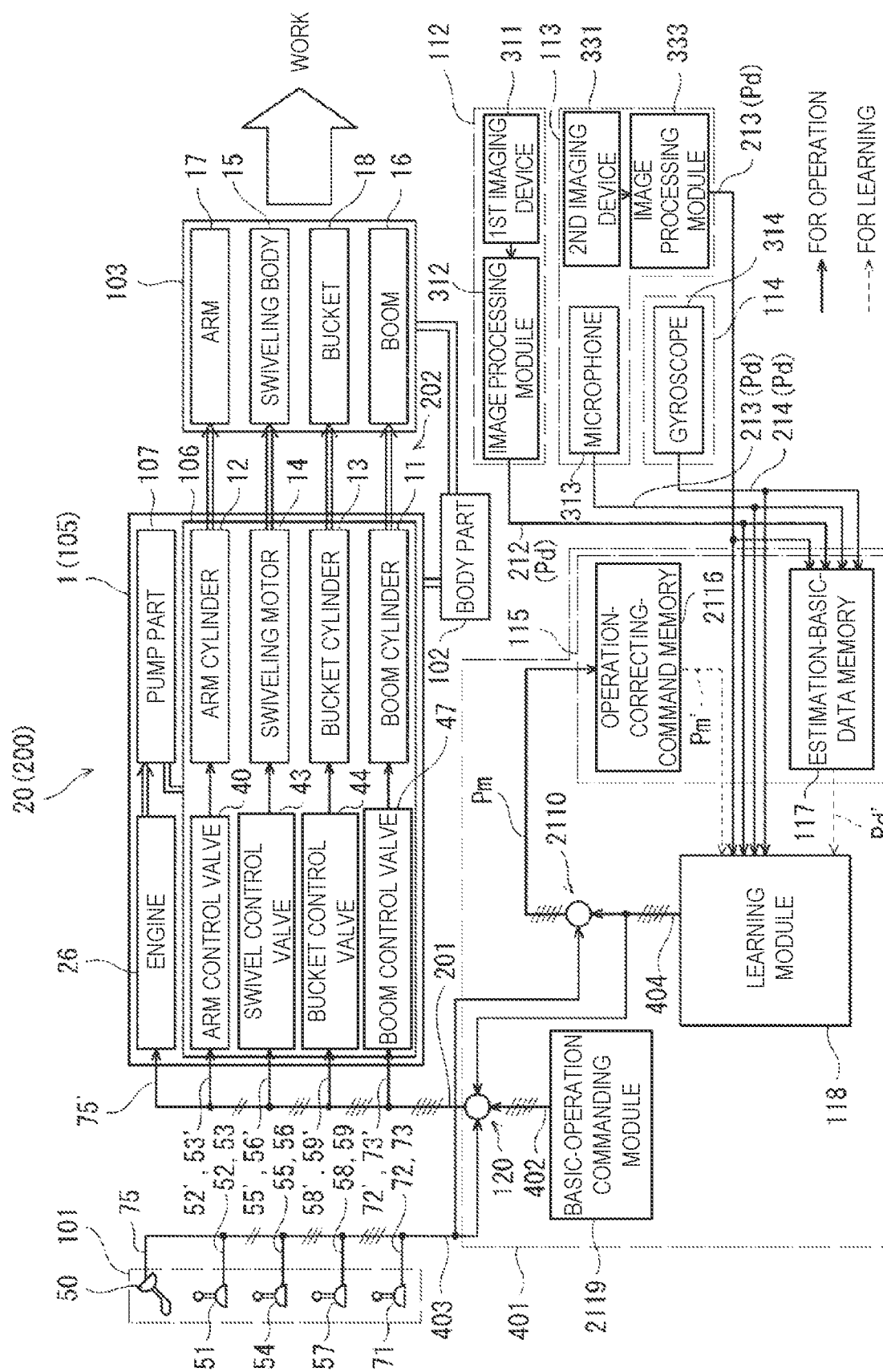
FIG. 26 is a functional block diagram illustrating a configuration of a control system of the skill-inheriting hydraulic excavator illustrated in FIG. 25.

FIG. 25 is a side view illustrating a configuration of hardware of the skill-inheriting hydraulic excavator 20 according to Embodiment 5. FIG. 26 is a functional block diagram illustrating a configuration of a control system of the skill-inheriting hydraulic excavator 20 illustrated in FIG. 25.

Referring to FIGS. 25 and 26, in the hydraulic excavator 20 of this embodiment, the operation-state detecting part 113 is further provided with the second imaging device 331 and the image processing module 333. The other configurations are the same as those of the hydraulic excavator 20 of Embodiment 4.

The second imaging device 331 entirely images the hydraulic excavator 20. The image captured by the second imaging device 331 is applied with image processing by the processing part 333 so as to obtain data indicative of the posture of the hydraulic excavator 20, and is outputted from the image processing module 333 as the operation-state data 213. The optical axis 332 of the second imaging device 331 is oriented toward the hydraulic excavator 20.

The second imaging device 331 is comprised of, for example, an ordinal digital camera. The second imaging device 331 is, for example, fixed to a fixed object (e.g., the ground) separated from the vehicle of the hydraulic excavator 20 via a suitable supporting member, or mounted on a drone.

For example, the image processing module 333 applies the image processing to the image captured by the second imaging device 331 to extract a contour of the hydraulic excavator 20, and outputs this contour data as the operation-state data 213. The contour data is postural data which can identify the posture of the operating part 103 of the hydraulic excavator 20.

According to Embodiment 5, during the series of operation described in Embodiment 4, the posture of the hydraulic excavator 20 is identified based on the contour of the hydraulic excavator 20 in the operation-state data 213. Therefore, the efficiency of the machine learning by the learning module 118 improves, and the automatic operation correcting command 404 outputted from the learning module 118 during the operation of the operating part 103 becomes more appropriate.

Embodiment 6

Embodiment 6 of the present disclosure exemplarily describes the hydraulic excavator 20 of Embodiment 4, in which the operation-state detecting part 113 is further provided with the sensor part 341.

Figure 27:
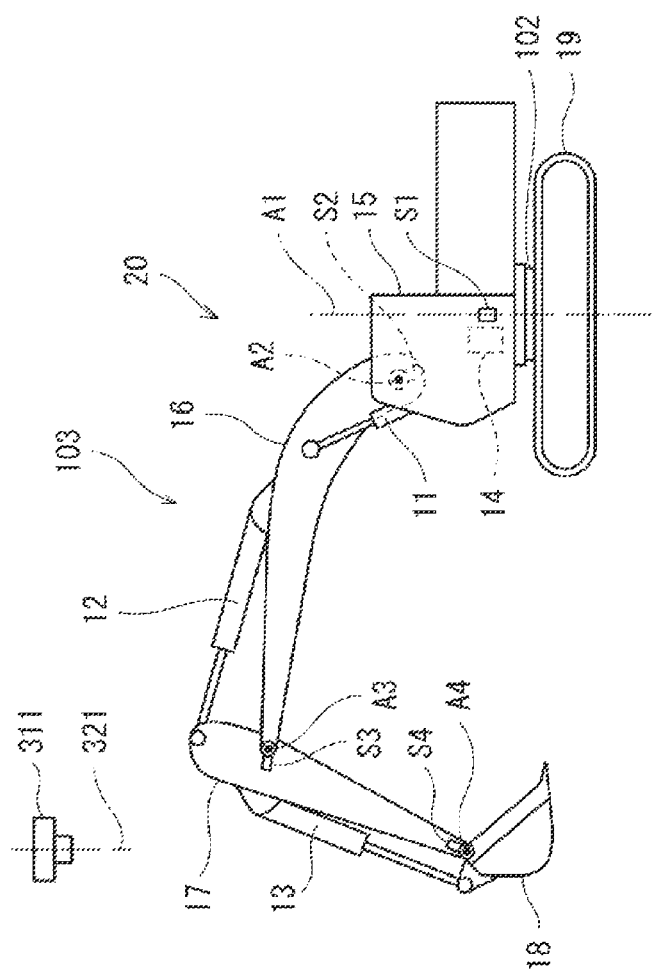
FIG. 27 is a side view illustrating a configuration of hardware of a skill-inheriting hydraulic excavator, which is one example of skill-inheriting construction machinery according to Embodiment 6 of the present disclosure.
Figure 28:
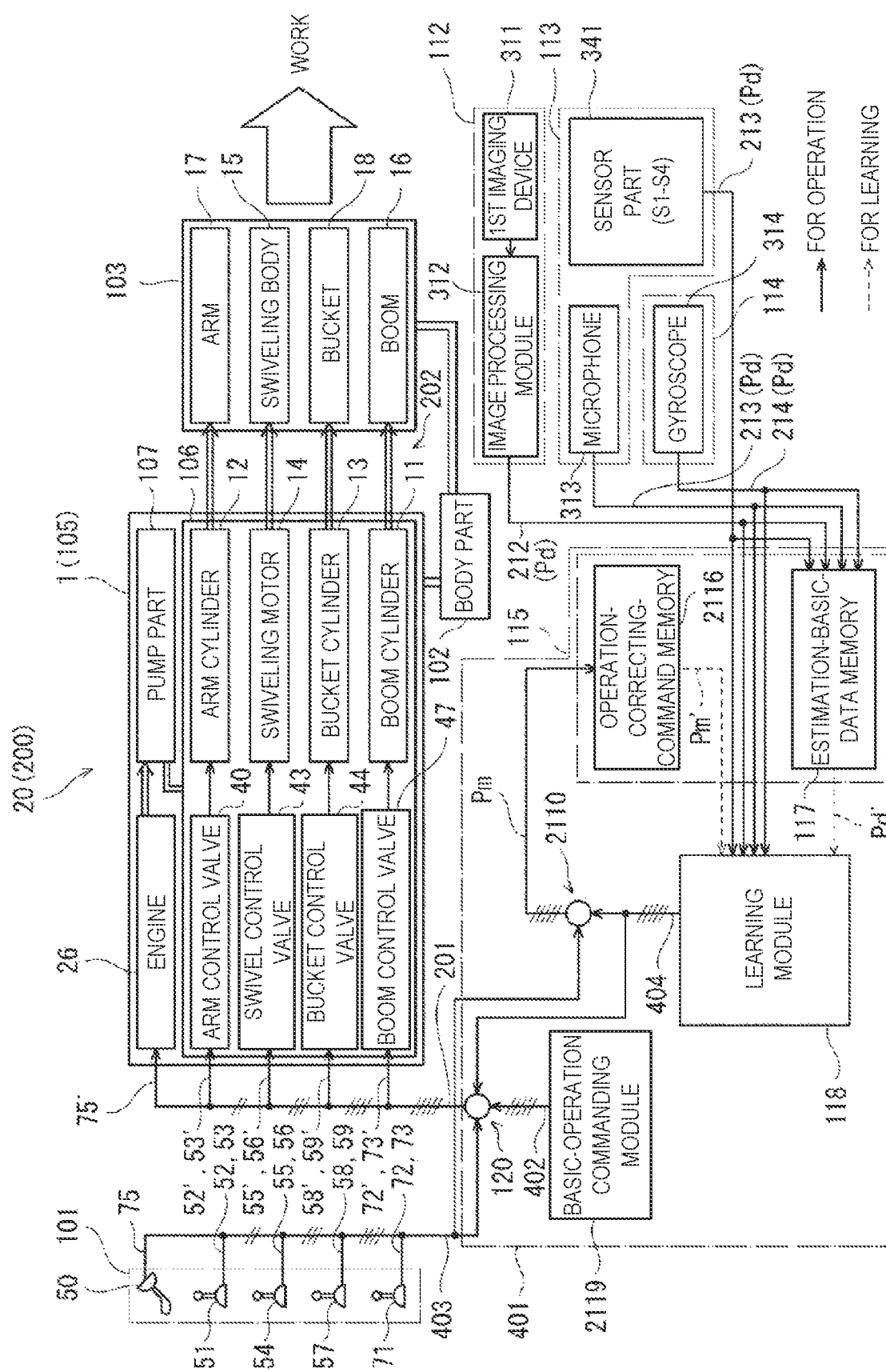
FIG. 28 is a functional block diagram illustrating a configuration of a control system of the skill-inheriting hydraulic excavator illustrated in FIG. 27.

FIG. 27 is a side view illustrating a configuration of hardware of the skill-inheriting hydraulic excavator 20 according to Embodiment 6. FIG. 28 is a functional block diagram illustrating a configuration of a control system of the skill-inheriting hydraulic excavator 20 illustrated in FIG. 27.

Referring to FIG. 28, in the hydraulic excavator 20 of this embodiment, the operation-state detecting part 113 is further provided with the sensor part 341. The other configurations are the same as those of the hydraulic excavator 20 of Embodiment 4. The sensor part 341 is comprised of the sensors S1 to S4.

Referring to FIG. 27, the hydraulic excavator 20 is provided with the sensors S1 to S4. In detail, the swiveling body 15 is provided with the sensor S1 which detects the rotational angle of the swiveling body 15 about the rotary axis A1. The boom 16 is provided at its base-end part with the sensor S2 which detects the rotational angle of the boom 16 about the rotary axis A2. The arm 17 is provided at its base-end part with the sensor S3 which detects the rotational angle of the arm 17 about the rotary axis A3. The arm 17 is provided at its tip-end part with the sensor S4 which detects the rotational angle of the bucket 18 about the rotary axis A4.

The sensor part 341 outputs the data of the rotational angles detected by the sensors S1 to S4 as the operation-state data 213. A combination of the data of the rotational angles detected by the sensors S1 to S4, is the postural data which can identify the posture of the operating part 103 of the hydraulic excavator 20.

According to Embodiment 6, during the series of operation described in Embodiment 4, the posture of the hydraulic excavator 20 is identified based on the combination of the rotational angles detected by the sensors S1 to S4 in the operation-state data 213. Therefore, the efficiency of the machine learning by the learning module 118 improves, and the automatic operation correcting command 404 outputted from the learning module 118 during the operation of the operating part 103 becomes more appropriate.

Embodiment 7

In this embodiment of the present disclosure, a mode is exemplary described, in which the hydraulic excavator 20 of any one of Embodiments 4 to 6 is configured so that the manipulation device generates a pilot pressure, and the control valve is controlled based on the pilot pressure.

Figure 29:
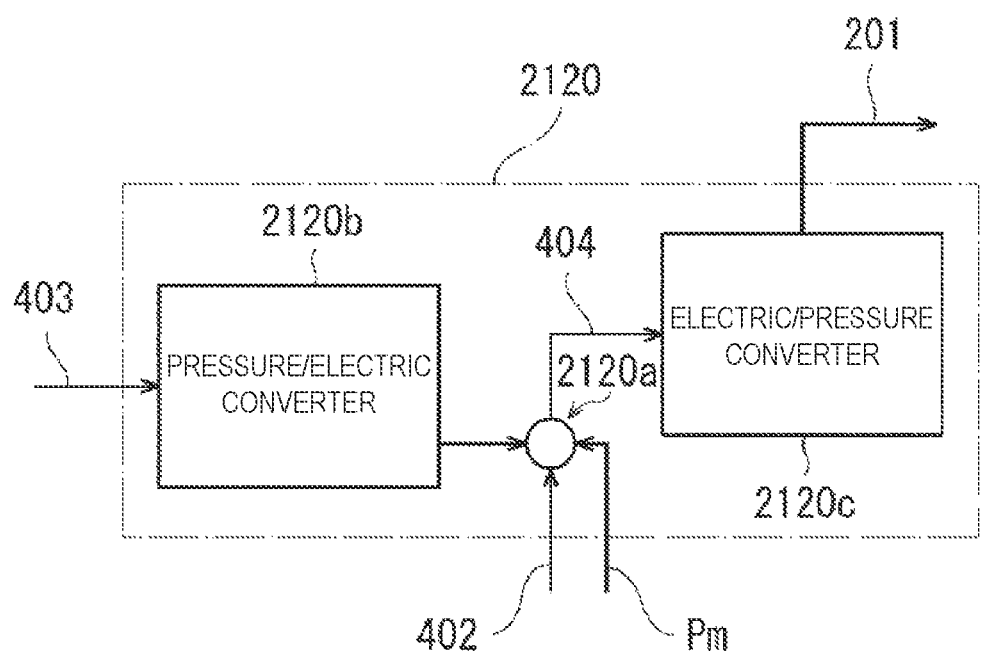
FIG. 29 is a functional block diagram illustrating a configuration of an operation command generating module of a skill-inheriting hydraulic excavator, which is one example of skill-inheriting construction machinery according to Embodiment 7 of the present disclosure.

FIG. 29 is a functional block diagram illustrating a configuration of an operation command generating module of a skill-inheriting hydraulic excavator, which is one example of skill-inheriting construction machinery according to Embodiment 7 of the present disclosure.

Referring to FIGS. 18 and 29, in Embodiment 7, the arm manipulation device 51, the swivel manipulation device 54, the bucket manipulation device 57, and the boom manipulation device 71 of the manipulating part 101 output the pairs of individual manual operation correcting commands (52, 53), (55, 56), (58, 59), and (72, 73) in pilot pressures, respectively. Moreover, the arm control valve 40, the swivel control valve 43, the bucket control valve 44, and the boom control valve 47 are comprised of control valves which are controlled based on the pilot pressures.

Meanwhile, the operation command generating module 2120 is comprised of an adder 2120a, a pressure/electric converter 2120b, and an electric/pressure converter 2120c.

The pressure/electric converter 2120b is comprised of, for example, four pairs of piezoelectric elements. The pressure/electric converter 2120b converts the four pairs of individual manual operation correcting commands (52, 53), (55, 56), (58, 59), and (72, 73) which are pilot pressure signals outputted from the arm manipulation device 51, the swivel manipulation device 54, the bucket manipulation device 57, and the boom manipulation device 71 of the manipulating part 101, into the four pairs of individual manual operation correcting commands (52, 53), (55, 56), (58, 59), and (72, 73) which are electrical signals, respectively, and outputs them to the adder 2120a.

The adder 2120a operates similarly to the operation command generating module 2120 of Embodiment 4. That is, the adder 2120a adds the four pairs of individual basic operation commands and the four pairs of individual automatic operation correcting commands to the four pairs of individual manual operation correcting commands (52, 53), (55, 56), (58, 59), and (72, 73), and generates the four pairs of individual operation commands. Then, the adder 2120a outputs the four pairs of individual operation commands to the electric/pressure converter 2120c.

The electric/pressure converter 2120c is comprised of multi-control valves including four pairs of electromagnetic proportional valves, and convers the four pairs of individual operation commands into the four pairs of individual operation commands (52', 53'), (55', 56'), (58', 59'), and (72', 73') which are pilot pressure signals, and outputs them to the arm control valve 40, the swivel control valve 43, the bucket control valve 44, and the boom control valve 47, respectively.

Note that the four pairs of individual manual operation correcting commands (52, 53), (55, 56), (58, 59), and (72, 73) constitute a part of the manual operation correcting command 403, and the four pairs of individual operation commands (52', 53'), (55', 56'), (58', 59'), (72', 73') constitute a part of the operation command 201.

According to Embodiment 7 described above, the present disclosure can be applied to the hydraulic excavator 20 in which the manipulation device generates the manual operation correcting command in a pilot pressure, and the control valve is controlled based on the operation command in a pilot pressure.

Moreover, according to Embodiment 7, the conventional hydraulic excavator can be remodeled to the skill-inheriting hydraulic excavator 20 of the present disclosure by adding to the conventional hydraulic excavator the arithmetic unit constituting the control part 401, the detector which acquires the estimation basic data, the piezoelectric elements constituting the pressure/electric converter 2120b, and the multi-control valves constituting the electric/pressure converter 2120c.

Other Embodiments

In the hydraulic excavator 10 of Embodiment 2, the operation-state detecting part 113 may further include the sensor part 341 of Embodiment 3.

Moreover, in Embodiments 1 to 3, the operation-state detecting part 113 may include, instead of or in addition to the microphone 313, operation sensors which detect the operations of the control valves 40, 43, 44, and 47. The operation sensor is, for example, a pressure sensor provided to an oil channel connected to each of the control valves 40, 43, 44, and 47, or a position sensor which detects a position of a valve body of each of the control valves 40, 43, 44, and 47.

Moreover, in Embodiments 1 to 3, the operation-state detecting part 113 may include, instead of or in addition to the microphone 313, a speed sensor which detects a speed of the engine 26 and outputs the detected speed data (driving-source state data). The speed sensor is, for example, a rotary encoder, a revolution indicator, or a tachometer.

Moreover, in Embodiments 1 to 3, the learning mode by the learning module 118 may be unsupervised learning.

Moreover, in Embodiments 1 to 3, the driving source of the hydraulic excavator 10 may be other than the engine 26. Such a driving source is, for example, an electrical motor.

In the hydraulic excavator 20 of Embodiment 5, the operation-state detecting part 113 may further include the sensor part 341 of Embodiment 6. Moreover, this hydraulic excavator 20 may be modified as described in Embodiment 7.

Moreover, in any of Embodiments 4 to 7, the operation-state detecting part 113 may include, instead of or in addition to the microphone 313, the operation sensors which detect the operations of the control valves 40, 43, 44, and 47.

Moreover, in any of Embodiments 4 to 7, the operation-state detecting part 113 may include, instead of or in addition to the microphone 313, the speed sensor which detects the speed of the engine 26 and outputs the detected speed data (driving-source state data). The speed sensor is, for example, a rotary encoder, a revolution indicator, or a tachometer.

Moreover, in any of Embodiments 4 to 7, the learning mode by the learning module 118 may be unsupervised learning.

Moreover, in any of Embodiments 4 to 7, the driving source of the hydraulic excavator 20 may be other than the engine 26. Such a driving source is, for example, an electrical motor.

In any of Embodiments 4 to 6, the operation command generating module 2120 may be configured to add the hydraulic pilot pressures with each other.

It is apparent for a person skilled in the art from the above description that many improvements and other embodiments of the present disclosure are possible. Therefore, the above description is to be interpreted only as illustration.

INDUSTRIAL APPLICABILITY

The construction machinery with learning function of the present disclosure is useful as construction machinery, capable of learning work performed by the construction machinery through manipulation by a human, and automatically performing the learned work.

Moreover, the skill-inheriting construction machinery of the present disclosure is useful as skill-inheriting construction machinery, capable of taking over skill of a highly-skilled operator in the construction industry, and achieving automation of a given work within a short period of time.

What is claimed is:

1. Construction machinery with learning function, comprising:
   an operating part having a working part and configured to move the working part to perform a work;
   a manipulating part configured to output a command corresponding to operation by an operator;
   a work-state detecting part configured to detect a state of the work performed by the working part and output the detected work state as work-state data;
   an operation-state detecting part configured to detect a state of the operation of the operating part and output the detected operation state as operation-state data;
   a reaction detecting part configured to detect a reaction received by the operating part from a work-target object due to the work performed by the working part, and output the detected reaction as reaction data;
   a learning data memory configured to store the command in a time series as command data, and store estimation basic data in a time series, the estimation basic data including the work-state data, the operation-state data, and the reaction data;
   a learning module configured to execute machine learning of the command data stored in the learning data memory by using the estimation basic data stored in the learning data memory, and, after the machine learning, receive an input of the estimation basic data during the operation of the operating part, and output an estimated command of the command; and
   a hydraulic drive system configured to drive the operating part based on one of the command and the estimated command, or both of the command and the estimated command,
   wherein the manipulating part is configured to output, as the command, an operation command corresponding to the operation by the operator,
   wherein the learning data memory is configured to store the operation command in a time series as the command data, and store the estimation basic data in a time series, the estimation basic data including the work-state data, the operation-state data, and the reaction data,
   wherein the learning module is configured to execute, during the learning, the machine learning of the command data stored in the learning data memory by using the estimation basic data stored in the learning data memory, and during an automatic control after the machine learning, receive the input of the estimation basic data and output an estimated operation command that is the estimated command, and
   wherein the hydraulic drive system is configured to drive the operating part according to the operation command or the estimated operation command.

2. The construction machinery with learning function of claim 1, further comprising a body part provided with the operating part,
   wherein the reaction detecting part detects the reaction including at least one of inclination, acceleration, and angular acceleration of the operating part or the body part, and outputs the detected reaction as the reaction data.

3. The construction machinery with learning function of claim 1, wherein the operation-state detecting part detects a state of a driving source including at least one of an output and operation noise of the driving source, and outputs the detected driving-source state as driving-source state data, the driving source driving a pump configured to pump hydraulic oil of the hydraulic drive system, and
   wherein the operation-state data includes the driving-source state data.

4. The construction machinery with learning function of claim 1, wherein the operation-state data includes the command data.

5. The construction machinery with learning function of claim 1, wherein the operation-state detecting part further includes a posture detecting part configured to detect a posture of the operating part and output the detected posture as postural data, and
   wherein the operation-state data includes the postural data.

6. The construction machinery with learning function of claim 1, wherein the construction machinery with learning function is skill-inheriting construction machinery provided with a control part,
   wherein the manipulating part is configured to output, as the command, a manual operation correcting command according to operation by the operator,
   wherein the hydraulic drive system is configured to drive the operating part according to a basic operation command corresponding to operation of the operating part that has not been corrected, an automatic operation correcting command, and the manual operation correcting command, wherein the control part includes:
- a basic-operation commanding module configured to output the basic operation command for causing the working part to take a basic movement by the operating part that positions the working part so as to enable a determination as to whether correction of the basic movement is required;
- an operation-correcting-command generating module configured to generate an operation correcting command by adding the manual operation correcting command to the automatic operation correcting command;
- the learning data memory comprising an operation-correcting-command memory configured to store the operation correcting command in a time series as the command data and an estimation-basic-data memory configured to store the estimation basic data in a time series; and
- the learning module, and wherein the learning module is configured to execute machine learning of the operation correcting command stored in the operation-correcting-command memory by using the estimation basic data stored in the estimation-basic-data memory, and, after the machine learning, receive the input of the estimation basic data during the operation of the operating part and output the automatic operation correcting command that is the estimated command.

7. The construction machinery with learning function of claim 6, further comprising a body part provided with the operating part, wherein the reaction detecting part detects the reaction including at least one of inclination, acceleration, and angular acceleration of the operating part or the body part, and outputs the detected reaction as the reaction data.

8. The construction machinery with learning function of claim 6, wherein the operation-state detecting part detects a state of a driving source including at least one of an output and operation noise of the driving source, and outputs the detected driving-source state as driving-source state data, the driving source driving a pump configured to pump hydraulic oil of the hydraulic drive system, and wherein the operation-state data includes the driving-source state data.

9. The construction machinery with learning function of claim 6, wherein the operation-state detecting part further includes a posture detecting part configured to detect a posture of the operating part and output the detected posture as postural data, and wherein the operation-state data includes the postural data.

10. The construction machinery with learning function of claim 6, wherein the manual operation correcting command is an electrical command signal, wherein the operating part includes a hydraulic actuator configured to drive the working part, and a control valve configured to hydraulically control operation of the hydraulic actuator according to the basic operation command, the automatic operation correcting command, and the manual operation correcting command, and wherein the control valve is an electromagnetic valve.

* * * * *